US011221272B2

(12) United States Patent
Urabe

(10) Patent No.: US 11,221,272 B2
(45) Date of Patent: Jan. 11, 2022

(54) SPRINGBACK VARIATION CAUSE ANALYSIS METHOD

(71) Applicant: JFE Steel Corporation, Tokyo (JP)

(72) Inventor: Masaki Urabe, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 5 days.

(21) Appl. No.: 16/768,132

(22) PCT Filed: Oct. 19, 2018

(86) PCT No.: PCT/JP2018/039022
§ 371 (c)(1),
(2) Date: May 29, 2020

(87) PCT Pub. No.: WO2019/111555
PCT Pub. Date: Jun. 13, 2019

(65) Prior Publication Data
US 2020/0309635 A1 Oct. 1, 2020

(30) Foreign Application Priority Data
Dec. 7, 2017 (JP) .............................. JP2017-235121

(51) Int. Cl.
*G01M 5/00* (2006.01)
*G06F 30/23* (2020.01)
(Continued)

(52) U.S. Cl.
CPC ........... *G01M 5/0041* (2013.01); *B21C 51/00* (2013.01); *B21D 22/00* (2013.01); *G06F 30/23* (2020.01);
(Continued)

(58) Field of Classification Search
CPC ...... G01M 5/0041; B21D 22/00; G06F 30/23; G06F 2119/14; G06F 2113/24; G06F 2119/18; B21C 51/00
See application file for complete search history.

(56) References Cited

U.S. PATENT DOCUMENTS 7,957,918 B2 * 6/2011 Niwa ...................... G06F 30/23
702/33
8,126,658 B2    2/2012 Nonomura et al.
(Continued)

FOREIGN PATENT DOCUMENTS

CN     101511502 A    8/2009
CN     104602836 A    5/2015
(Continued)

OTHER PUBLICATIONS

Li et al, "Simulation of springback", (2002) International Journal of Mechanical Sciences 44 (2002) 103-122 (Year: 2002).*
(Continued)

*Primary Examiner* — Stephanie E Bloss
(74) *Attorney, Agent, or Firm* — RatnerPrestia

(57) ABSTRACT

A springback variation cause analysis method includes: calculating a first stress distribution in a press forming part; calculating a second stress distribution in the press forming part; calculating a difference between the second and the first stress distribution, and replacing and setting the first or the second stress distribution with the calculated stress difference distribution; calculating a first springback amount to be caused in the press forming part; changing a value of stress difference in a partial area of the press forming part in the stress difference distribution set for the press forming part; calculating a second springback amount; and analyzing a portion in the press forming part that is a cause of variation in springback amount in the press forming part due to
(Continued)

scattering or variation in press forming conditions, based on the second springback amount and the first springback amount.

8 Claims, 55 Drawing Sheets

(51) Int. Cl.
*B21C 51/00* (2006.01)
*B21D 22/00* (2006.01)
*G06F 119/14* (2020.01)
*G06F 113/24* (2020.01)

(52) U.S. Cl.
CPC ...... *G06F 2113/24* (2020.01); *G06F 2119/14* (2020.01)

(56) References Cited

U.S. PATENT DOCUMENTS

| | | | |
|---|---|---|---|
| 8,589,132 B2 * | 11/2013 | Miyagi | G06F 30/23 703/7 |
| 9,410,855 B2 * | 8/2016 | Ishiwatari | G06F 30/23 |
| 9,767,234 B2 | 9/2017 | Yoshida et al. | |
| 2010/0005845 A1 | 1/2010 | Yoshida et al. | |
| 2014/0019071 A1 * | 1/2014 | Ishiwatari | G06F 30/23 702/42 |
| 2014/0172391 A1 | 6/2014 | Tokita et al. | |
| 2015/0168240 A1 | 6/2015 | Sumikawa et al. | |
| 2015/0377806 A1 * | 12/2015 | Minote | B21D 22/208 374/43 |
| 2018/0075177 A1 | 3/2018 | Yoshida et al. | |

FOREIGN PATENT DOCUMENTS

| | | |
|---|---|---|
| EP | 3251769 A1 | 12/2017 |
| JP | 2007229724 A | 9/2007 |
| JP | 2008049389 A | 3/2008 |
| JP | 2008055476 A | 3/2008 |
| JP | 2008087015 A | 4/2008 |
| JP | 2008087035 A | 4/2008 |
| JP | 2011183417 A | 9/2011 |
| JP | 2012206158 A | 10/2012 |
| JP | 2013043182 A | 3/2013 |
| JP | 2013071120 A | 4/2013 |
| JP | 2016087625 A | 5/2016 |

OTHER PUBLICATIONS

Sato et al, "Springback Simulation for Automotive Body Components using High Strength Steels" (2003) SAE International, Jan. 2003 (Year: 2003).*
Chongthairungruang et al, "Springback prediction in sheet metal forming of high strength steels" (2013), Materials and Design 50 (2013) 253-266 (Year: 2013).*
Firat et al, "Sheet metal forming analyses with an emphasis on the springback deformation" (2008) journal of materials processing technology 196 (2008) 135-148 (Year: 2008).*
International Search Report and Written Opinion for International Application No. PCT/JP2018/039022, dated Jan. 15, 2019, 6 pages.
Sun, Z. et al., "Effect of Stress Distribution on Springback in Hydroforming Process," Jul. 7, 2017, vol. 93(5), pp. 2773-2782, XP 036339844, ISSN: 0268-3768, The International Journal of Advanced Manufacturing Technology, Springer, London [retrieved on Jul. 7, 2017].
Zong, Y, et al., "Springback Evaluation in Hot V-Bending of Ti-6A1-4V Alloy Sheets," Sep. 5, 2014, vol. 76(1), pp. 577-585, XP035429219, ISSN: 0268-3768, The International Journal of Advanced Manufacturing Technology, Springer, London [retrieved on Sep. 5, 2014].
Extended European Search Report for European Application No. 18 886 420.1, dated Jul. 16, 2021, 16 pages.
Li, J. et al., "Theoretic Analysis of Forming and Springback for Sheet Metal Air Bending," Aug. 31, 2009, vol. 16(4), Journal of Plasticity Engineering (with English abstract only).
Chinese Office Action with Search Report for Chinese Application No. 201880078293.1, dated May 19, 2021, 7 pages.

* cited by examiner (a) DISPLACEMENT IN MATERIAL B (b) DISPLACEMENT IN MATERIAL A (c) (DISPLACEMENT IN MATERIAL B)−(DISPLACEMENT IN MATERIAL A)

(a) STRESS DIFFERENCE BETWEEN MATERIAL A AND MATERIAL B

SPRINGBACK ANALYSIS (b) DISPLACEMENT (a) (DISPLACEMENT IN MATERIAL B)-
(DISPLACEMENT IN MATERIAL A)

(b) DISPLACEMENT BASED ON STRESS
DIFFERENCE (a) TORSION ANGLE (b) WARPING AMOUNT (a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT

DISPLACEMENT (mm)

(a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT (a) STRESS DIFFERENCE CHANGED AREA (b) DISPLACEMENT

DISPLACEMENT (mm)

FIG.26
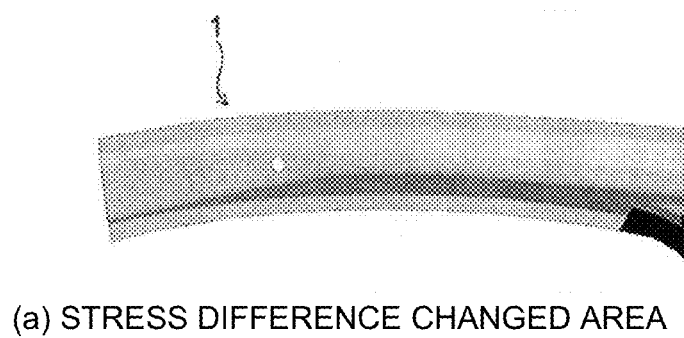
(a) STRESS DIFFERENCE CHANGED AREA
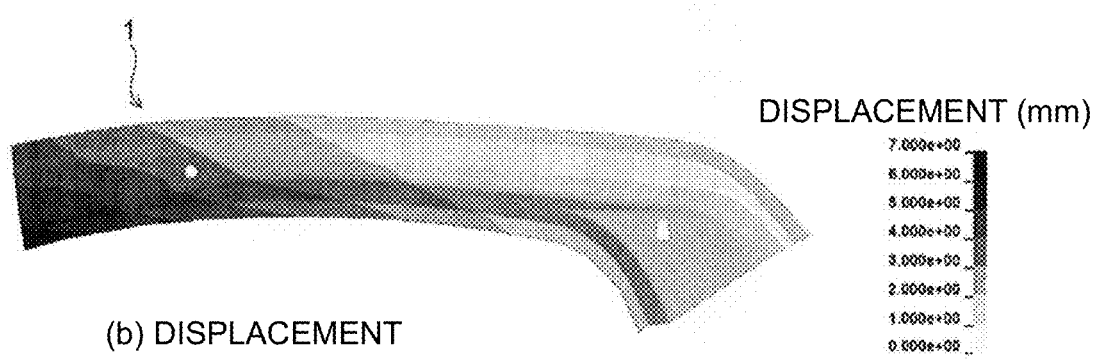
(b) DISPLACEMENT FIG.27
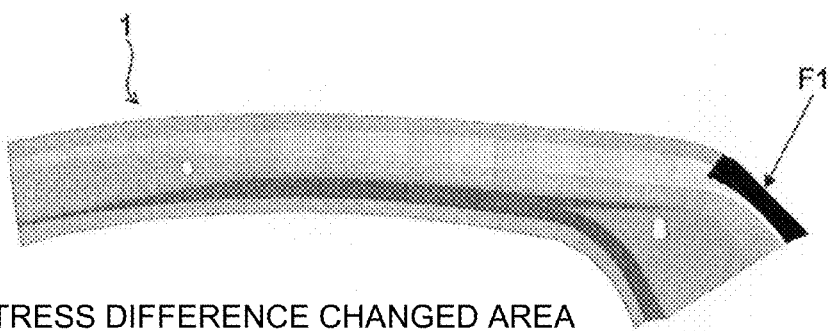
(a) STRESS DIFFERENCE CHANGED AREA
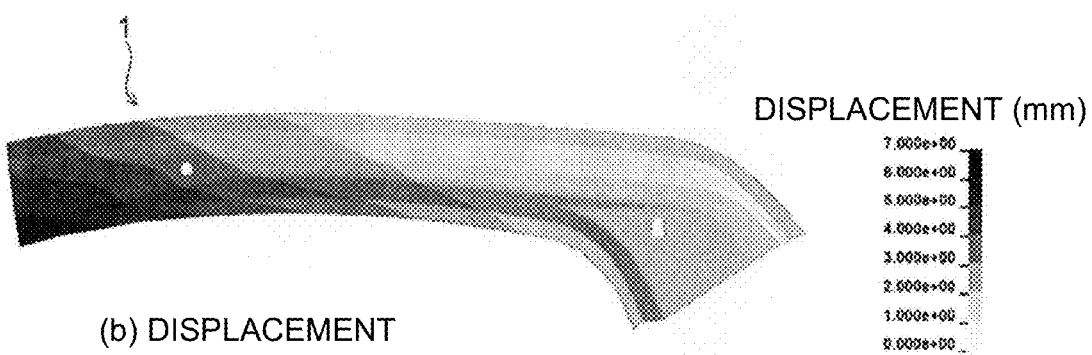
(b) DISPLACEMENT

FIG.28
(a) STRESS DIFFERENCE CHANGED AREA
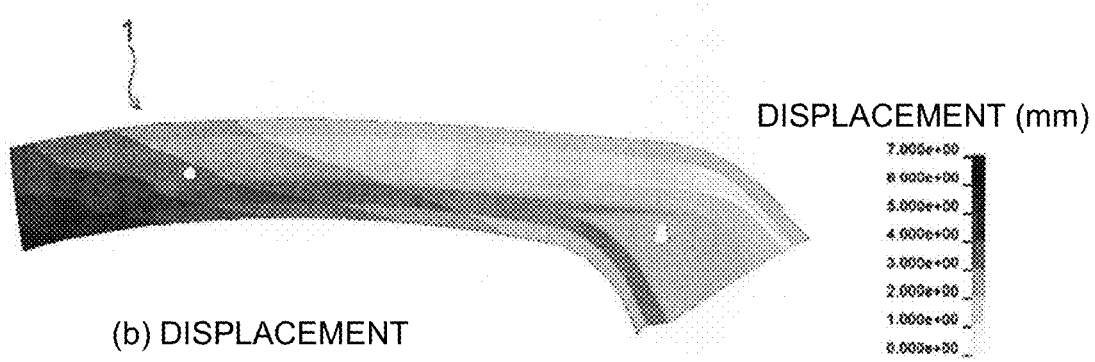
(b) DISPLACEMENT (a) STRESS DIFFERENCE CHANGED AREA (b) DISPLACEMENT

FIG.33
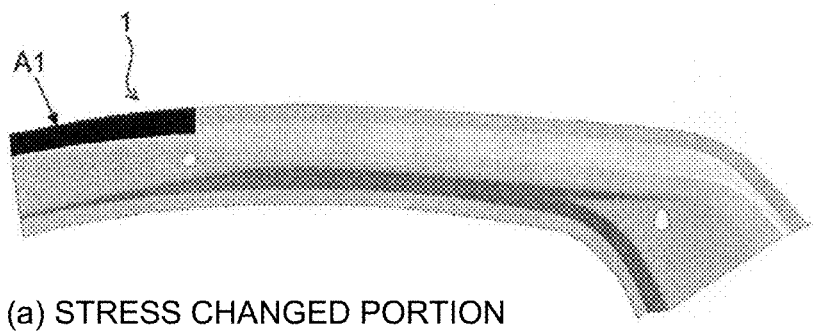
(a) STRESS CHANGED PORTION
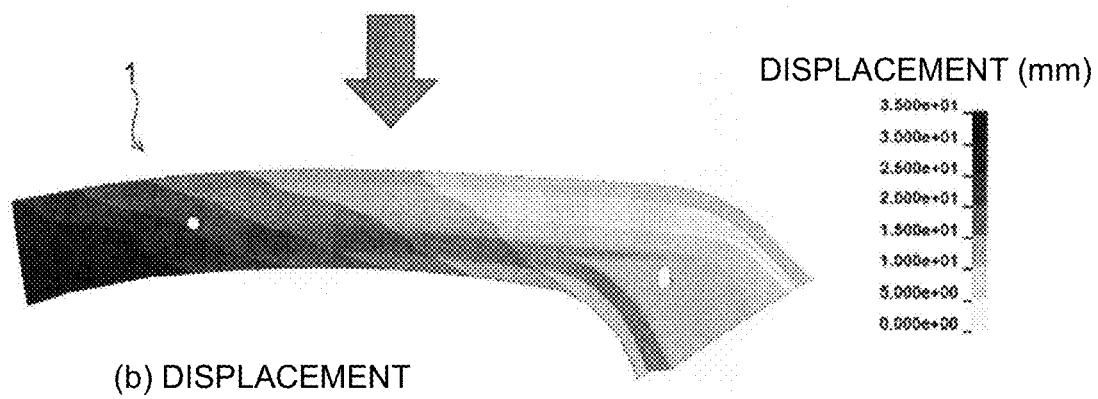
(b) DISPLACEMENT
DISPLACEMENT (mm)

(a) STRESS CHANGED PORTION (b) DISPLACEMENT

FIG.35
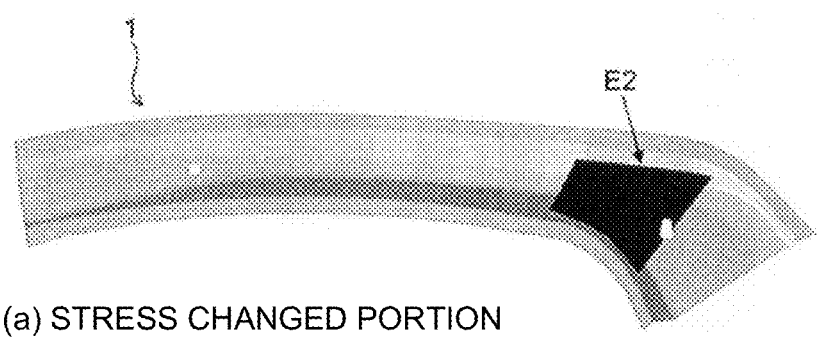
(a) STRESS CHANGED PORTION
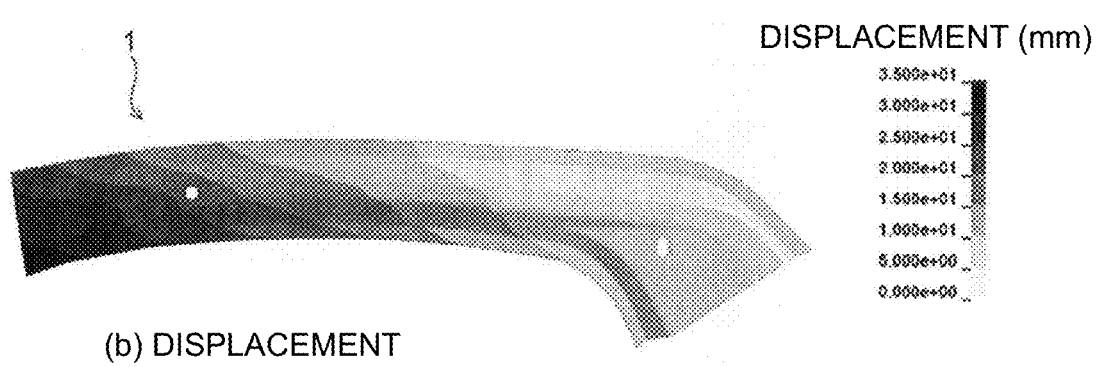
(b) DISPLACEMENT

FIG.36
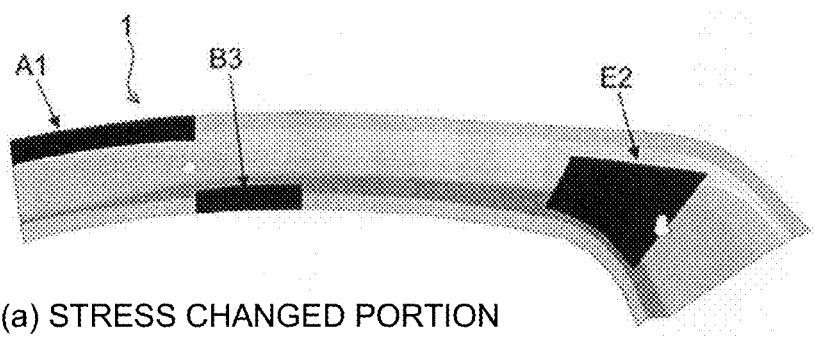
(a) STRESS CHANGED PORTION
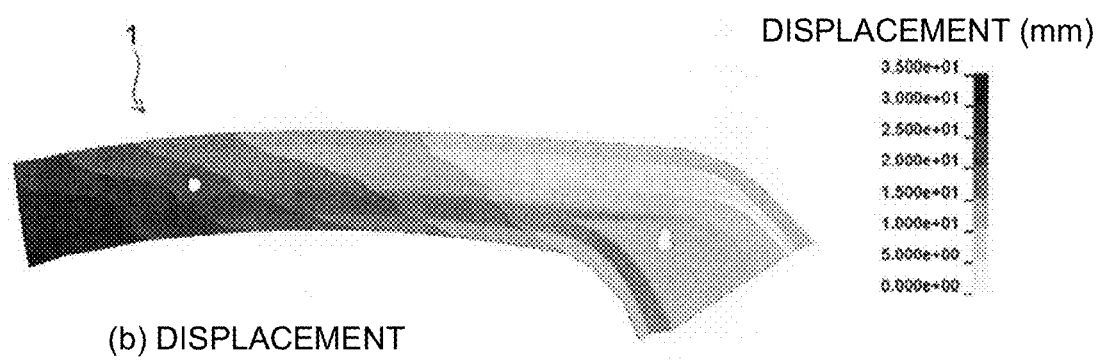
(b) DISPLACEMENT (a) DISPLACEMENT IN LUBRICATION B (b) DISPLACEMENT IN LUBRICATION A (c) (DISPLACEMENT IN LUBRICATION B)−(DISPLACEMENT IN LUBRICATION A)

SPRINGBACK VARIATION CAUSE ANALYSIS METHOD

CROSS REFERENCE TO RELATED APPLICATIONS

This is the U.S. National Phase application of PCT/JP2018/039022, filed Oct. 19, 2018, which claims priority to Japanese Patent Application No. 2017-235121, filed Dec. 7, 2017, the disclosures of these applications being incorporated herein by reference in their entireties for all purposes.

FIELD OF THE INVENTION

The present invention relates to a springback amount variation cause analysis method (springback variation cause analysis method) for analyzing a portion that is a cause of variation in springback amount in a press forming part due to scattering or variation in press forming conditions.

BACKGROUND OF THE INVENTION

In press forming of metal sheets, in many cases, high shape accuracy is required for press forming parts, and the shape accuracy is required to be obtained always stably for scattering or variation in press forming conditions during mass production. In reality, however, it is not easy to satisfy the requirements, and the shapes of press forming parts vary due to various causes of scattering or variation in press forming conditions, such as scattering in properties of press forming metallic sheets, increase in temperature of a tool of press forming due to continuous processing, seasonal change in environmental temperature, and variation in set position of press forming metallic sheets. Against this problems, it is required to find out a method for reducing variation in press forming part shape when press forming conditions are scattered or varied.

To satisfy the shape accuracy required for press forming of metal sheets, it is significantly important to reduce springback amount generated when a press forming part is taken out of a tool of press forming after press forming. Springback is the behavior of elastic recovery, which is generated when internal stress in a press forming part at the time of completion of sandwiching by upper and lower tools of press forming (bottom dead center) (bottom dead center stress) is released at the time of die release. To effectively reduce the springback amount, it is important to know which portion of the press forming part and how the bottom dead center stress of the portion of the press forming part affects the behavior of springback. From this viewpoint, methods for analyzing a portion that is a cause of generation of springback by using finite element analysis have been proposed (Patent Literature 1 to Patent Literature 7). Patent Literature 8 discloses a method for confirming a relation between change in press forming conditions as countermeasures against springback and change in stress state as the entire shape of a press forming part before and after die release.

PATENT LITERATURE

Patent Literature 1: Japanese Patent Application Laid-open No. 2007-229724
Patent Literature 2: Japanese Patent Application Laid-open No. 2008-55476
Patent Literature 3: Japanese Patent Application Laid-open No. 2008-49389
Patent Literature 4: Japanese Patent Application Laid-open No. 2008-87015
Patent Literature 5: Japanese Patent Application Laid-open No. 2008-87035
Patent Literature 6: Japanese Patent Application Laid-open No. 2012-206158
Patent Literature 7: Japanese Patent Application Laid-open No. 2013-71120
Patent Literature 8: Japanese Patent Application Laid-open No. 2013-43182

SUMMARY OF THE INVENTION

In the methods disclosed in Patent Literature 1 to Patent Literature 7, the physical amount such as stress before generating springback is changed for a partial area of a press forming part, and the influence on the springback is evaluated, and hence a portion as a cause of the generation of springback itself can be analyzed. However, the methods do not involve the case where difference (scattering) in press forming conditions including characteristic variation in press forming metallic sheet affects variation in springback amount. Furthermore, the method disclosed in Patent Literature 8 is to confirm the effect of springback countermeasures by visually displaying a change amount of difference in stress distribution before and after springback countermeasures, and does not analyze a portion that is a cause of generation of springback, and scattering in press forming conditions is not taken into consideration. In this manner, the technology for evaluating variation in springback amount due to scattering or variation in press forming conditions and further analyzing where a cause of variation in springback amount is generated in the press forming part has not been proposed.

Aspects of the present invention have been made in view of the above-mentioned problems, and it is an object thereof to provide a springback variation cause analysis method for analyzing a portion where scattering or variation in press forming conditions becomes a cause of variation in springback amount.

Press forming conditions in the present application are mechanical properties of a press forming metallic sheet (blank), the thickness and shape of the press forming metallic sheet, temperature of the press forming metallic sheet, sliding characteristics between the press forming metallic sheet and a tool of press forming, the relative position of the press forming metallic sheet with respect to the tool of press forming, the position and shape of a positioning device for the press forming metallic sheet, mechanical properties of press forming tool material, the shape of the surface of the tool of press forming, the internal structure of the tool of press forming, blank holder force, blank holder position, the position and shape of a device for applying blank holder force to component parts of the tool of press forming, the relative position of the component parts of the tool of press forming, the relative speed of movement of the tool of press forming, the vibration of the tool of press forming, the temperature of the tool of press forming, atmospheric temperature, atmospheric components, a pressurizing device, and electromagnetic environments. Scattering or variation in press forming conditions refers to a state in which press forming conditions for the purpose of obtaining the same press forming part are scattered or varied uniformly or non-uniformly in a part or whole of processing space at the time of start of press forming, or during press forming or during die release.

To solve the problem and achieve the object, a springback variation cause analysis method of analyzing a portion in a press forming part that is a cause of variation in springback amount when the variation occurs in springback amount in the press forming part due to scattering or variation in press forming conditions according to aspects of the present invention includes: a first press forming condition stress distribution calculation step of performing press forming analysis under first press forming conditions set in advance, and calculating a stress distribution in a press forming part at a press forming bottom dead center; a second press forming condition stress distribution calculation step of performing press forming analysis under second press forming conditions set differently from the first press forming conditions, and calculating a stress distribution in the press forming part at the press forming bottom dead center; a stress difference distribution setting step of calculating a difference between the stress distribution calculated at the second press forming condition stress distribution calculation step and the stress distribution calculated at the first press forming condition stress distribution calculation step as a stress difference distribution, and replacing and setting the stress distribution in the press forming part at the press forming bottom dead center calculated at the first press forming condition stress distribution calculation step or the stress distribution in the press forming part at the press forming bottom dead center calculated at the second press forming condition stress distribution calculation step with the calculated stress difference distribution; a stress difference springback amount calculation step of performing springback analysis on the press forming part for which the stress difference distribution has been set, and calculating springback amount to be caused in the press forming part; a stress difference distribution changing step of changing a value of stress difference in a partial area of the press forming part in the stress difference distribution set for the press forming part at the stress difference distribution setting step; a stress difference changed springback amount calculation step of performing springback analysis on the press forming part for which the value of the stress difference has been changed, and calculating springback amount; and a springback variation cause analysis step of analyzing a portion in the press forming part that is a cause of variation in springback amount in the press forming part due to scattering or variation in press forming conditions, based on the springback amount calculated at the stress difference changed springback amount calculation step and the springback amount calculated at the stress difference springback amount calculation step.

Moreover, a springback variation cause analysis method of analyzing a portion in a press forming part that is a cause of variation in springback amount when the variation occurs in springback amount in a press forming part due to scattering or variation in press forming conditions according to aspects of the present invention includes: a first press forming part stress distribution acquisition step of press forming a first press forming part under first press forming conditions in advance, creating a first press forming part model from three-dimensional shape measurement data obtained by measuring a surface shape of the first press forming part after die release, performing mechanical analysis in a state in which the first press forming part model is sandwiched by a tool-of-press-forming model until reaching a press forming bottom dead center, and acquiring stress distribution in the first press forming part at the press forming bottom dead center; a second press forming part stress distribution acquisition step of press forming a second press forming part under second press forming conditions different from the first press forming conditions, creating a second press forming part model from three-dimensional shape measurement data obtained by measuring a surface shape of the second press forming part after die release, performing mechanical analysis in which the second press forming part model is sandwiched by the tool-of-press-forming model until reaching the press forming bottom dead center, and acquiring stress distribution in the second press forming part at the press forming bottom dead center; a stress difference distribution setting step of calculating difference between the stress distribution in the first press forming part at the press forming bottom dead center and the stress distribution in the second press forming part at the press forming bottom dead center as stress difference distribution, and replacing and setting the stress distribution in the first press forming part model at the press forming bottom dead center acquired at the first press forming part stress distribution acquisition step or the stress distribution in the second press forming part model at the press forming bottom dead center acquired at the second press forming part stress distribution acquisition step with the calculated stress difference distribution; a stress difference springback amount calculation step of performing springback analysis on the first press forming part model or the second press forming part model based on the set stress difference distribution, and calculating springback amount to be caused in the first press forming part model or the second press forming part model; a stress difference distribution changing step of changing a value of stress difference in a partial area of the first press forming part model or the second press forming part model in the stress difference distribution set for the first press forming part model or the second press forming part model at the stress difference distribution setting step; a stress difference changed springback amount calculation step of performing springback analysis on the first press forming part model or the second press forming part model for which the value of the stress difference has been changed, and calculating springback amount; and a springback variation cause analysis step of analyzing a portion in the press forming part that is a cause of variation in springback in the press forming part due to scattering or variation in press forming conditions, based on the springback amount calculated at the stress difference springback amount calculation step and the springback amount calculated at the stress difference changed springback amount calculation step.

Moreover, in the springback variation cause analysis method according to aspects of the present invention, the press forming conditions include: mechanical properties of a press forming metallic sheet, a thickness and a shape of the press forming metallic sheet, temperature of the press forming metallic sheet, sliding characteristics between the press forming metallic sheet and a tool of press forming, a relative position of the press forming metallic sheet with respect to the tool of press forming, a position and a shape of a positioning device for the press forming metallic sheet, mechanical properties of press forming tool material, a shape of a surface of the tool of press forming, an internal structure of the tool of press forming, blank holder force, a blank holder position, a position and a shape of a device for applying blank holder force to component parts of the tool of press forming, an initial relative position of the component parts of the tool of press forming, relative speed of movement of the tool of press forming, vibration of the tool of press forming, temperature of the tool of press forming, atmospheric temperature, atmospheric components, a pressurizing device, and electromagnetic environments.

Moreover, in the springback variation cause analysis method according to aspects of the present invention, the stress difference distribution changing step changes the value of the stress difference by any one of removal of a component of the stress difference distribution in at least one direction, constant times, addition of a constant, constant multiplication, replacement with an average value in a sheet thickness direction of a press forming metallic sheet, or replacement with a median value in the sheet thickness direction.

According to aspects of the present invention, a portion that is a cause of variation in springback amount in a press forming part due to scattering or variation in press forming conditions can be analyzed, and a portion in the press forming part for which countermeasures against shape stability for mass production of the press forming part are necessary can be accurately and easily analyzed.

Figure 3:
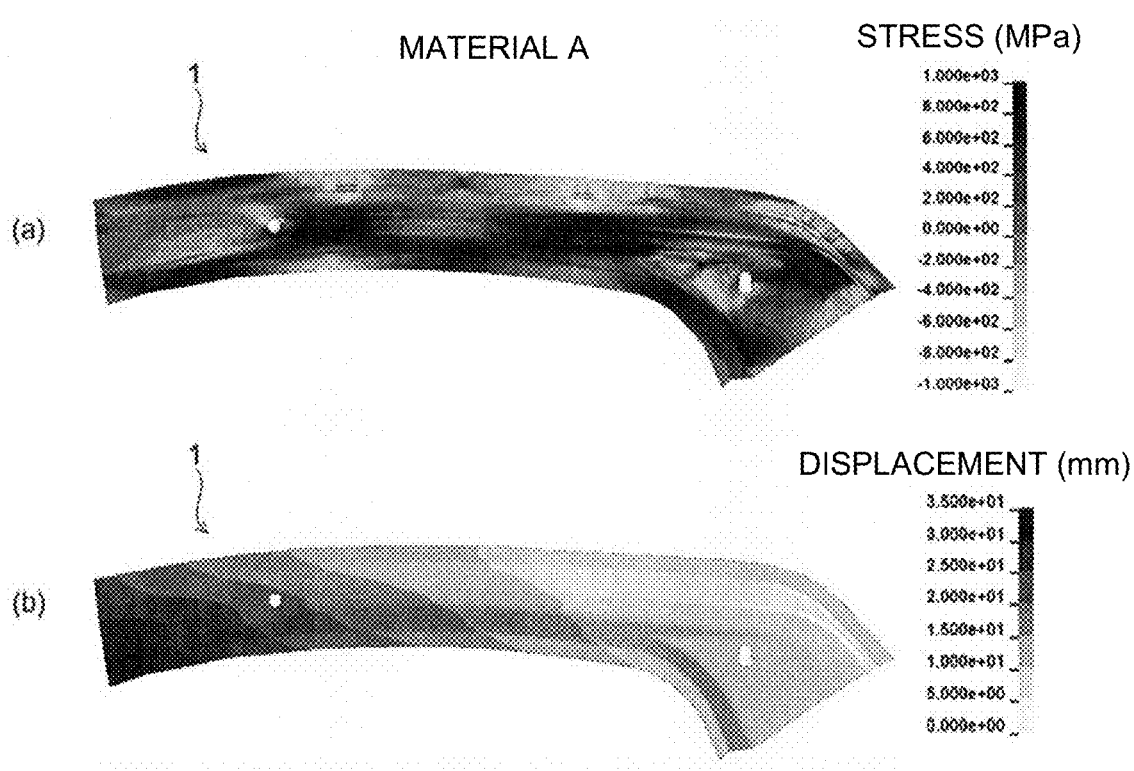

(a) and (b) of FIG. 3 are diagrams illustrating, in the first embodiment, an analysis result (a) of stress distribution at a press forming bottom dead center calculated by press forming analysis under first press forming conditions (material A) of material strength of a press forming metallic sheet and an analysis result (b) of displacement calculated by springback analysis based on the stress distribution.

Figure 4:
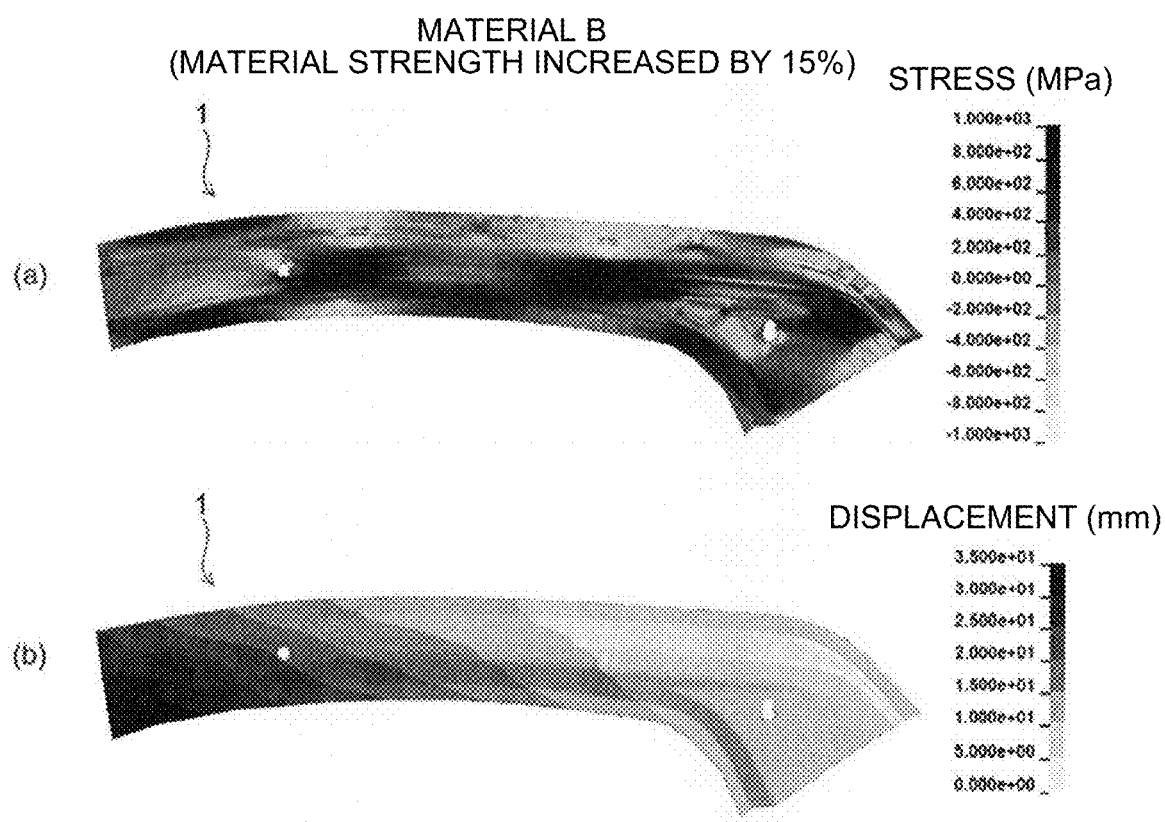

(a) and (b) of FIG. 4 are diagrams illustrating, in the first embodiment, an analysis result (a) of stress distribution at the press forming bottom dead center calculated by press forming analysis under second press forming conditions (material B) in which the material strength of the press forming metallic sheet was increased by 15% and an analysis result (b) of displacement calculated by springback analysis based on the stress distribution.

Figure 5:
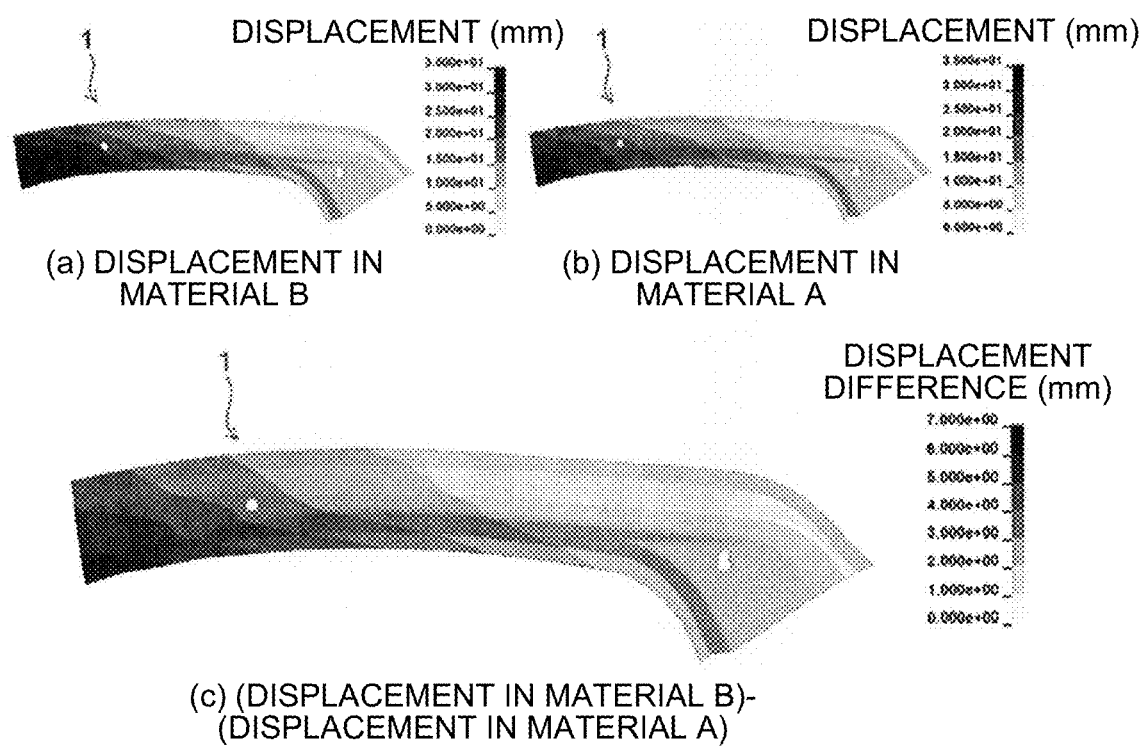

(a), (b) and (c) of FIG. 5 are diagrams illustrating, in the first embodiment, displacement (a) after springback analysis under the press forming conditions of the material B, displacement (b) after springback analysis under the press forming conditions of the material A, and difference (c) between the displacement under the press forming conditions of the material B and the displacement under the press forming conditions of the material A.

Figure 6:
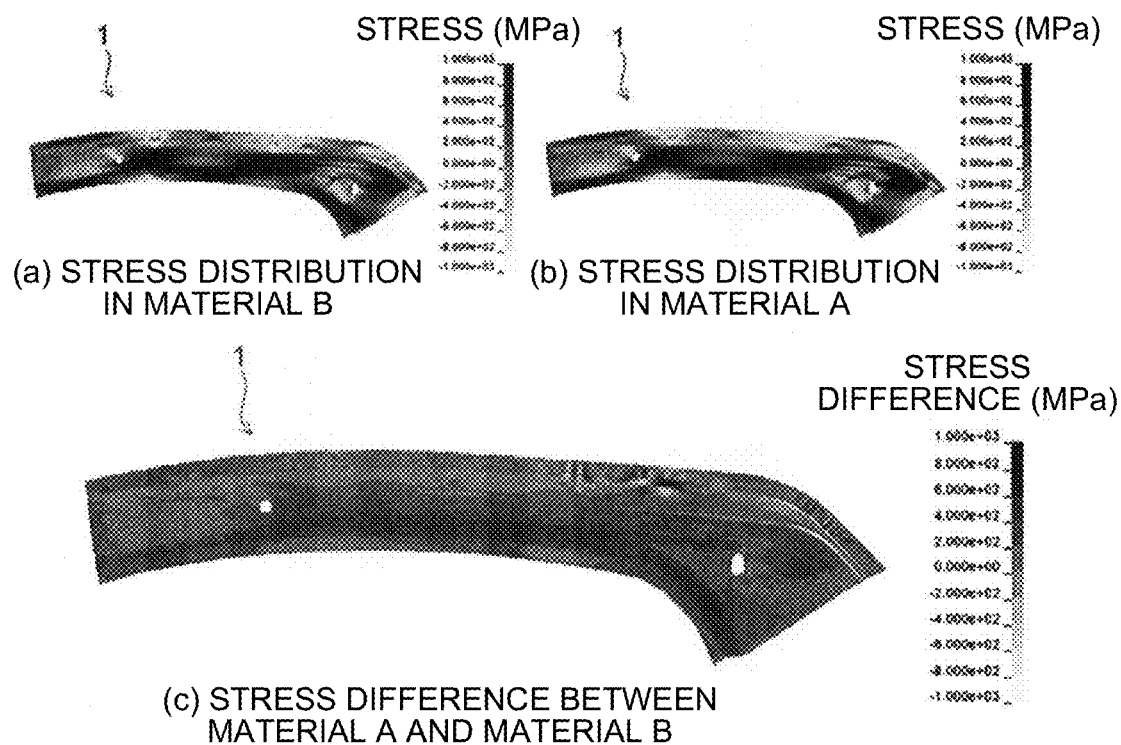

(a), (b) and (c) of FIG. 6 are diagrams illustrating, in the first embodiment, stress distribution (a) at the press forming bottom dead center under the press forming conditions of the material B, stress distribution (b) at the press forming bottom dead center under the press forming conditions of the material A, and difference (c) between the stress distribution in the material B at the press forming bottom dead center and the stress distribution in the material A at the press forming bottom dead center.

Figure 7:
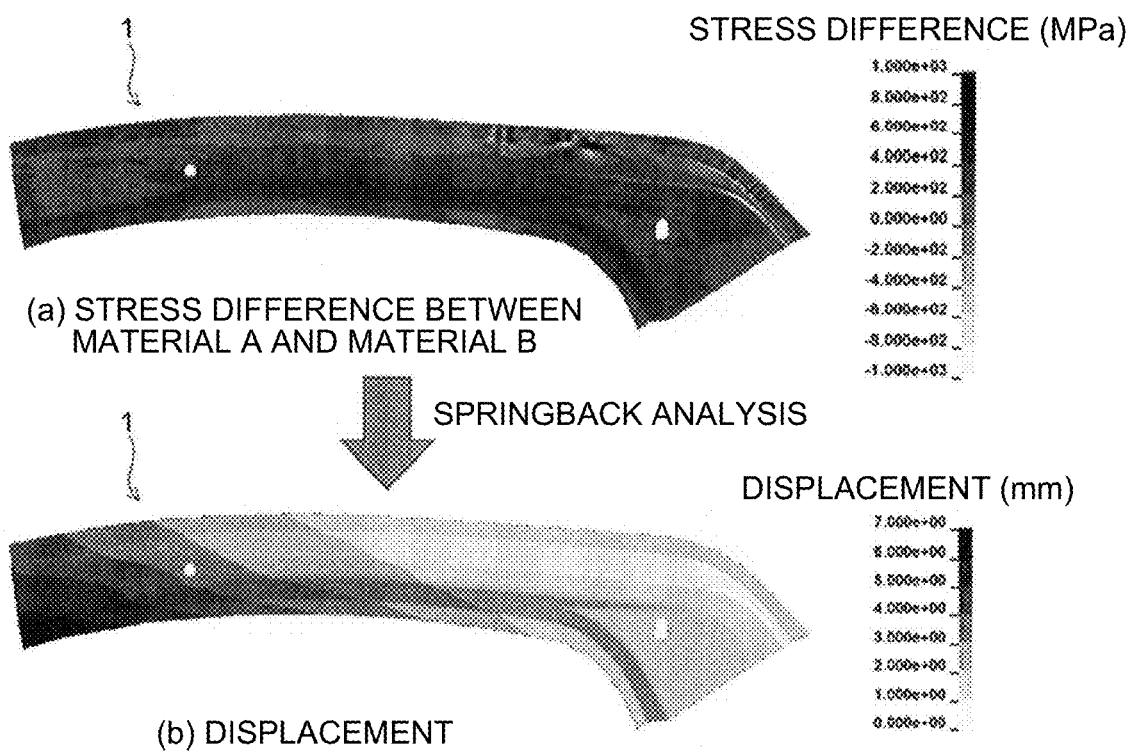

(a) and (b) of FIG. 7 are diagrams illustrating difference (a) between the stress distribution in the material B at the press forming bottom dead center and the stress distribution in the material A at the press forming bottom dead center and displacement (b) calculated by springback analysis based on the difference in stress distribution.

Figure 8:
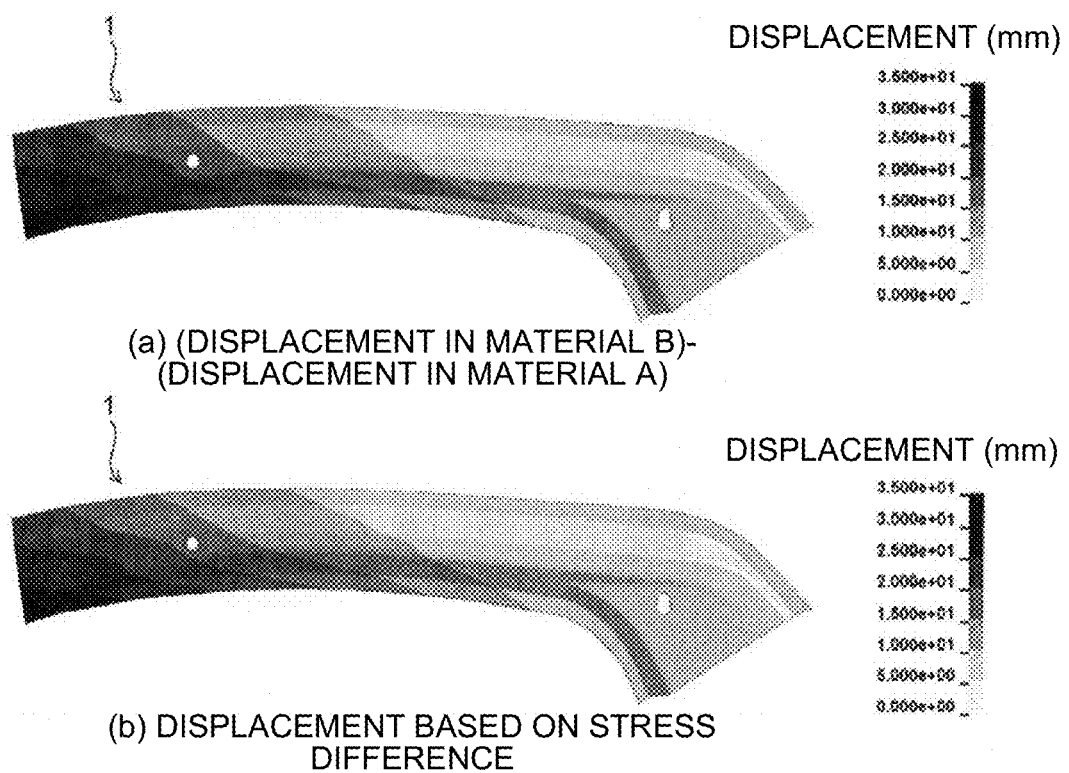

(a) and (b) of FIG. 8 are diagrams illustrating difference (a) in displacement calculated by springback analysis under the press forming conditions of the material B and the material A and displacement (b) calculated by springback analysis based on the stress difference at the press forming bottom dead center under the press forming conditions of the material B and the material A.

Figure 9:
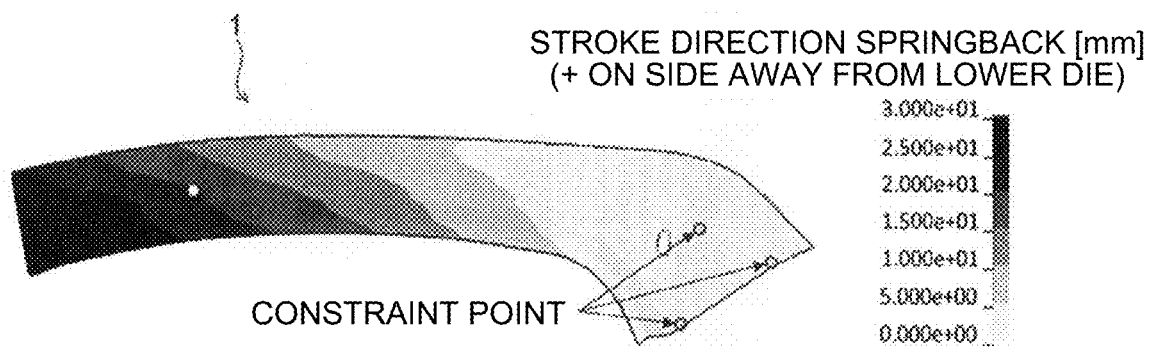

FIG. 9 is a diagram illustrating springback analysis and an analysis result of displacement determined by the springback analysis in the first embodiment.

Figure 10:
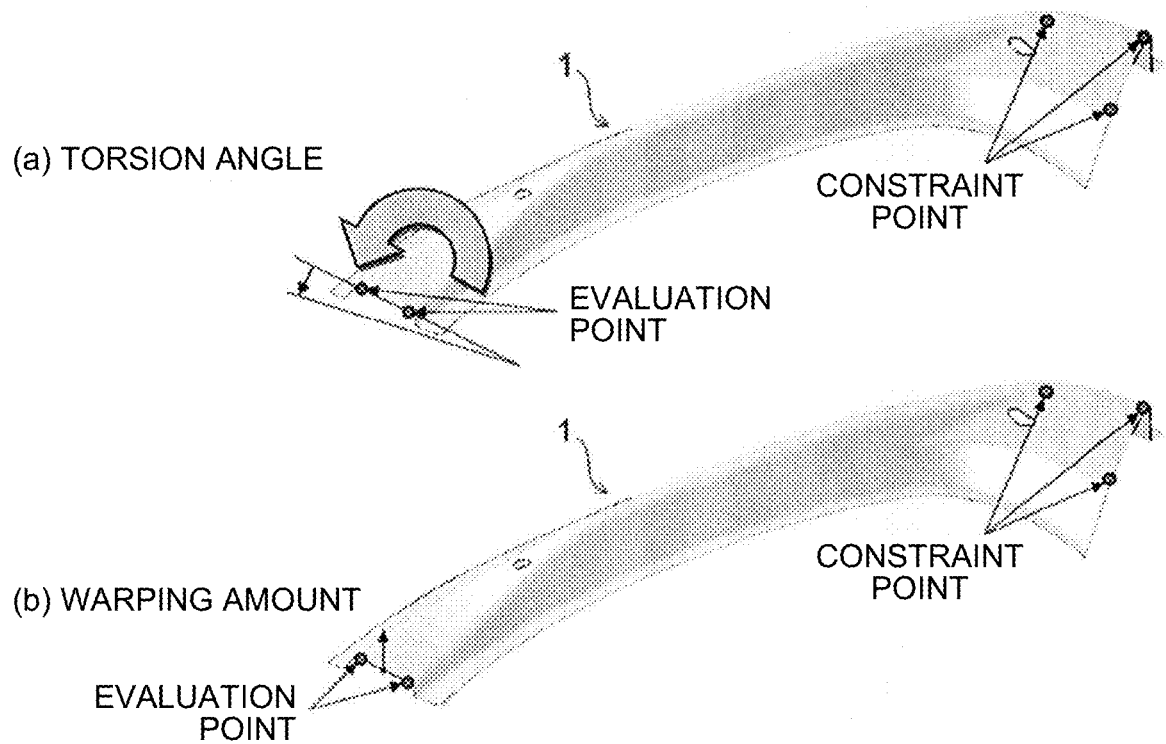

(a) and (b) of FIG. 10 are diagrams for describing methods for calculating a torsion angle and a warping amount as springback amount in the first embodiment.

Figure 11:
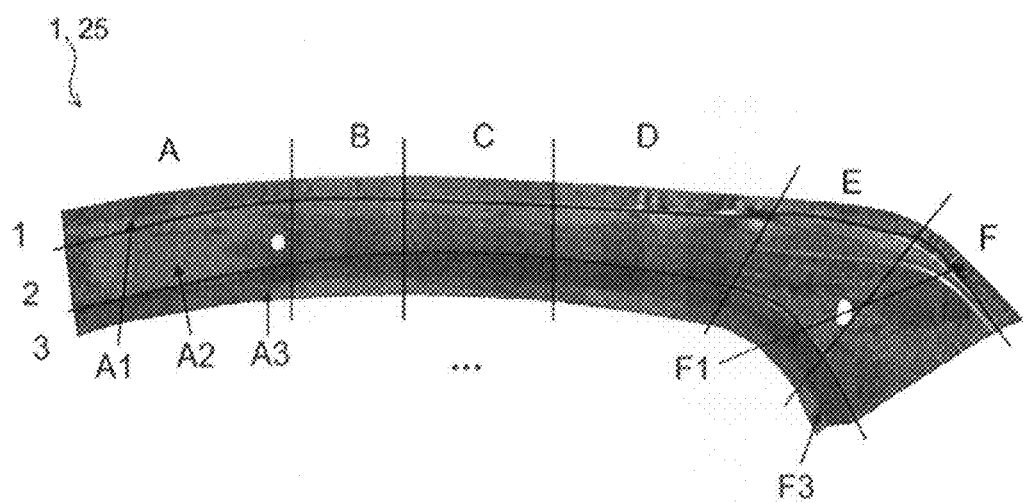

FIG. 11 is a diagram for describing division of areas in a press forming part in the first embodiment.

Figure 12:
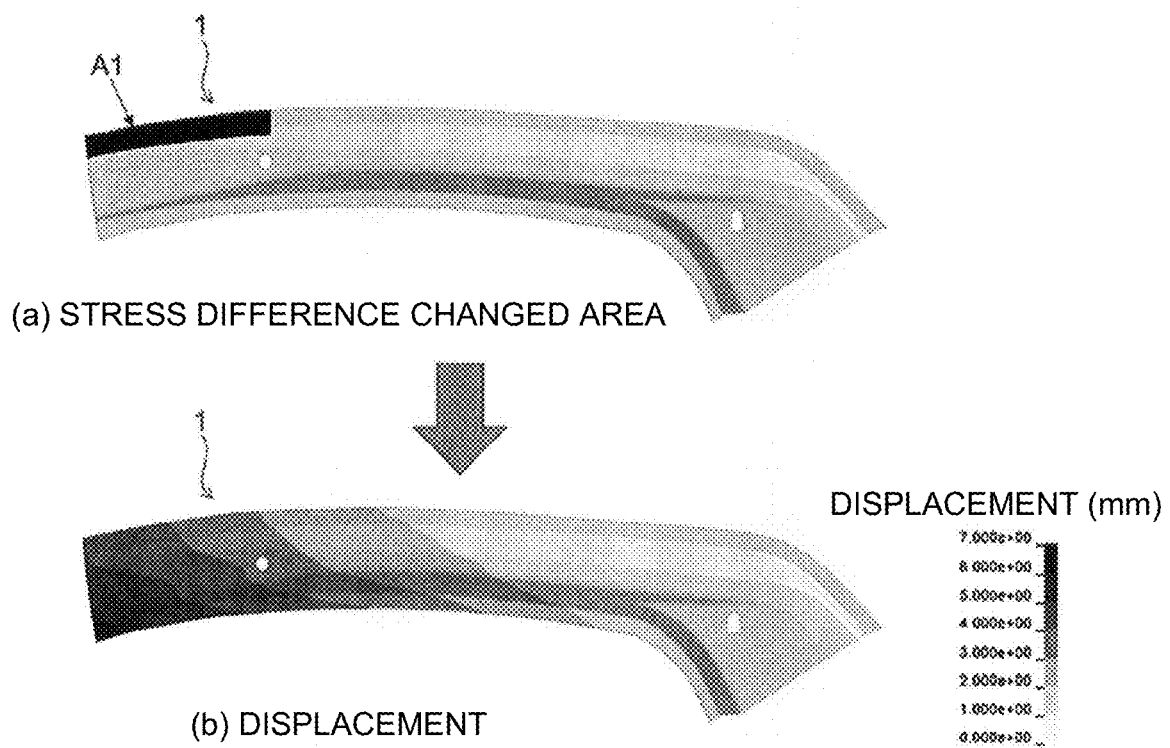

(a) and (b) of FIG. 12 are diagrams illustrating, in the first embodiment, an area (a) in which stress difference is changed and displacement (b) calculated by springback analysis by changing the stress difference in the area (No. 1).

Figure 13:
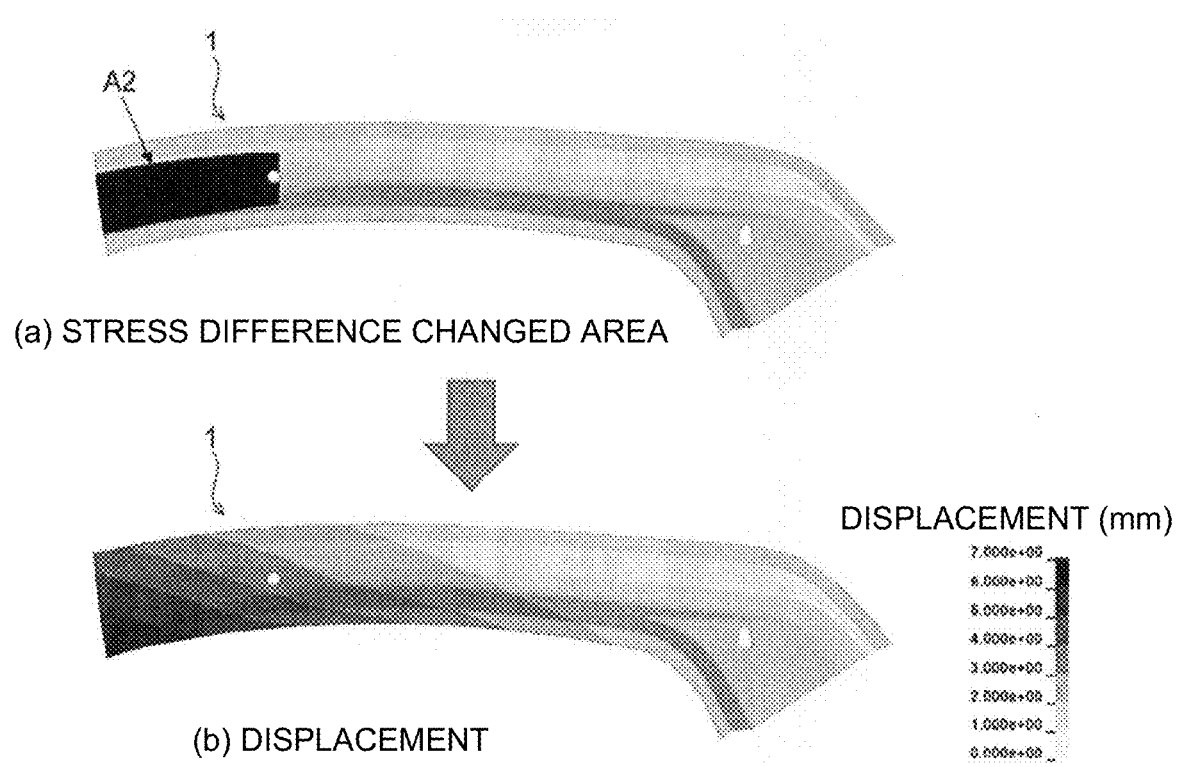

(a) and (b) of FIG. 13 are diagrams illustrating, in the first embodiment, an area (a) in which stress difference is changed and displacement (b) calculated by springback analysis by changing the stress difference in the area (No. 2).

Figure 14:
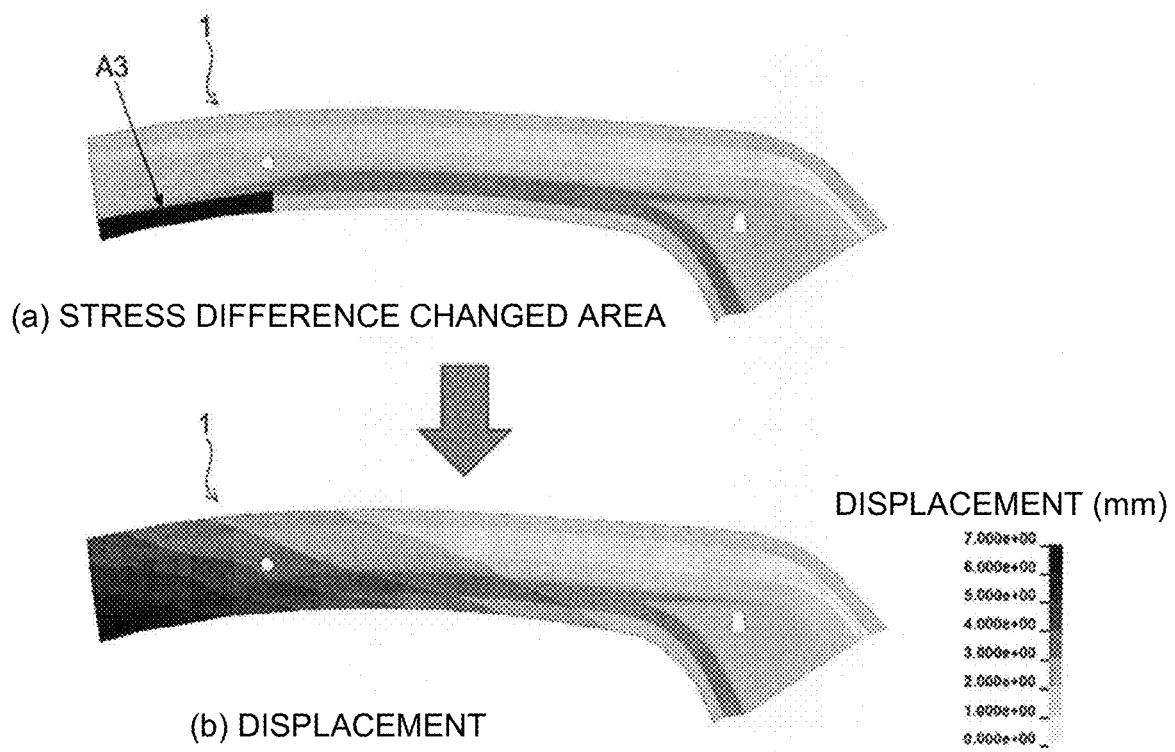

(a) and (b) of FIG. 14 are diagrams illustrating, in the first embodiment, an area (a) in which stress difference is changed and displacement (b) calculated by springback analysis by changing the stress difference in the area (No. 3).

Figure 15:
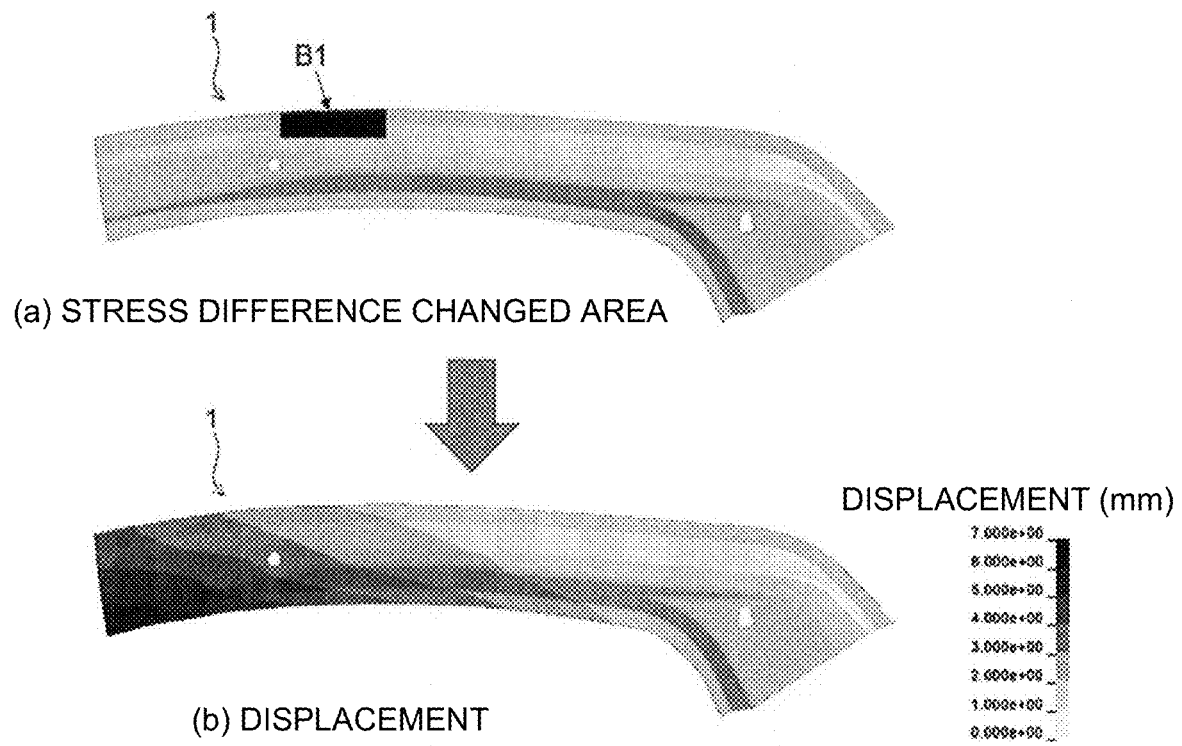

(a) and (b) of FIG. 15 are diagrams illustrating, in the first embodiment, an area (a) in which stress difference is changed and displacement (b) calculated by springback analysis by changing the stress difference in the area (No. 4).

Figure 16:
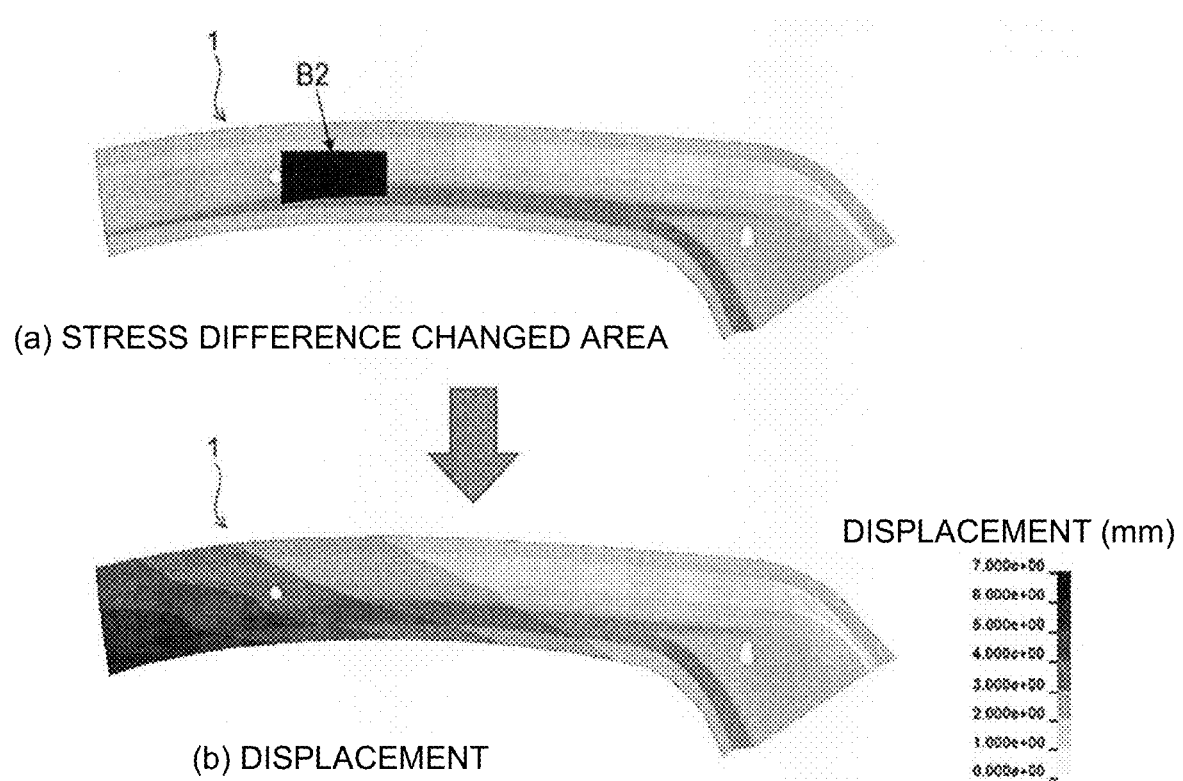

(a) and (b) of FIG. 16 are diagrams illustrating, in the first embodiment, an area (a) in which stress difference is changed and displacement (b) calculated by springback analysis by changing the stress difference in the area (No. 5).

Figure 17:
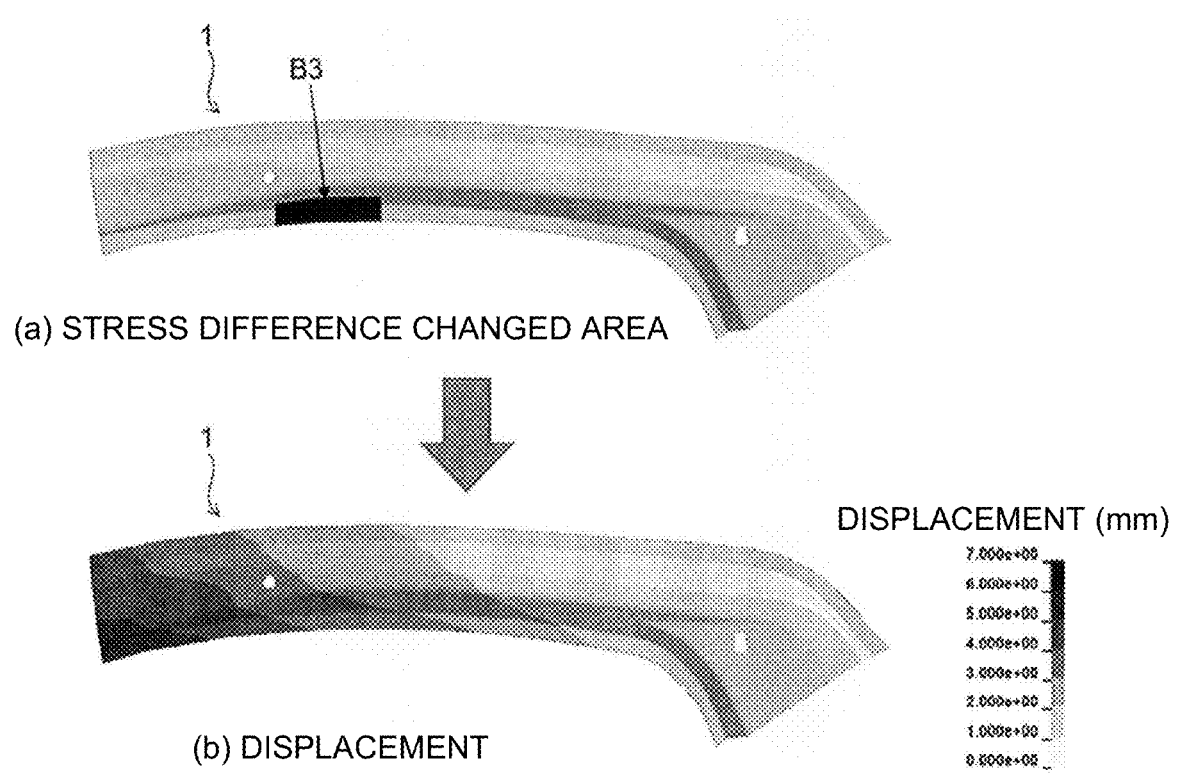

(a) and (b) of FIG. 17 are diagrams illustrating, in the first embodiment, an area (a) in which stress difference is changed and displacement (b) calculated by springback analysis by changing the stress difference in the area (No. 6).

Figure 18:
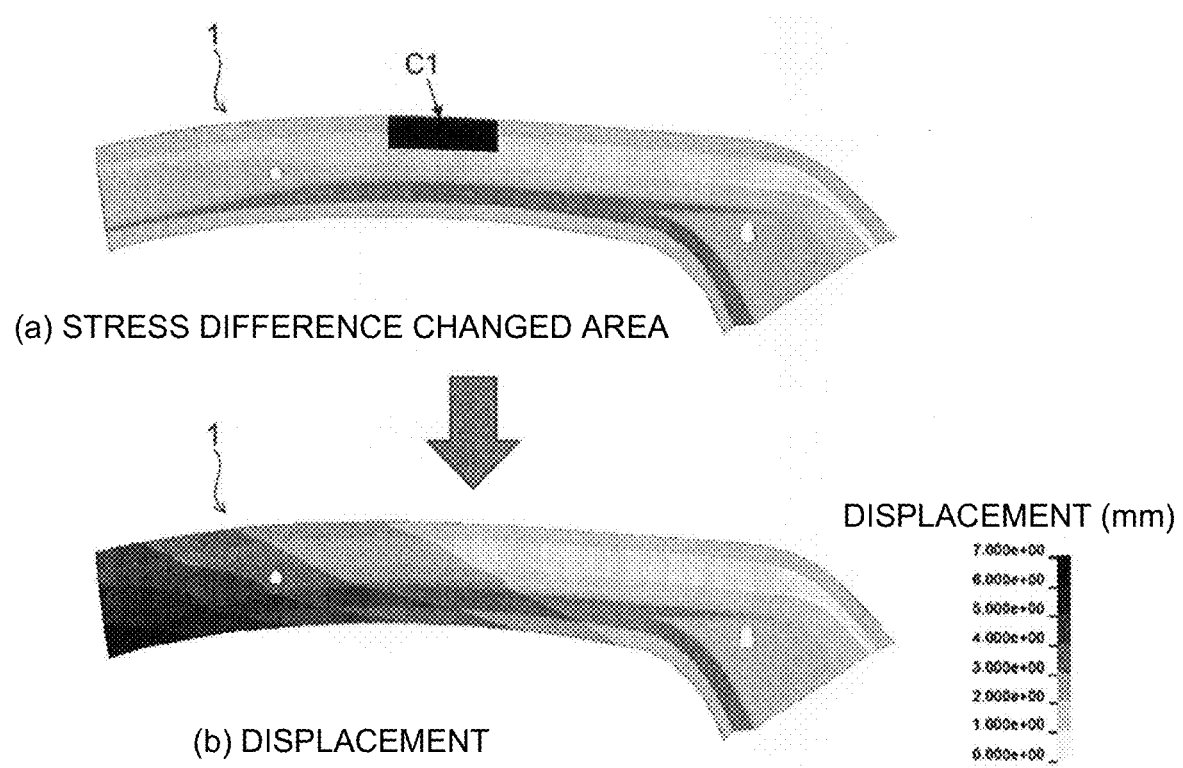

(a) and (b) of FIG. 18 are diagrams illustrating, in the first embodiment, an area (a) in which stress difference is changed and displacement (b) calculated by springback analysis by changing the stress difference in the area (No. 7).

Figure 19:
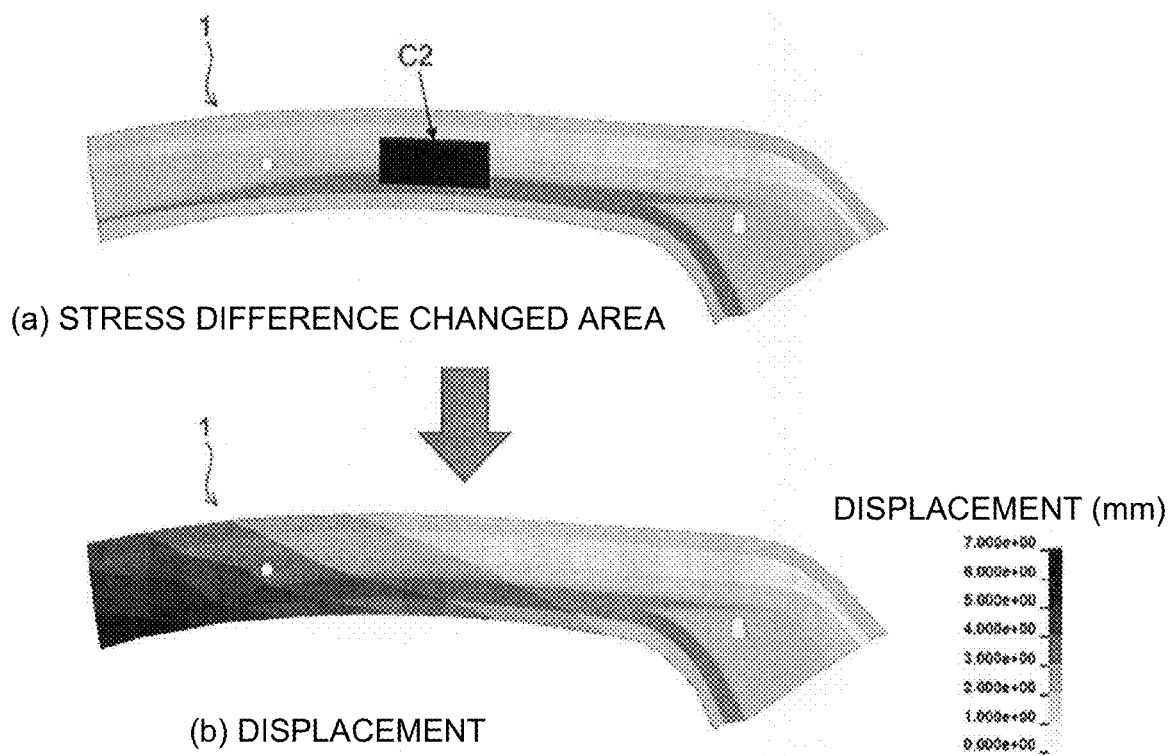

(a) and (b) of FIG. 19 are diagrams illustrating, in the first embodiment, an area (a) in which stress difference is changed and displacement (b) calculated by springback analysis by changing the stress difference in the area (No. 8).

Figure 20:
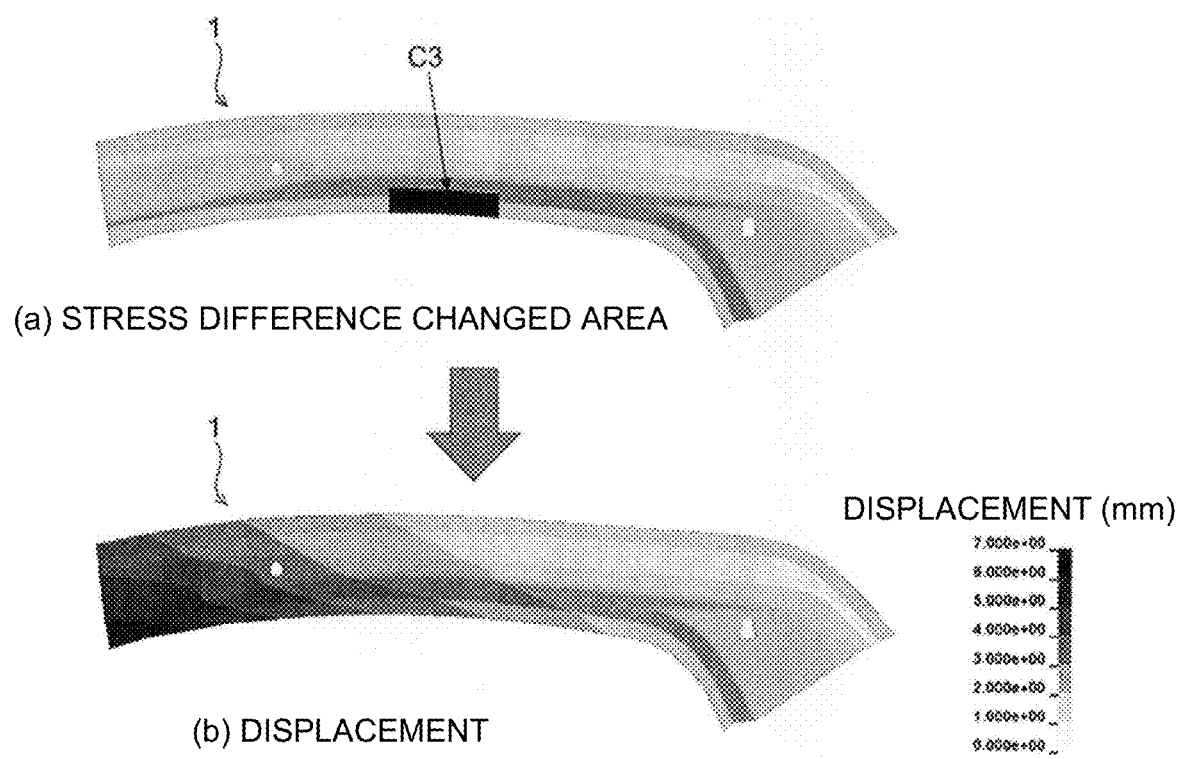

(a) and (b) of FIG. 20 are diagrams illustrating, in the first embodiment, an area (a) in which stress difference is changed and displacement (b) calculated by springback analysis by changing the stress difference in the area (No. 9).

Figure 21:
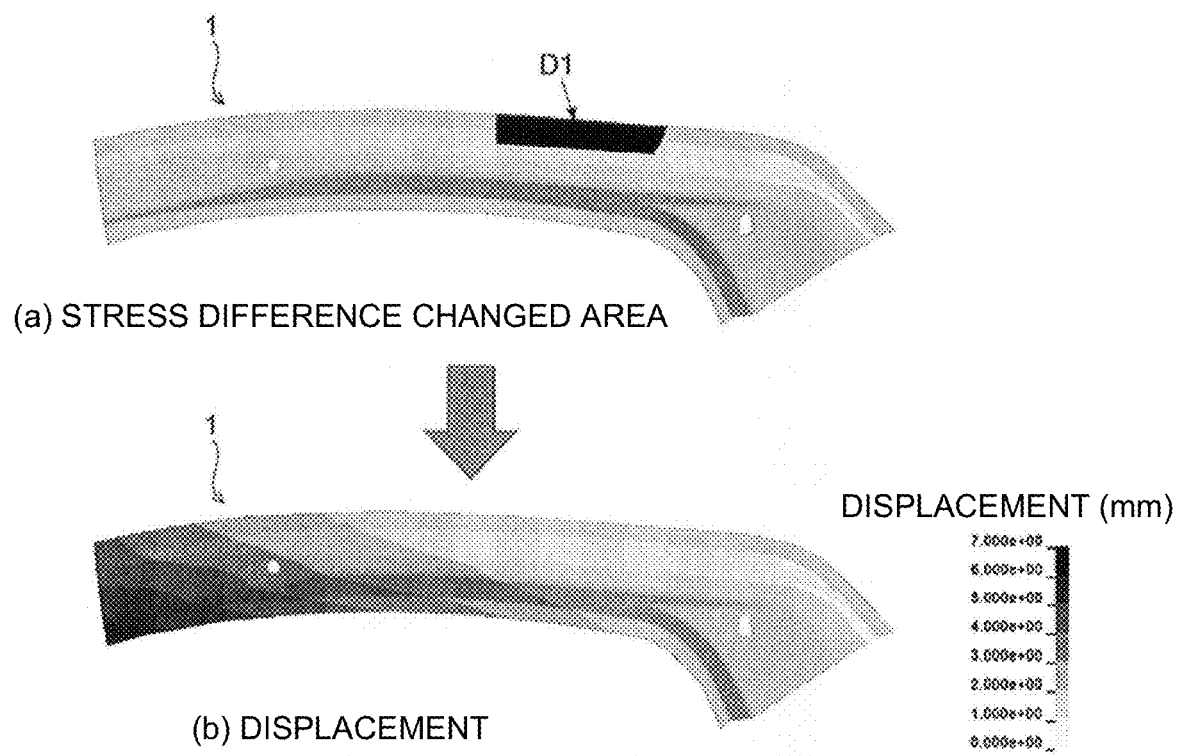

(a) and (b) of FIG. 21 are diagrams illustrating, in the first embodiment, an area (a) in which stress difference is changed and displacement (b) calculated by springback analysis by changing the stress difference in the area (No. 10).

Figure 22:
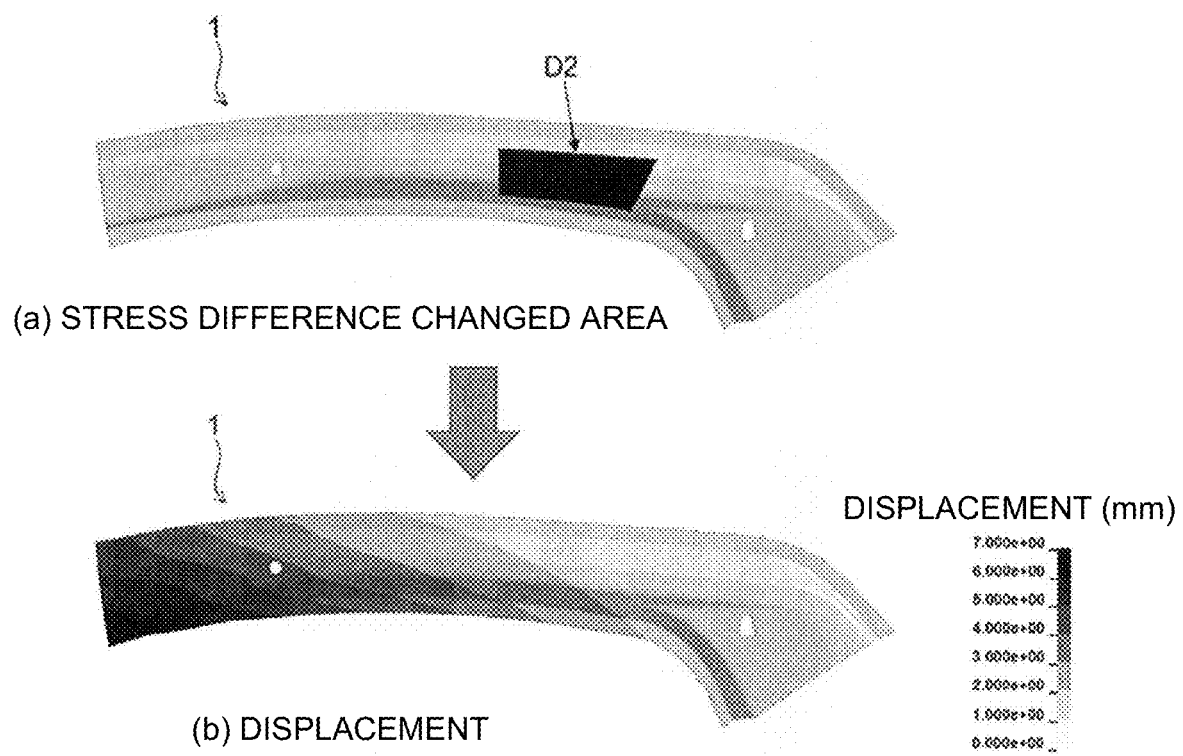

(a) and (b) of FIG. 22 are diagrams illustrating, in the first embodiment, an area (a) in which stress difference is changed and displacement (b) calculated by springback analysis by changing the stress difference in the area (No. 11).

Figure 23:
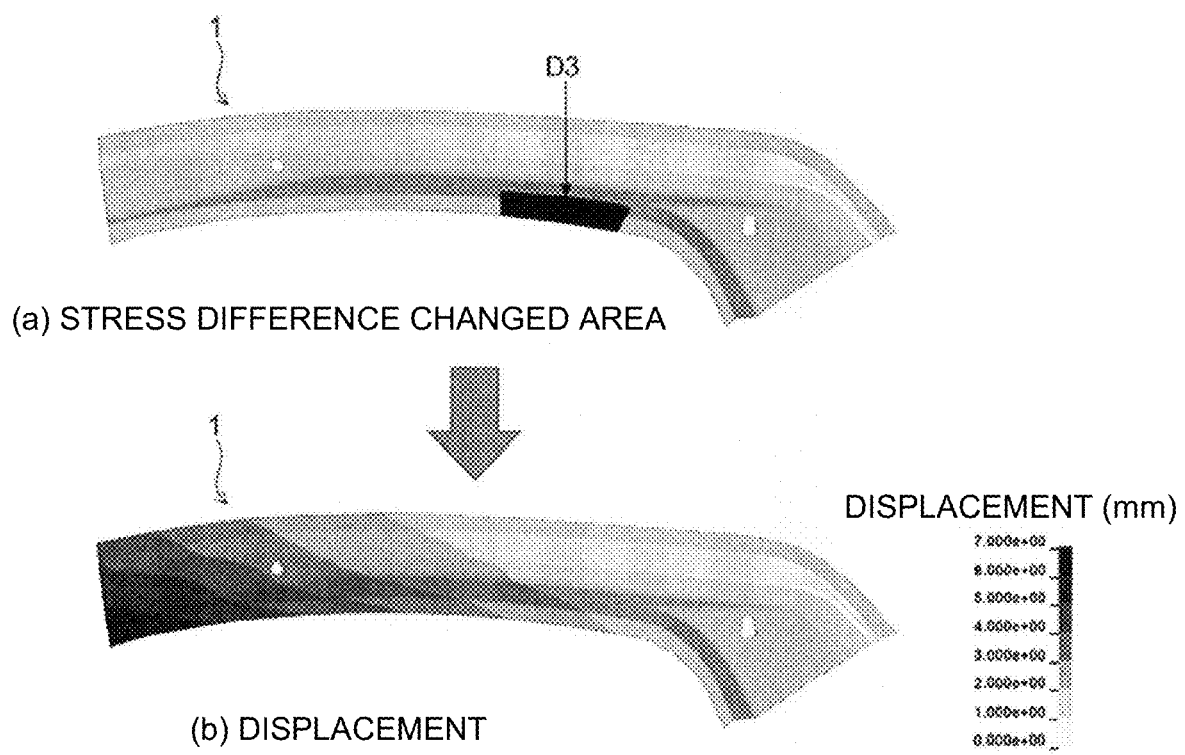

(a) and (b) of FIG. 23 are diagrams illustrating, in the first embodiment, an area (a) in which stress difference is changed and displacement (b) calculated by springback analysis by changing the stress difference in the area (No. 12).

Figure 24:
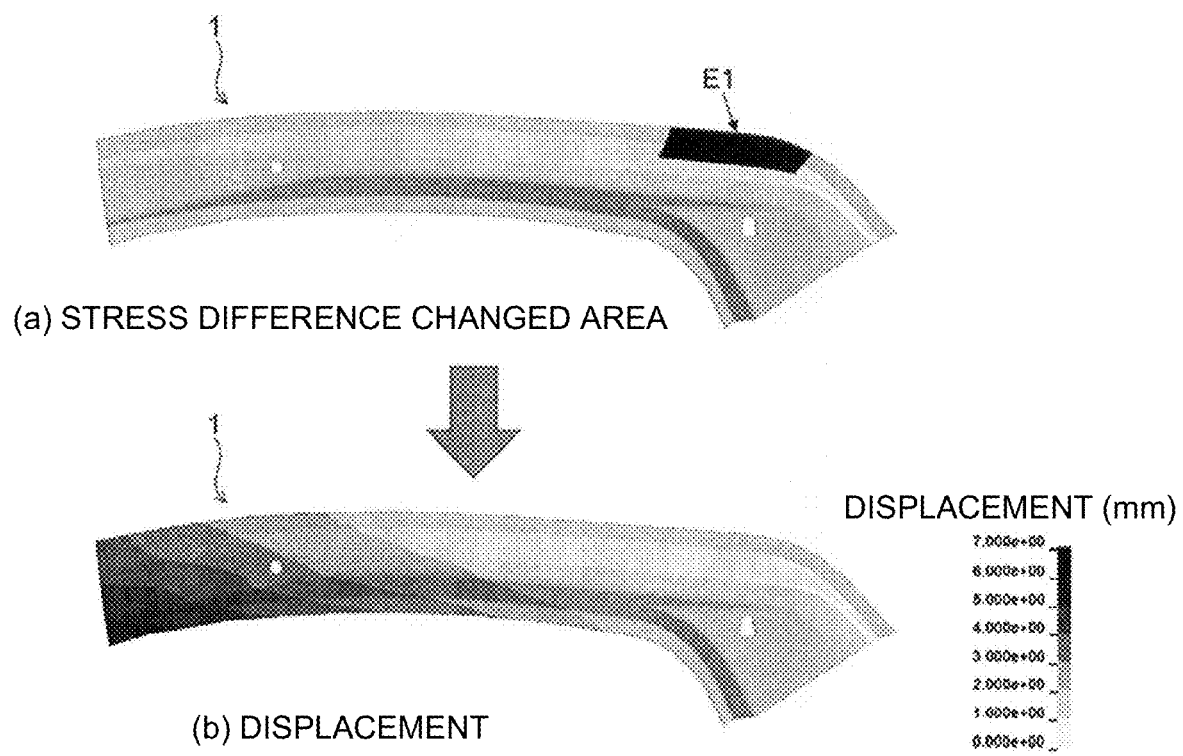

(a) and (b) of FIG. 24 are diagrams illustrating, in the first embodiment, an area (a) in which stress difference is changed and displacement (b) calculated by springback analysis by changing the stress difference in the area (No. 13).

Figure 25:
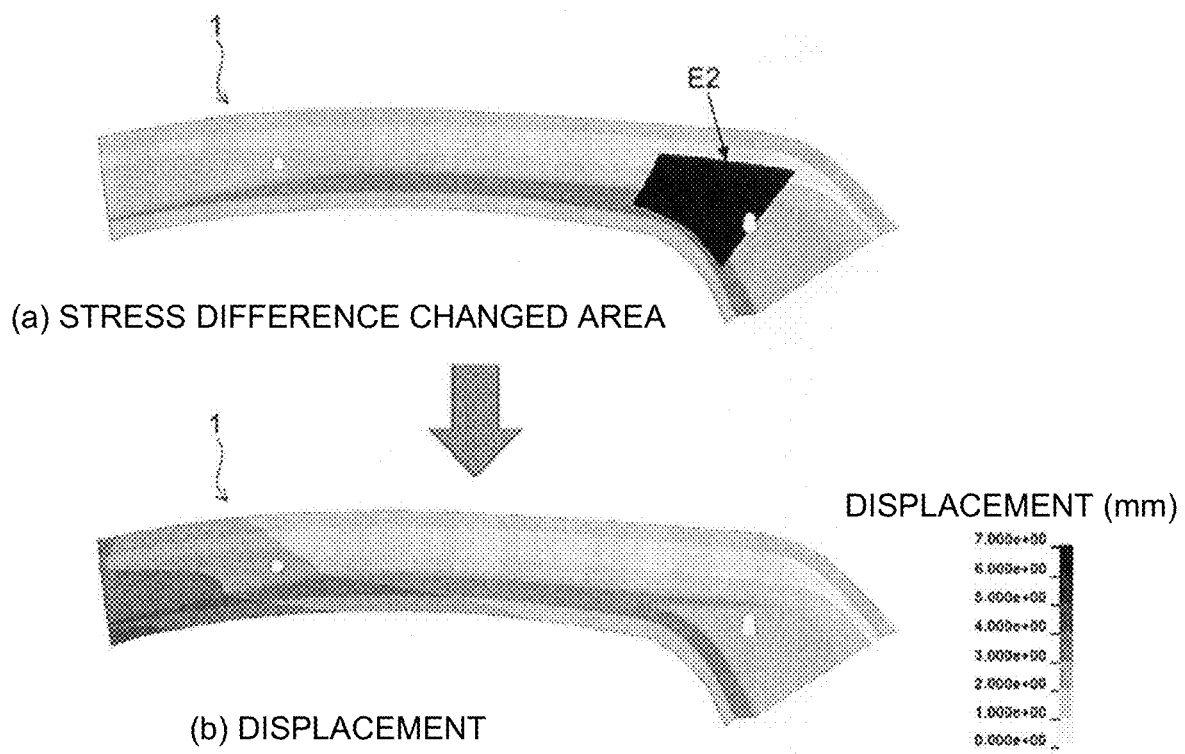

(a) and (b) of FIG. 25 are diagrams illustrating, in the first embodiment, an area (a) in which stress difference is changed and displacement (b) calculated by springback analysis by changing the stress difference in the area (No. 14).

(a) and (b) of FIG. 26 are diagrams illustrating, in the first embodiment, an area (a) in which stress difference is changed and displacement (b) calculated by springback analysis by changing the stress difference in the area (No. 15).

(a) and (b) of FIG. 27 are diagrams illustrating, in the first embodiment, an area (a) in which stress difference is changed and displacement (b) calculated by springback analysis by changing the stress difference in the area (No. 16).

(a) and (b) of FIG. 28 are diagrams illustrating, in the first embodiment, an area (a) in which stress difference is changed and displacement (b) calculated by springback analysis by changing the stress difference in the area (No. 17).

Figure 29:
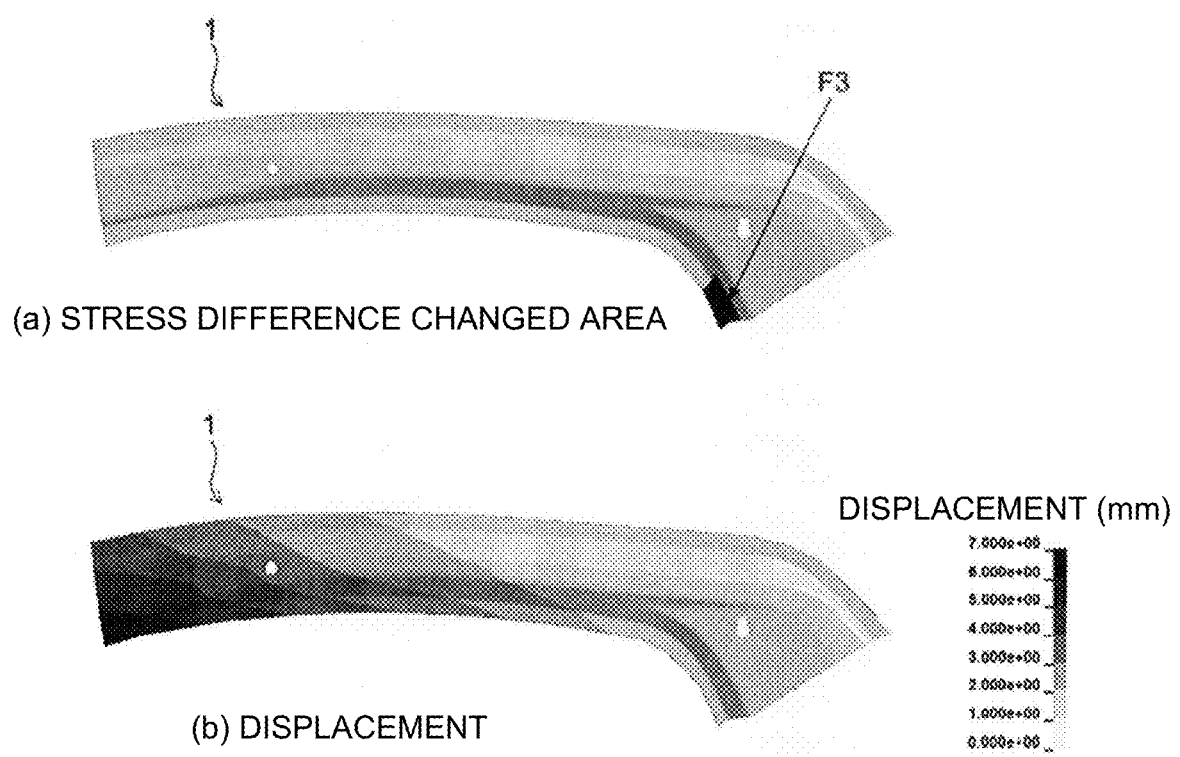

(a) and (b) of FIG. 29 are diagrams illustrating, in the first embodiment, an area (a) in which stress difference is changed and displacement (b) calculated by springback analysis by changing the stress difference in the area (No. 18).

Figure 30:
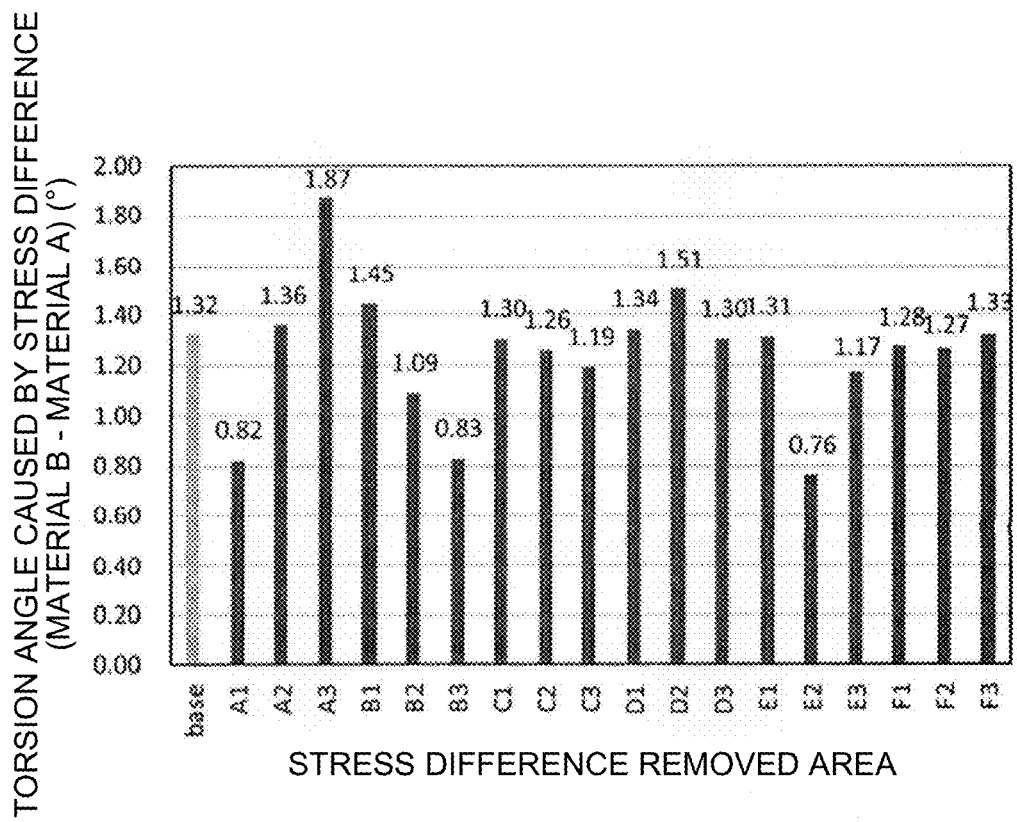

FIG. 30 is a graph illustrating a relation between areas in the press forming part in which stress difference distribution was removed and variation in torsion angle caused by springback when the stress difference was removed in the first embodiment.

Figure 31:
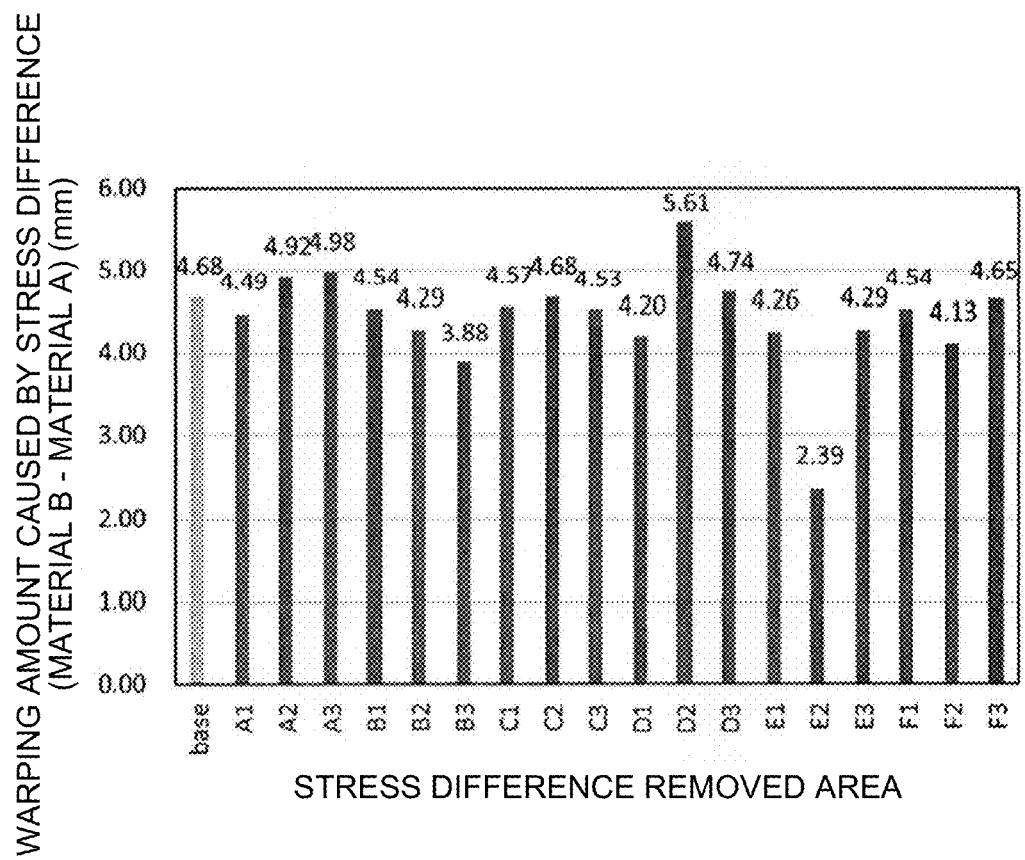

FIG. 31 is a graph illustrating a relation between the areas in which the stress difference distribution was removed and variation in warping amount caused by springback when the stress difference was removed in the first embodiment.

Figure 32:
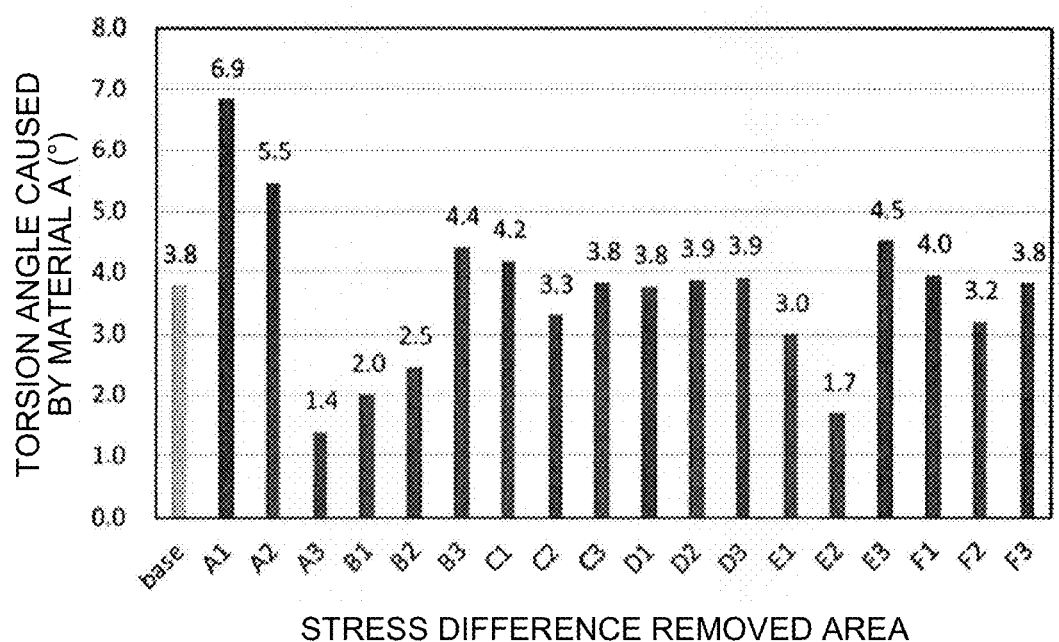

FIG. 32 is a graph illustrating, as an example of a result of analyzing a portion that is a cause of generation of springback by conventional technology, a relation between areas in which stress distribution at the press forming bottom dead center was changed and torsion angles caused by springback when the stress distribution was changed.

(a) and (b) of FIG. 33 are diagrams illustrating an area (a) in which the stress distribution at the press forming bottom dead center under the press forming conditions of the material B is replaced with the stress distribution at the press forming bottom dead center under the press forming conditions of the material A and displacement (b) when springback analysis was performed by replacing the stress distribution (No. 1).

Figure 34:
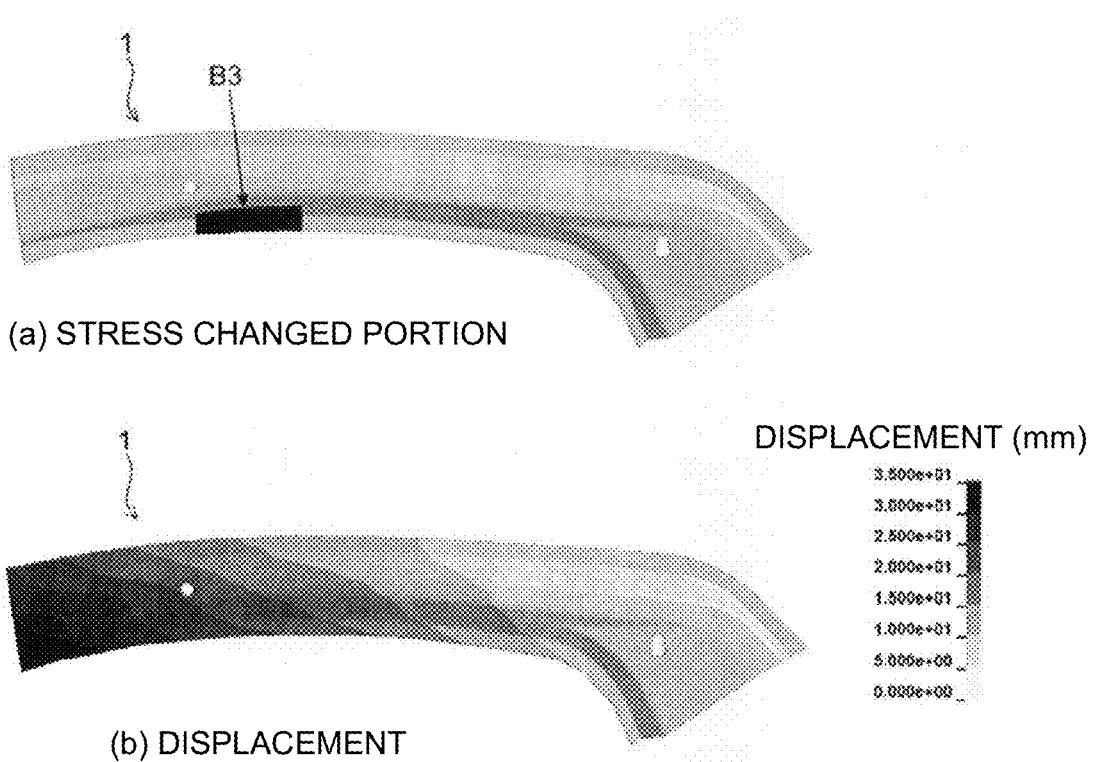

(a) and (b) of FIG. 34 are diagrams illustrating an area (a) in which the stress distribution at the press forming bottom dead center under the press forming conditions of the material B is replaced with the stress distribution at the press forming bottom dead center under the press forming conditions of the material A and displacement (b) when springback analysis was performed by replacing the stress distribution (No. 2).

(a) and (b) of FIG. 35 are diagrams illustrating an area (a) in which the stress distribution at the press forming bottom dead center under the press forming conditions of the material B is replaced with the stress distribution at the press forming bottom dead center under the press forming conditions of the material A and displacement (b) when springback analysis was performed by replacing the stress distribution (No. 3).

(a) and (b) of FIG. 36 are diagrams illustrating an area (a) in which the stress distribution at the press forming bottom dead center under the press forming conditions of the material B is replaced with the stress distribution at the press forming bottom dead center under the press forming conditions of the material A and displacement (b) when springback analysis was performed by replacing the stress distribution (No. 4).

Figure 37:
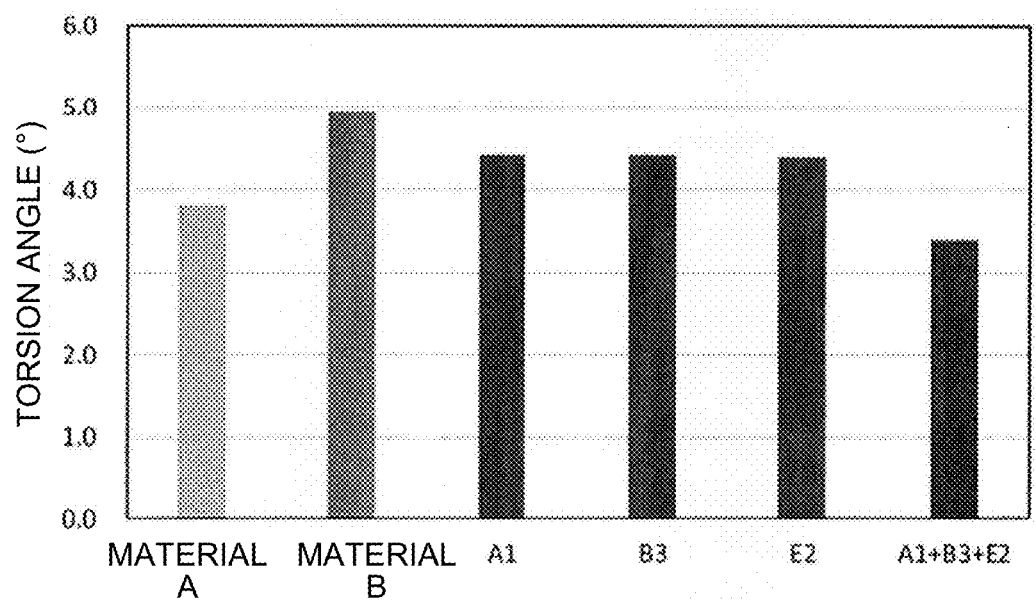

FIG. 37 is a graph illustrating a relation between areas in which the stress distribution at the press forming bottom dead center under the press forming conditions of the material B is replaced with stress distribution at the press forming bottom dead center under the press forming conditions of the material A and torsion angles caused by springback when the stress distribution was changed.

Figure 38:
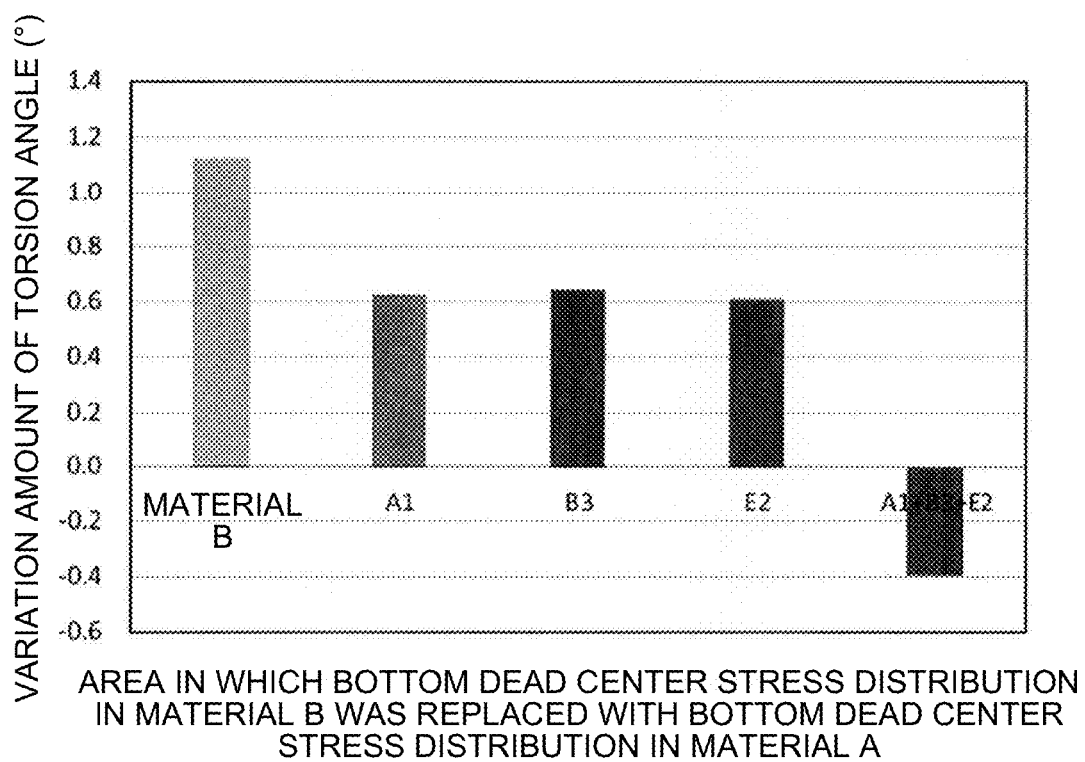

FIG. 38 is a graph illustrating a relation between areas in which the stress distribution at the press forming bottom dead center under the press forming conditions of the material B is replaced with the stress distribution at the press forming bottom dead center under the press forming conditions of the material A and variation in torsion angle caused by springback when the stress distribution was changed.

Figure 39:
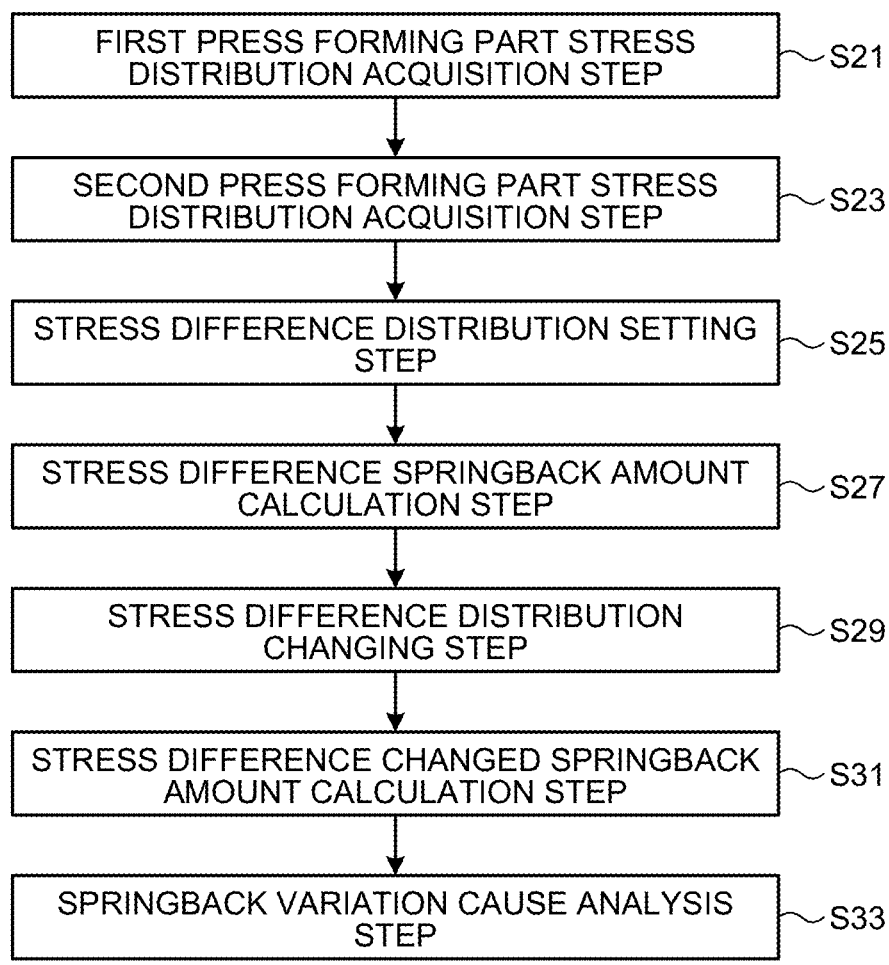

FIG. 39 is a flowchart illustrating the flow of processing in a springback variation cause analysis method according to the second embodiment.

Figure 40:
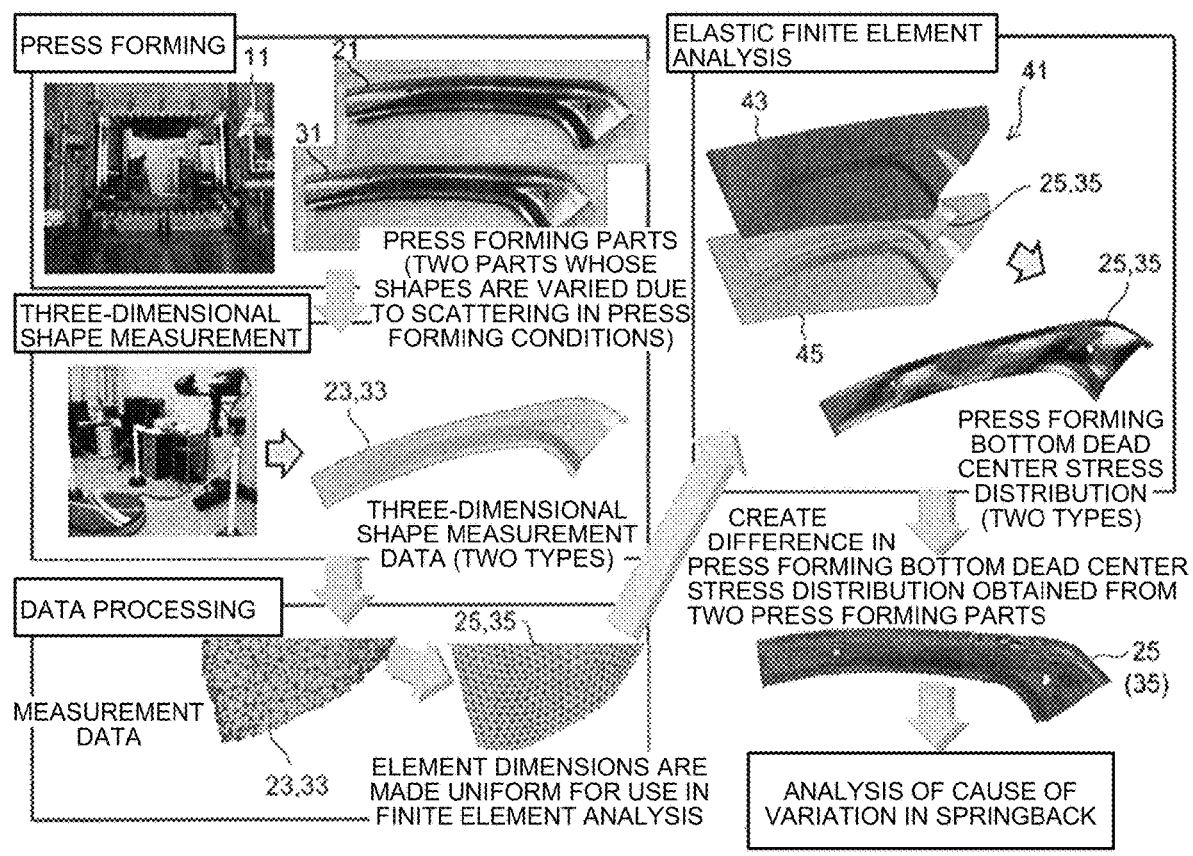

FIG. 40 is a diagram for describing the processing in the springback variation cause analysis method according to the second embodiment.

Figure 41:
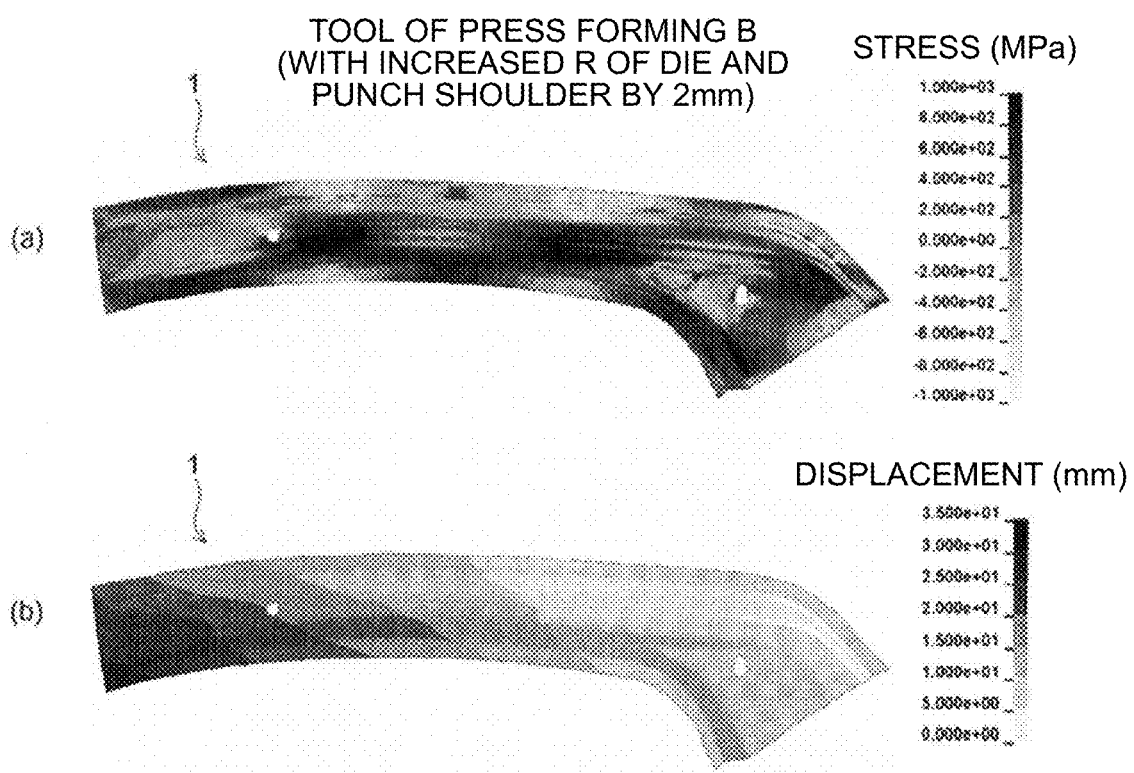

(a) and (b) of FIG. 41 are diagrams illustrating, in an example, stress distribution (a) at the press forming bottom dead center calculated by press forming analysis under press forming conditions (tool of press forming B) in which the shape of a tool of press forming was different and displacement (b) calculated by springback analysis based on the stress distribution.

Figure 42:
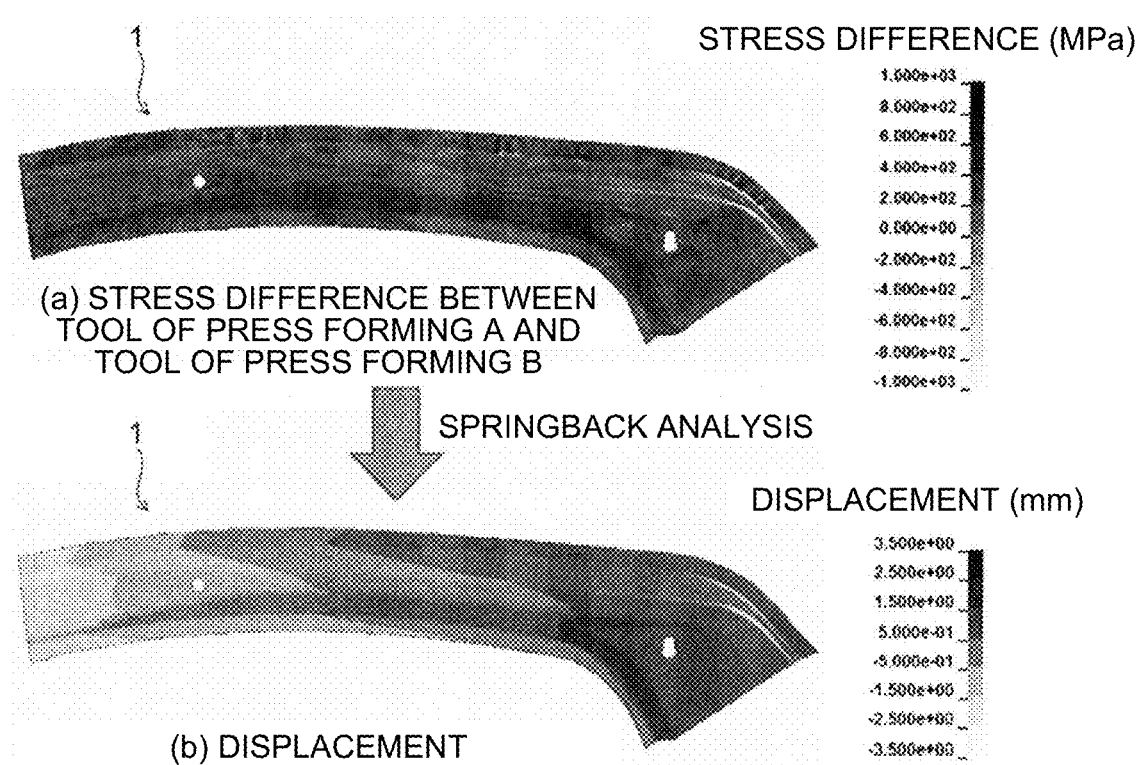

(a) and (b) of FIG. 42 are diagrams illustrating, in the example, difference (a) in stress distribution at the press forming bottom dead center under press forming conditions of a tool of press forming A and the tool of press forming B and displacement (b) calculated by springback analysis based on the difference in stress distribution.

Figure 43:
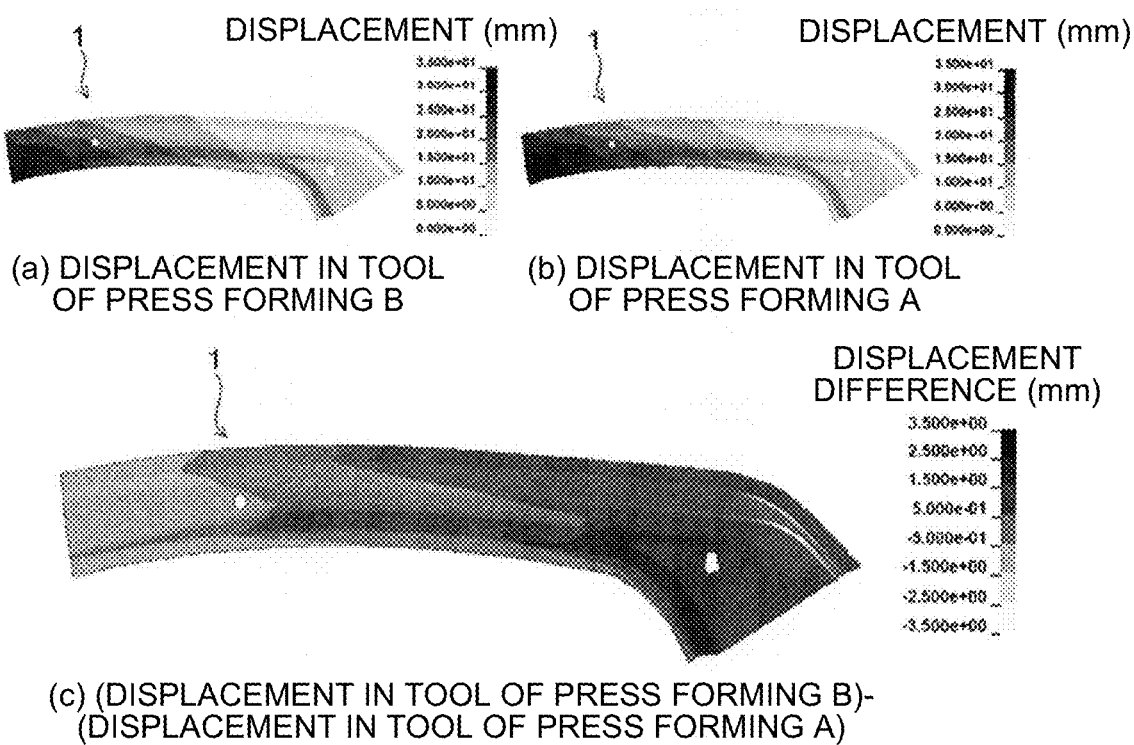

(a) and (b) of FIG. 43 are diagrams illustrating, in the example, displacement calculated by springback analysis under two press forming conditions (tool of press forming B and tool of press forming A) in which the shapes of the tools of press forming were different, and displacement difference ((a): displacement after springback with tool of press forming B, (b) displacement after springback with tool of press forming A, and (c) displacement difference after springback between tool of press forming B and tool of press forming A).

Figure 44:
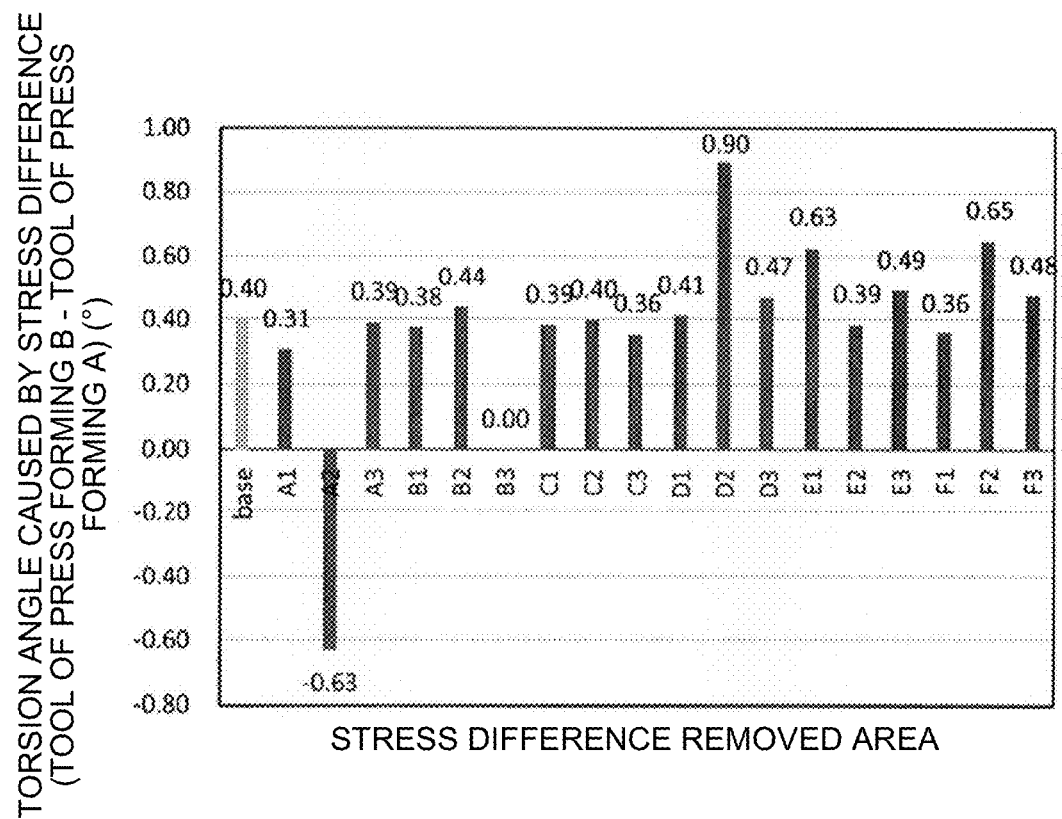

FIG. 44 is a graph illustrating, in the example, a relation between areas in which stress difference distribution was removed and variation in torsion angle caused by springback when the stress difference was removed in the case where there was scattering among the shapes of tools of press forming.

Figure 45:
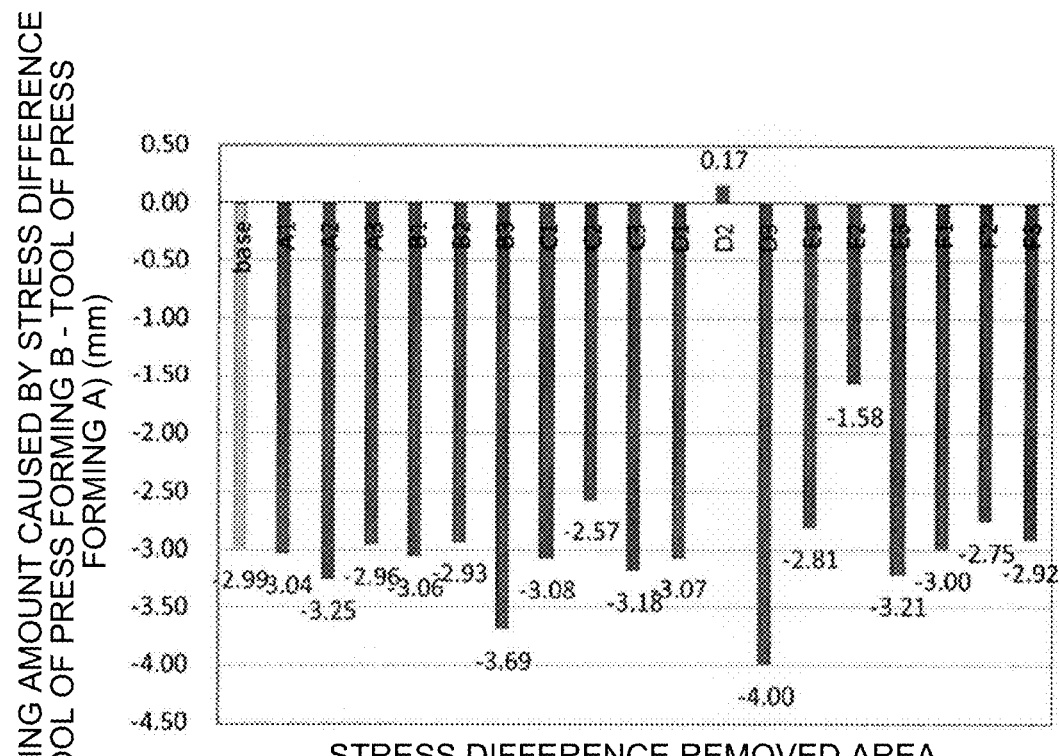

FIG. 45 is a graph illustrating, in the example, a relation between areas in which stress difference distribution was removed and variation in warping amount caused by springback when the stress difference was removed in the case where there was scattering in the shapes of tools of press forming.

Figure 46:
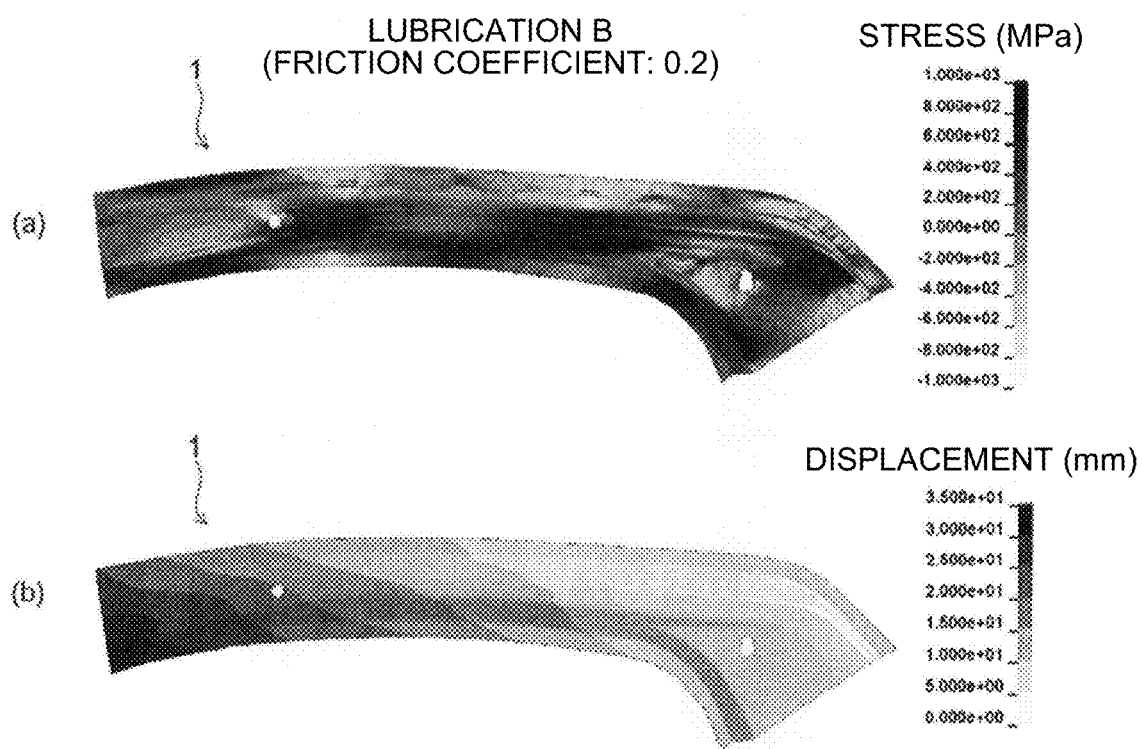

(a) and (b) of FIG. 46 are diagrams illustrating, in the example, stress distribution (a) at the press forming bottom dead center calculated by press forming analysis under press forming conditions (lubrication B) in which the amount of lubricant was different and displacement (b) calculated by springback analysis based on the stress distribution.

Figure 47:
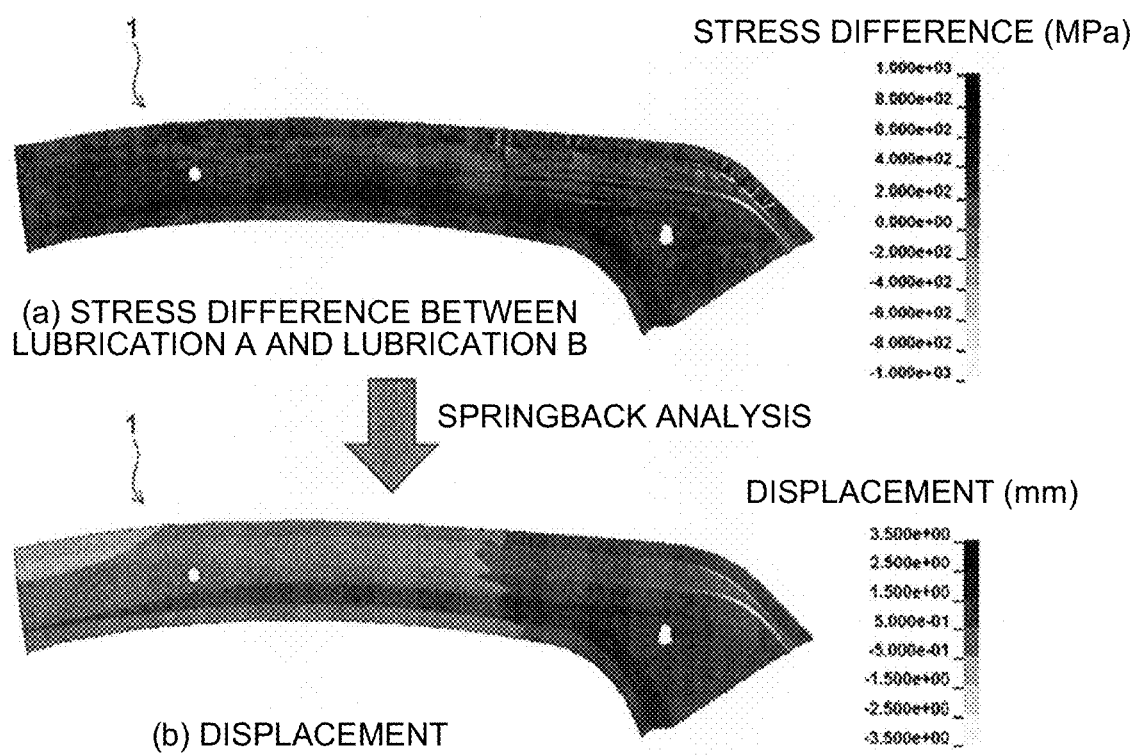

(a) and (b) of FIG. 47 are diagrams illustrating, in the example, difference (a) in stress distribution at the press forming bottom dead center under press forming conditions of lubrication A and the lubrication B and displacement (b) calculated by springback analysis based on the difference in stress distribution.

Figure 48:
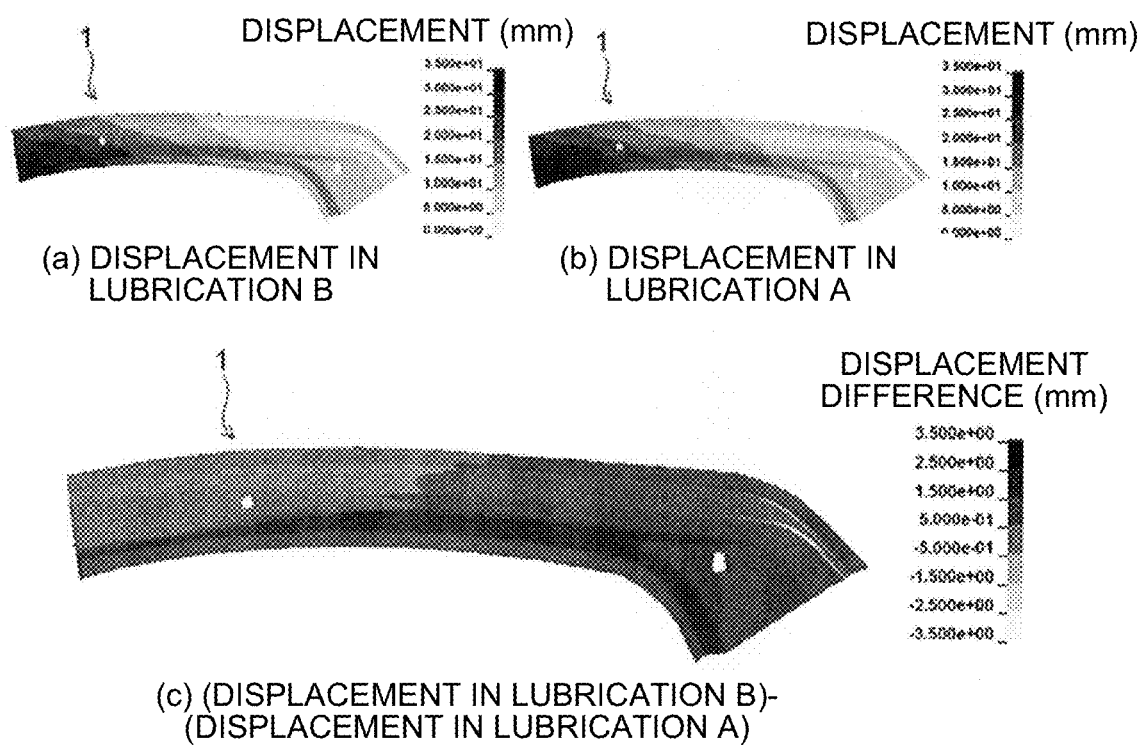

(a), (b) and (c) of FIG. 48 are diagrams illustrating, in the example, displacement calculated by springback analysis under two press forming conditions (lubrication B and lubrication A) in which the amounts of lubricant were different, and displacement difference ((a): displacement after springback with lubrication B, (b) displacement after springback with lubrication A, and (c) displacement difference after springback between lubrication B and lubrication A).

Figure 49:
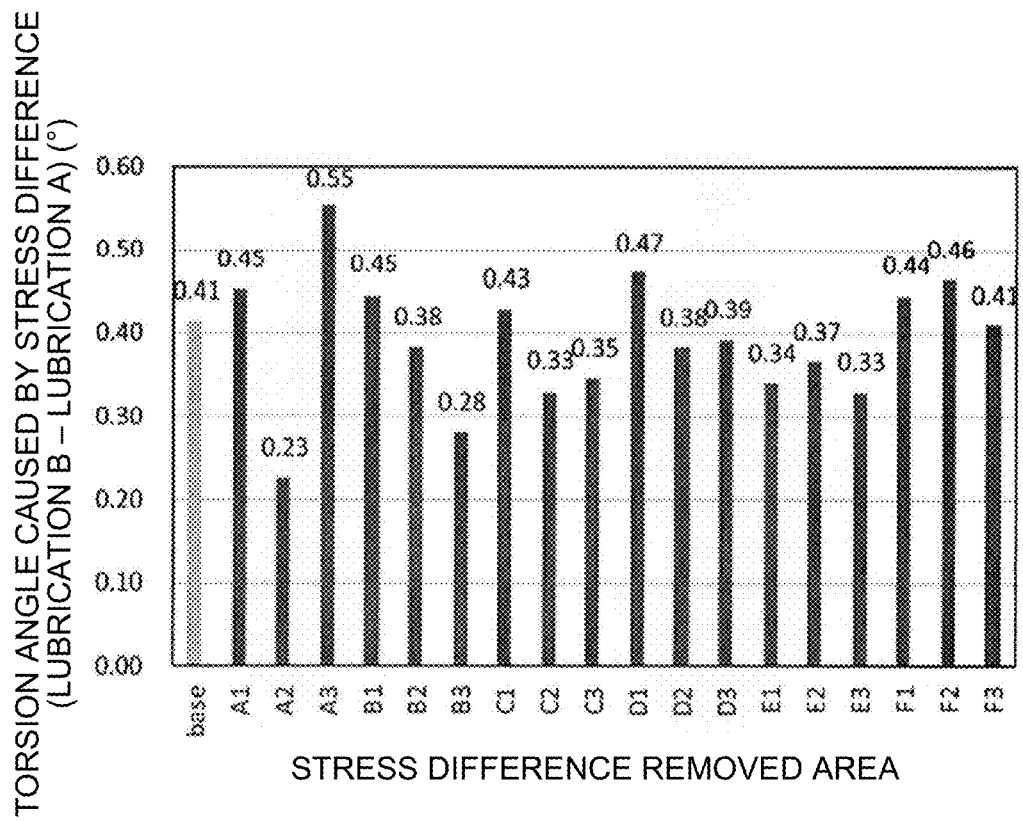

FIG. 49 is a graph illustrating, in the example, a relation between areas in which stress difference distribution was removed and variation in torsion angle caused by springback when the stress difference was removed in the case where there was scattering in lubricating conditions.

Figure 50:
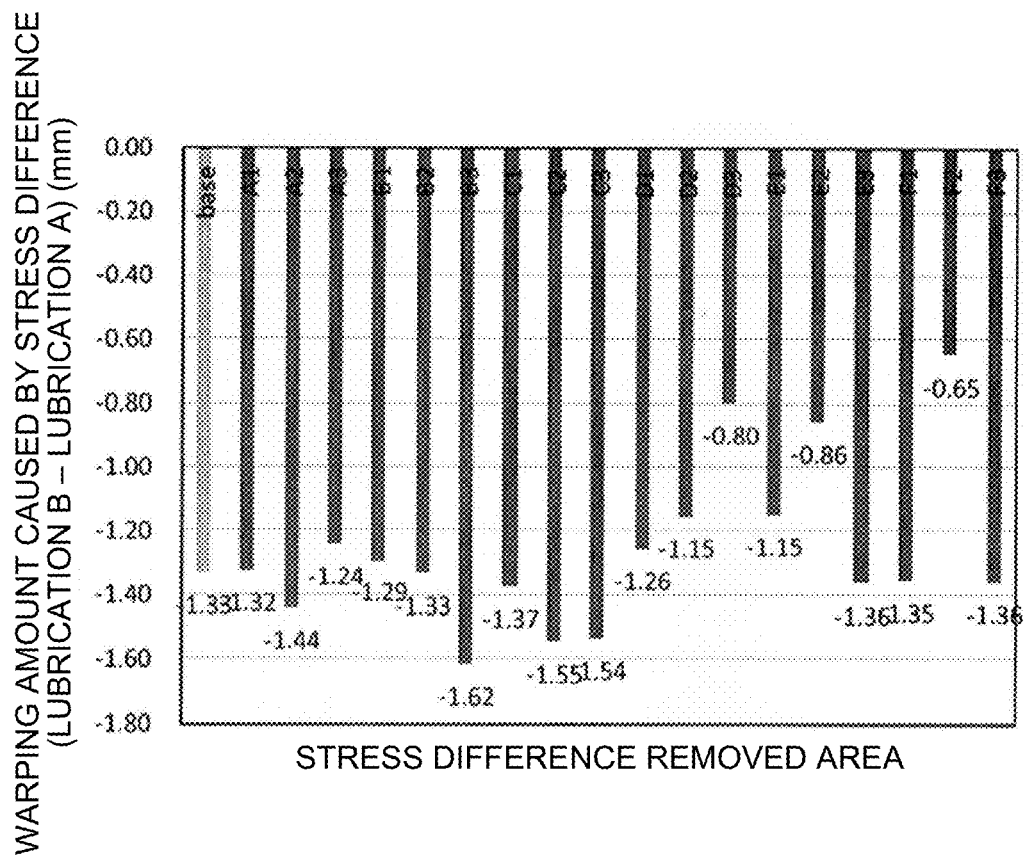

FIG. 50 is a graph illustrating, in the example, a relation between the areas in which the stress difference distribution was removed and variation in warping amount caused by springback when the stress difference was removed in the case where there was scattering in lubricating conditions.

Figure 51:
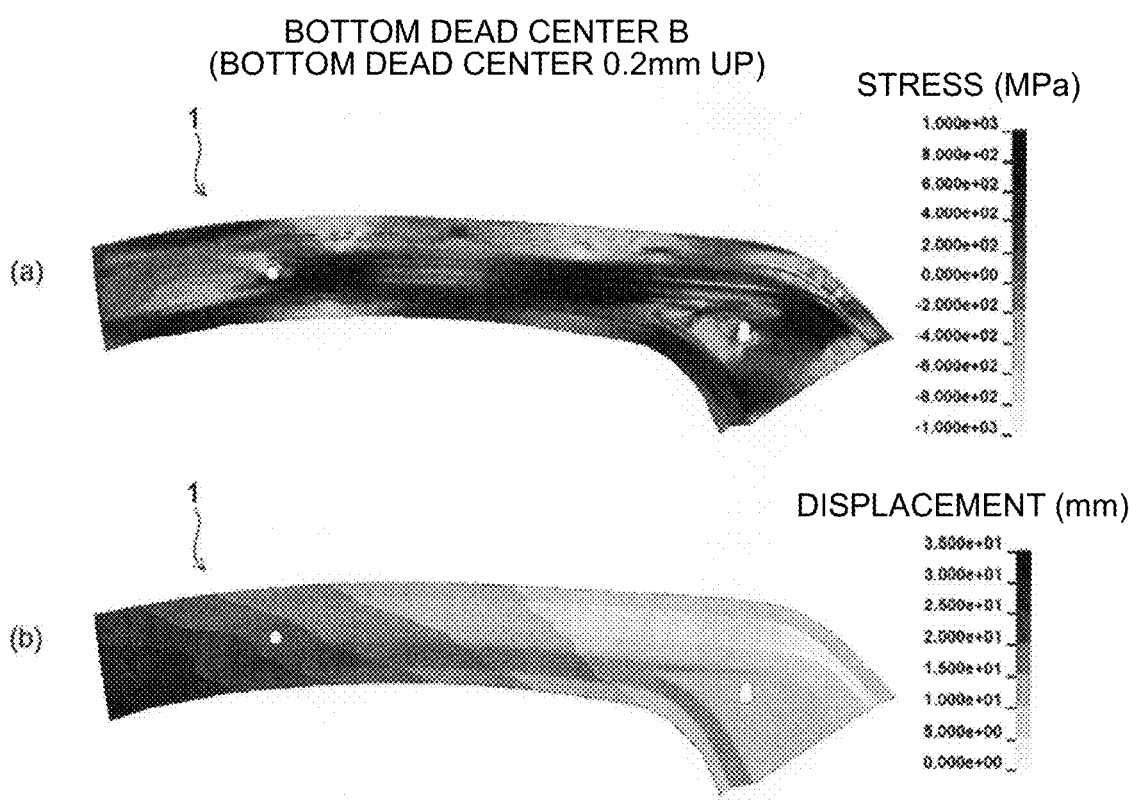

(a) and (b) of FIG. 51 are diagrams illustrating, in the example, stress distribution (a) at the press forming bottom dead center calculated by press forming analysis under press forming conditions (a bottom dead center B) in which the position of the press forming bottom dead center was different and displacement (b) calculated by springback analysis based on the stress distribution.

Figure 52:
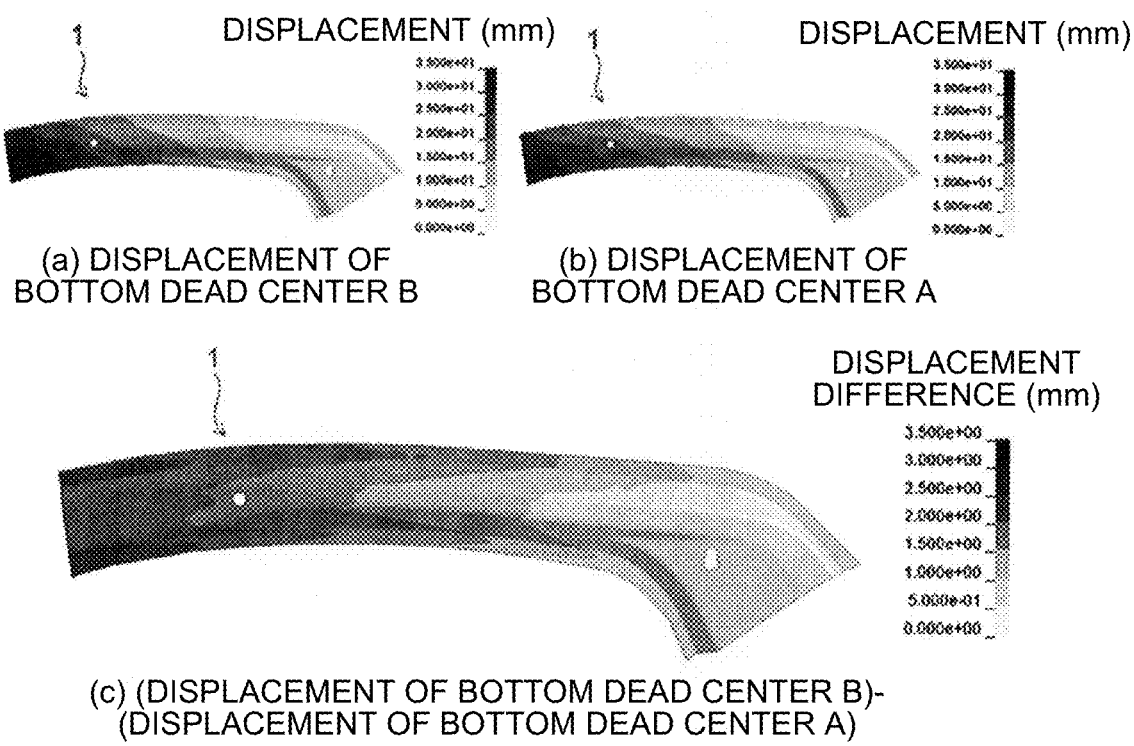

(a), (b) and (c) of FIG. 52 are diagrams illustrating, in the example, displacement calculated by springback analysis under two press forming conditions (the bottom dead center B and a bottom dead center A) in which the press forming bottom dead center positions were different, and displacement difference ((a): displacement after springback at the bottom dead center B, (b) displacement after springback at the bottom dead center A, and (c) displacement difference after springback between the bottom dead center B and the bottom dead center A).

Figure 53:
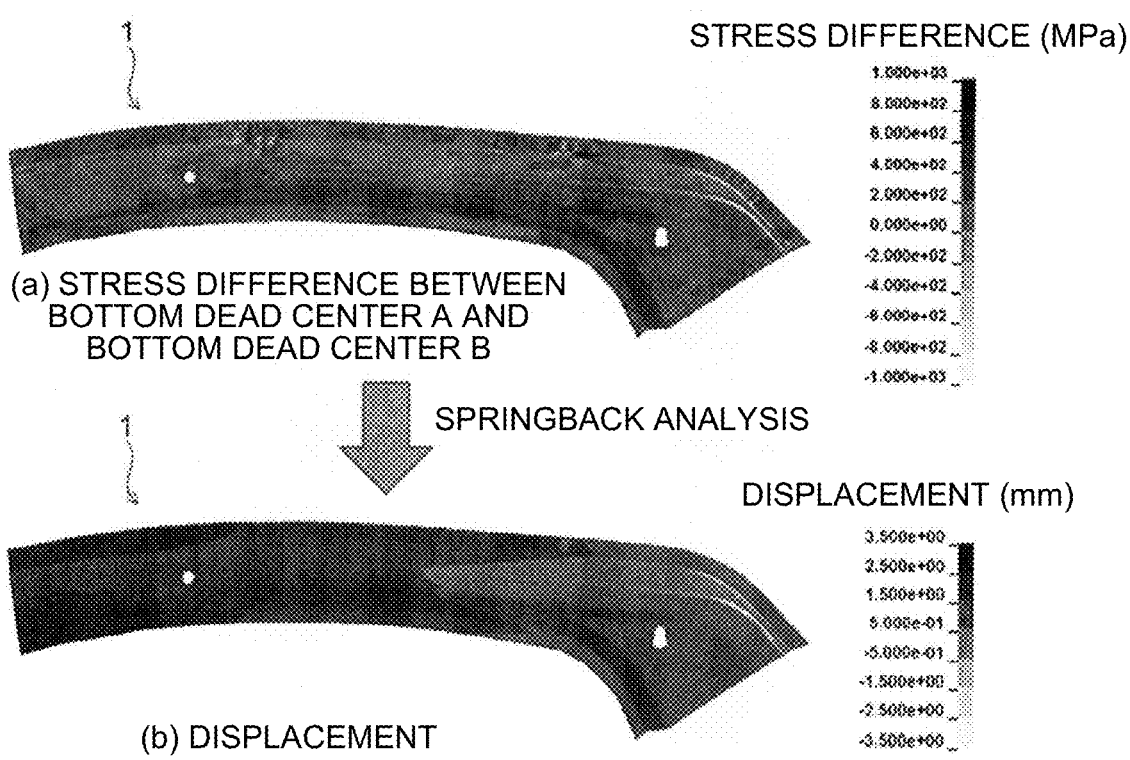

(a) and (b) of FIG. 53 are diagrams illustrating, in the example, difference (a) in stress distribution at the press forming bottom dead center under the press forming conditions of the bottom dead center A and the bottom dead center B and displacement (b) calculated by springback analysis based on the difference in stress distribution.

Figure 54:
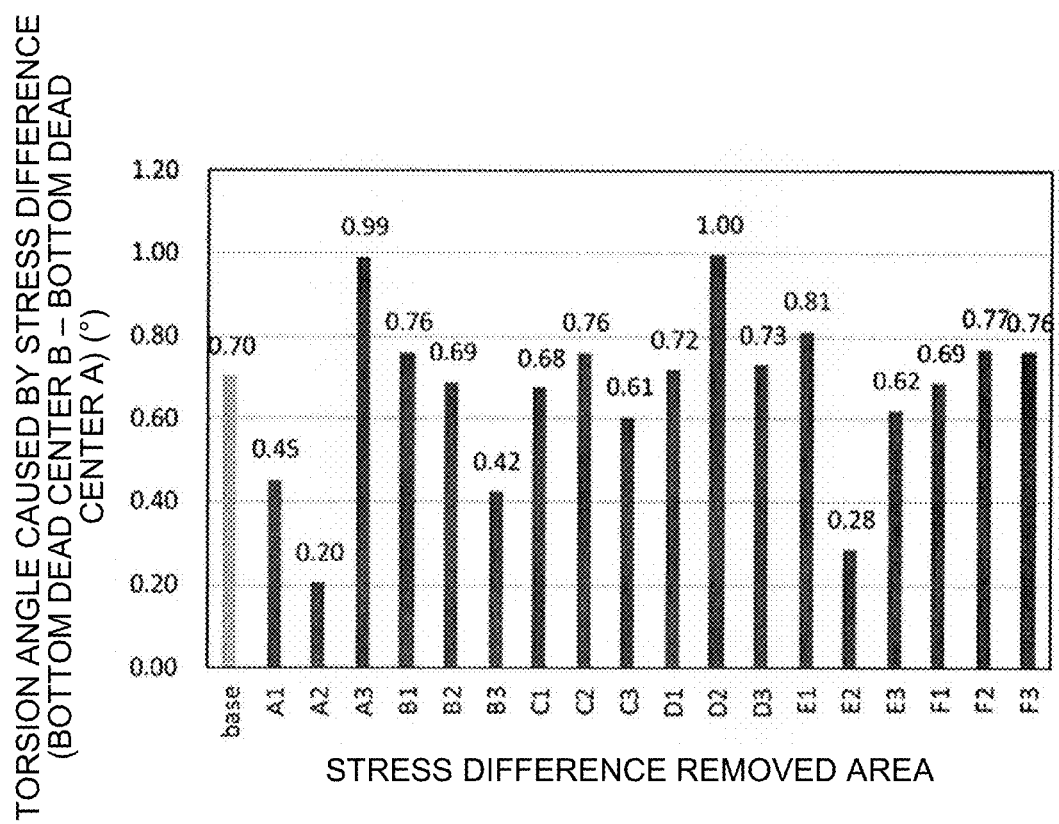

FIG. 54 is a graph illustrating, in the example, a relation between areas in which stress difference distribution was removed and variation in torsion angle caused by springback when the stress difference was removed in the case where there was scattering in position of the press forming bottom dead center.

Figure 55:
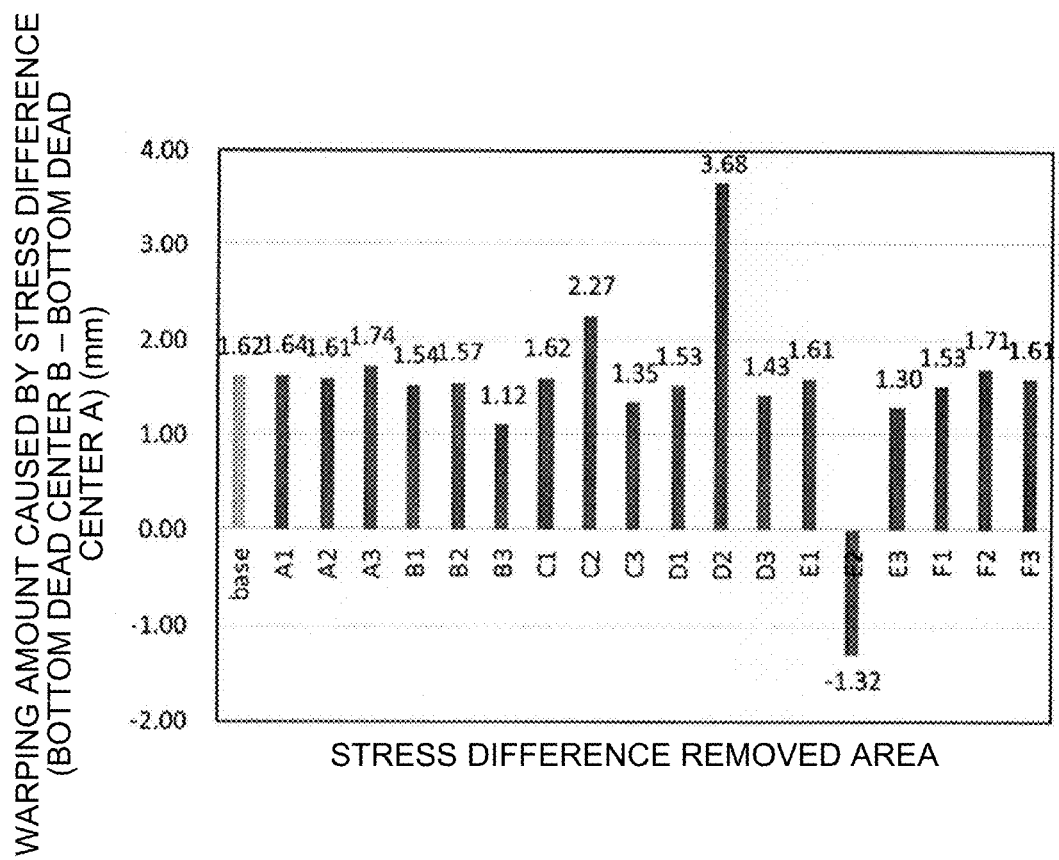

FIG. 55 is a graph illustrating, in the example, a relation between the areas in which the stress difference distribution was removed and variation in warping amount caused by springback when the stress difference was removed in the case where there was scattering in position of the press forming bottom dead center.

DETAILED DESCRIPTION OF EMBODIMENTS OF THE INVENTION

Prior to describing a springback variation cause analysis method according to embodiments of the present invention, the process to reach the present invention is first described.

<Process to Reach Present Invention>

Figure 2:
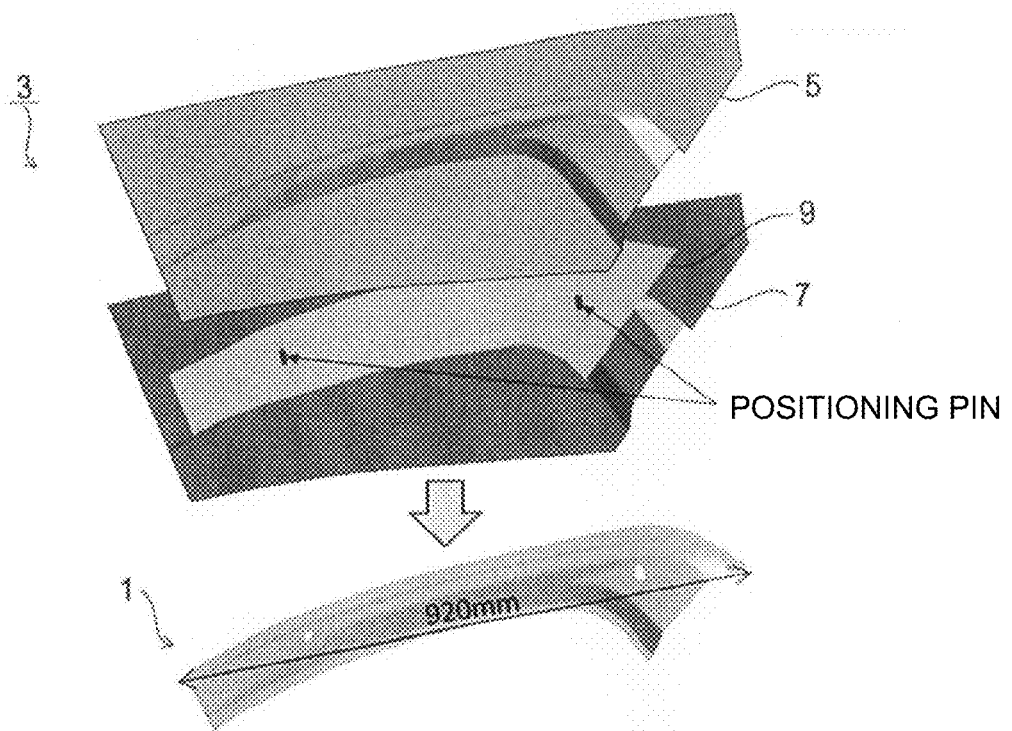
FIG. 2 is a diagram for describing press forming analysis in the first embodiment.

In press forming of a press forming part 1 as exemplified in FIG. 2, variation may occur in springback amount after die release of the press forming part 1 due to scattering or variation in press forming conditions, such as variation in properties of press forming metallic sheets. A portion that is a cause of the variation in springback amount due to scattering or variation in press forming conditions may be different from a portion that is a cause of the generation of springback itself. Thus, there is a problem in that even when springback is reduced by taking some countermeasures on the shapes of tools of press forming and press forming conditions, the variation in springback amount due to scattering or variation in press forming conditions cannot be reduced.

The inventor of the present invention diligently made a study for solving such a problem. As a result, the inventor of the present invention thought that a cause of variation in springback in press forming parts press formed under two different press forming conditions (first press forming conditions and second press forming conditions) as scattering or variation in press forming conditions is due to difference between stress distribution at the press forming bottom dead center in a press forming part 1 press formed under the first press forming conditions and stress distribution at the press forming bottom dead center in a press forming part 1 press formed under the second press forming conditions.

To verify the adequacy of the thought, in regard to two press forming conditions (hereinafter, of two press forming conditions, first press forming conditions are referred to as "material A" and second press forming conditions are referred to as "material B") in which material strengths of press forming metallic sheets have scattering as illustrated in Table 1, press forming analysis on a press forming part 1 having a hat cross-sectional shape illustrated in FIG. 2 was performed to calculate stress distribution at the press forming bottom dead center, and further, displacement caused by springback was calculated by springback analysis using the stress distribution to determine difference in displacement under the two press forming conditions. Note that "material B" illustrated in Table 1 has the material strength of the press forming metallic sheet increased by 15% as compared with "material A".

FIG. 3 and FIG. 4 illustrate analysis results of stress distribution at the press forming bottom dead center calculated under the press forming conditions of the material A and the material B, and displacement caused by springback after die release of the press forming parts press formed under the press forming conditions. FIG. 5 illustrate difference in displacement caused by springback under the two press forming conditions.

TABLE 1

| Press forming conditions | Thickness t [mm] | Material strength | |
| --- | --- | --- | --- |
| | | YP [MPa] | TS [MPa] |
| Material A | 1.4 | 687 | 1011 |
| Material B | 1.4 | 790 | 1163 |

Next, difference between stress distribution at the press forming bottom dead center under the first press forming conditions (material A) and stress distribution at the press forming bottom dead center under the second press forming conditions (material B) determined by the above-mentioned press forming analysis (hereinafter referred to as "stress difference distribution") was calculated, springback analysis was performed by replacing the stress distribution at the press forming bottom dead center under the first press forming conditions with the calculated stress difference distribution, and displacement caused by springback based on the stress difference distribution was determined. FIG. 6 illustrate stress difference distribution at the press forming bottom dead center under the two press forming conditions, and FIG. 7 illustrate displacement determined by springback analysis based on the stress difference distribution.

As illustrated in FIG. 8, it was confirmed that displacement ((a) of FIG. 8) based on the stress difference distribution at the press forming bottom dead center substantially matched difference ((b) of FIG. 8) in displacement caused by springback in press forming parts press formed under the two press forming conditions of the material A and the material B. In other words, the inventor of the present invention obtained the finding that the stress difference distribution as difference in stress distribution at the press forming bottom dead center under the two press forming conditions is a cause of variation in springback amount due to scattering in press forming conditions, and the stress difference distribution at the press forming bottom dead center under the two press forming conditions can be regarded as driving power for transition from the state after springback under the first press forming conditions to the shape after springback under the second press forming conditions.

As described above, Patent Literature 5 indicates that the stress distribution at the press forming bottom dead center under the first press forming conditions and the stress distribution at the press forming bottom dead center under the second press forming conditions are compared. In the method disclosed in Patent Literature 5, however, when there is an area in which difference between a physical amount determined under the first press forming conditions and a physical amount determined under the second press forming conditions is larger than a predetermined value, arithmetic processing is performed on at least one piece of data on a physical property value or a physical amount under the first press forming conditions in the area in which the difference is larger than the predetermined value, but the difference in physical amount (stress distribution at the press forming bottom dead center) is not calculated for the entire press forming part.

Methods for determining the difference in stress distribution in a press forming part at the press forming bottom dead center are disclosed in Patent Literature 6 and Patent Literature 8. In the method disclosed in Patent Literature 6, however, the difference in stress distribution before and after springback under one kind of press forming conditions, and springback effective stress is calculated. The method disclosed in Patent Literature 8 is to evaluate a change amount before and after countermeasures against springback with respect to difference in stress distribution before and after springback. The change amount of difference in stress distribution corresponds to springback countermeasures, that is, driving power for the change in springback. Thus, neither of the methods disclosed in Patent Literature 6 and Patent Literature 8 has not reached an important viewpoint that difference in stress distribution at the press forming bottom dead center under two different press forming conditions due to scattering or variation in press forming conditions is a cause of variation in springback amount due to scattering in press forming conditions.

A springback variation cause analysis method according to aspects of the present invention was completed through the above-mentioned process. Specific methods are described in the following first embodiment and second embodiment.

First Embodiment

Figure 1:
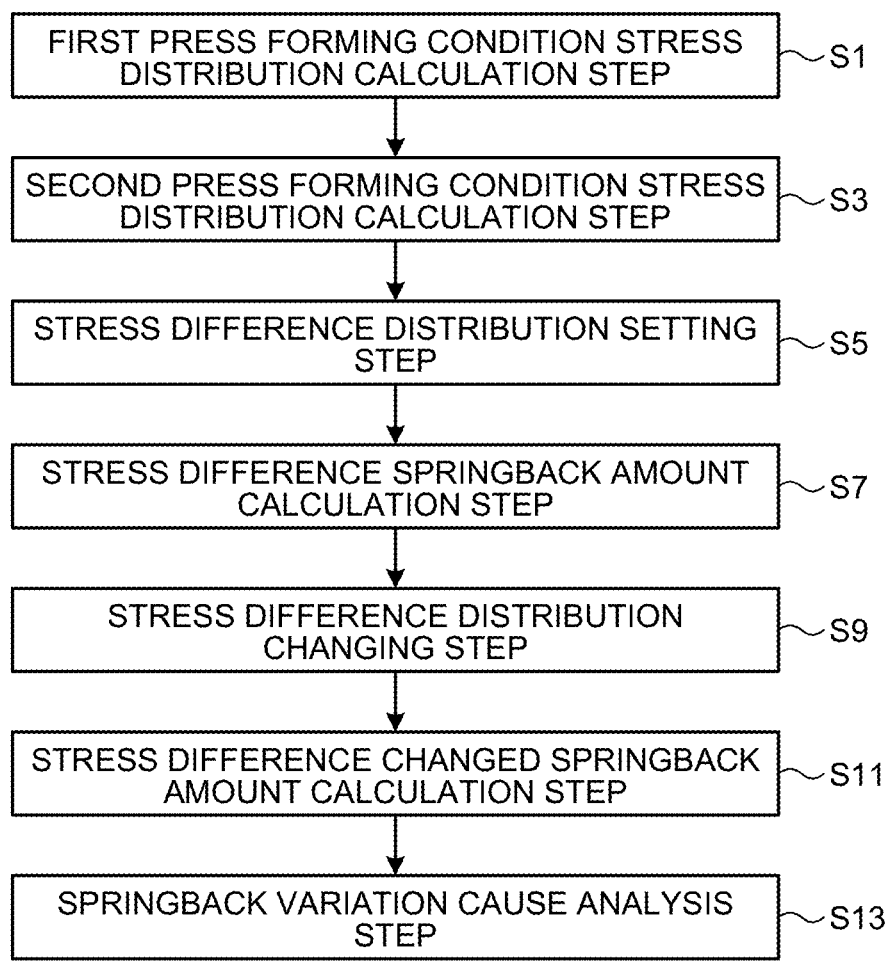
FIG. 1 is a flowchart illustrating the flow of processing in a springback variation cause analysis method according to a first embodiment.

A springback variation cause analysis method according to the first embodiment of the present invention is a method for analyzing, when variation occurs in springback amount in a press forming part due to scattering or variation under press forming conditions, a portion in the press forming part that is a cause of the variation in springback amount, and includes, as illustrated in FIG. 1, a first press forming condition stress distribution calculation step S1, a second press forming condition stress distribution calculation step S3, a stress difference distribution setting step S5, a stress difference springback amount calculation step S7, a stress difference distribution changing step S9, a stress difference changed springback amount calculation step S11, and a springback variation cause analysis step S13.

In the following, the above-mentioned steps are described by taking an example in which there is scattering in material strength of 980 MPa grade GA steel sheet as the press forming metallic sheet illustrated in Table 1 in the press forming of the press forming part 1 having a hat cross-sectional shape illustrated in FIG. 2.

<First Press Forming Condition Stress Distribution Calculation Step>

The first press forming condition stress distribution calculation step S1 is a step for performing press forming analysis under first press forming conditions, which are set in advance as scattering or variation in press forming conditions, and calculating stress distribution in the press forming part 1 at the press forming bottom dead center.

In the first embodiment, the material strengths of material A illustrated in Table 1 were set as the first press forming conditions. As illustrated in FIG. 2, the press forming analysis at the first press forming condition stress distribution calculation step S1 is performed such that a blank model 9 as a press forming metallic sheet (steel sheet) is sandwiched by a tool of press forming model 3 consisting a die 5 and a punch 7, and as illustrated in (a) of FIG. 3, the stress distribution in the press forming part 1 at the press forming bottom dead center is calculated. In the press forming analysis, the blank model 9 was fixed by positioning pins in the course of press forming as illustrated in FIG. 2, and the element size of the blank model 9 was about 1 mm, and the friction coefficient between the blank model 9 and the tool of press forming model 3 was set to 0.15 while the position of the press forming bottom dead center was set such that a gap between models of upper and lower tools of press forming was 1.45 mm.

At the first press forming condition stress distribution calculation step S1, a computer performs the press forming analysis. For the press forming analysis, for example, finite element analysis software can be used. In the first embodiment, LS-DYNA Ver.971, which is commercially available finite element analysis software, was executed on the computer to perform the press forming analysis, and a dynamic explicit method was applied to a solver.

The present invention is not limited to the case where the tool of press forming model 3 as illustrated in FIG. 2 is used and the case where the press forming part 1 having the hat cross-sectional shape is to be press formed. Aspects of the present invention can appropriately set the tool of press forming model and the press forming part depending on the press forming target.

<Second Press Forming Condition Stress Distribution Calculation Step>

The second press forming condition stress distribution calculation step S3 is a step for performing press forming analysis under second press forming conditions that are set differently from the first press forming conditions set at the first press forming condition stress distribution calculation step S1 as scattering or variation in press forming conditions, and calculating a stress distribution in the press forming part 1 at the press forming bottom dead center.

In the first embodiment, the material strengths of material B illustrated in Table 1 were set as the second press forming conditions. Similarly to the first press forming condition stress distribution calculation step S1, the press forming analysis at the second press forming condition stress distribution calculation step S3 is performed under the second press forming conditions as exemplified in FIG. 2 such that the blank model 9 is sandwiched by the tool-of-press-forming model 3 consisting the die 5 and the punch 7, and as illustrated in FIG. 4(a), the stress distribution in the press forming part 1 at the press forming bottom dead center is calculated.

At the second press forming condition stress distribution calculation step S3, a computer performs the press forming analysis. In the first embodiment, similarly to the above-mentioned second press forming condition stress distribution calculation step S3, LS-DYNA Ver.971, which is commercially available finite element analysis software, was used to execute the press forming analysis.

<Stress Difference Distribution Setting Step>

As illustrated in FIG. 6, the stress difference distribution setting step S5 is a step for calculating difference between the stress distribution ((a) of FIG. 6) calculated at the second press forming condition stress distribution calculation step S3 and the stress distribution ((b) of FIG. 6) calculated at the first press forming condition stress distribution calculation step S1 as stress difference distribution, and replacing and setting the stress distribution in the press forming part 1 at the press forming bottom dead center calculated at the first press forming condition stress distribution calculation step S1 or the stress distribution in the press forming part 1 at the press forming bottom dead center calculated at the second press forming condition stress distribution calculation step S3 with the calculated stress difference distribution ((c) of FIG. 6).

<Stress Difference Springback Amount Calculation Step>

The stress difference springback amount calculation step S7 is a step for performing springback analysis on a press forming part for which the stress difference distribution has been set at the stress difference distribution setting step S5, and calculating springback amount to be caused in the press forming part. In the first embodiment, first, as illustrated in FIG. 7, springback analysis is performed on a press forming part 1 ((a) of FIG. 7) for which the stress difference distribution has been set, and displacement ((b) of FIG. 7) after springback is calculated by the springback analysis. In the springback analysis, as illustrated in FIG. 9, three locations provided on one end side of the press forming part 1 were constrained as constraint points, and the displacement caused by springback was calculated.

At the stress difference springback amount calculation step S7, a computer performs the springback analysis. For the springback analysis, for example, finite element analysis software can be used. In the first embodiment, LS-DYNA Ver.971, which is commercially available finite element analysis software, was executed on the computer to perform the press forming analysis, and a static implicit method was applied to a solver.

Next, as illustrated in FIG. 10, a torsion angle ((a) of FIG. 10) and a warping amount ((b) of FIG. 10) were calculated based on the displacement calculated by the springback analysis. In the first embodiment, as illustrated in (a) of FIG. 10, the torsion angle was a rotation angle (positive in arrow direction in (a) of FIG. 10) caused by springback in a straight line connecting evaluation points at two locations provided on the other end side of the press forming part 1. As illustrated in (b) of FIG. 10, the warping amount was a displacement amount (positive in direction away from die 5) in a press forming stroke direction at a middle point between the two evaluation points.

<Stress Difference Distribution Changing Step>

The stress difference distribution changing step S9 is a step for changing the values of stress differences in a portion at a part of the press forming part in the stress difference distribution set for the press forming part at the stress difference distribution setting step S5. In the first embodiment, the press forming part 1 is divided into a plurality of areas (into six of A to F in longitudinal direction and into three of 1 to 3 in width direction) as illustrated in FIG. 11, and stress differences in the areas are removed, that is, the values of the stress differences are set to zero.

<Stress Difference Changed Springback Amount Calculation Step>

The stress difference changed springback amount calculation step S11 is a step for performing springback analysis on the press forming part for which the values of stress differences have been changed at the stress difference distribution changing step S9, and calculating springback amount. In the first embodiment, springback analysis is performed on the press forming part 1 by setting the values of stress differences in the areas (A1, A2, A3, . . . , F3) divided as illustrated in FIG. 11 to zero, and the torsion angle and the warping amount are calculated as springback amount as illustrated in FIG. 10. The value of stress difference is not necessarily required to be set to zero, and the value of stress difference may be changed.

At the stress difference changed springback amount calculation step S11, a computer performs the springback analysis. In the first embodiment, similarly to the above-mentioned stress difference springback amount calculation step S7, LS-DYNA Ver.971, which is commercially available finite element analysis software, was used.

FIG. 12 to FIG. 29 illustrate the results of displacement due to springback calculated by performing springback analysis on the press forming part 1 by removing the stress differences (setting values of stress differences to zero) in the areas (A1, A2, A3, . . . , F3) in the press forming part 1.

<Springback Variation Cause Analysis Step>

The springback variation cause analysis step S13 is a step for analyzing, based on the springback amount calculated at the stress difference changed springback amount calculation step S11 and the springback amount calculated at the stress difference springback amount calculation step S7, a portion in the press forming part that is a cause of variation in springback amount in the press forming part due to scattering or variation in press forming conditions.

FIG. 30 illustrates the results of the torsion angles calculated at the stress difference changed springback amount calculation step S11 and the torsion angle calculated at the stress difference springback amount calculation step S7. In FIG. 30, "base" indicates the torsion angle calculated at the stress difference springback amount calculation step S7 without changing the distribution of stress difference, and A1 to F3 indicate the torsion angles calculated at the stress difference changed springback amount calculation step S11 by removing the stress differences in the areas A1 to F3 illustrated in FIG. 11.

From FIG. 30, in the case where the stress difference was not changed ("base"), that is, the variation in torsion angle caused by scattering in material strength of the press forming metallic sheet was 1.32°, but the torsion angles in the case where the stress differences in the areas A1, B3, and E2 were removed were 0.82°, 0.83°, and 0.76°, respectively, which were lower than "base". The fact that the torsion angle was reduced by removing the stress difference in an area indicates that the area has a great influence on the variation in torsion angle, and hence the areas A1, B3, and E2 can be analyzed as portions that cause the variation in torsion angle caused by scattering in material strength.

In FIG. 30, the torsion angle when the stress difference in the area A3 was removed was 1.87°, which increases as compared with the case where the stress difference is not changed ("base"), that is, the torsion angle (1.32°) caused by scattering in material strength of the press forming metallic sheet. This indicates that the removed stress difference in the area A3 contributes to the variation in torsion angle caused by scattering in material strength of the press forming metallic sheet, but the area is a portion where the torsion angle is further varied. The torsion angles in areas other than the areas A1, B3, and E2 and the area A3 are substantially equal to the torsion angle when the stress difference is not changed. This indicates that the areas are portions where the influence on the variation in torsion angle caused by scattering of the material strength is small. In other words, the case where the torsion angle becomes lower than "base" by changing the value of the stress difference at the portion to zero indicates that the stress difference at the portion is a cause of the variation in springback to increase the torsion angle. On the other hand, the case where the torsion angle becomes larger than "base" by changing the value of the stress difference at the portion to zero indicates that the torsion angle is suppressed due to the presence of the stress difference at the portion, and hence the portion is determined to be an area that has no influence on the variation in springback.

FIG. 31 illustrates results of the warping amounts calculated at the stress difference changed springback calculation step S11 and the warping amounts calculated at the stress difference springback calculation step S7. Similarly to FIG. 30, in FIG. 31, "base" indicates the warping amount calculated at the stress difference springback calculation step S7 without changing the distribution of stress difference, and A1 to F3 indicate the warping amounts calculated at the stress difference changed springback calculation step S11 by removing the stress differences in the areas A1 to F3 illustrated in FIG. 11.

From FIG. 31, in the case where the stress difference was not changed ("base"), that is, the variation in warping amount caused by scattering in material strength of the press forming metallic sheet was 4.68 mm, but the warping amounts in the case where the stress differences in the areas A1, B3 and E2 were changed were 0.82 mm, 0.83 mm, and 0.76 mm, respectively, which were lower than "base". Consequently, the areas A1, B3, and E2 can be analyzed as portions that cause the variation in warping amount caused by scattering in material strength.

In this manner, the portion analyzed as a cause of the variation in springback amount due to scattering in material strength does not necessarily match a portion analyzed as a cause of the generation of springback itself by the conventional technology as described above. This point is described by comparison with the results of analyzing a cause of generation of springback by the conventional technology.

FIG. 32 illustrates, as an example of a result of analyzing a portion that is a cause of generation of springback by conventional technology, the result of using the conventional technology (method disclosed in Patent Literature 1) to determine a relation between areas in which stress distribution at the press forming bottom dead center was changed and torsion angles caused by springback when the stress distribution was changed. FIG. 32 illustrates the results of the torsion angle in the case where the stress distribution at the press forming bottom dead center was not changed ("base") and the torsion angles calculated by performing springback analysis by removing the stresses in the areas A1 to F3 illustrated in FIG. 11.

From FIG. 32, portions that are causes of generation of springback (torsion angle) can be analyzed to be portions corresponding to the areas A3, B1, B2, and E2 in which the difference from the torsion angle in "base" is large. However, as illustrated in FIG. 30, the analyzed portions indicate tendencies different from a portion that is a cause of variation in torsion angle due to scattering in material strength. Thus, it is understood that the method in the conventional technology for analyzing a portion that is a cause of the generation of springback cannot sufficiently analyze a portion that is a cause of variation in springback amount due to scattering in press forming conditions.

Next, the fact that a portion analyzed by the springback variation cause analysis method according to the first embodiment as a cause of variation in springback amount due to scattering or variation in press forming conditions is adequate is described.

As described above, in the case where there was scattering in material strength of the press forming metallic sheet illustrated in Table 1 in the press forming of the press forming part 1 illustrated in FIG. 2, the areas A1, B3, and E2 in the press forming part 1 were analyzed as portions to be causes of variation in springback amount. Whether the variation in springback amount was reduced by changing the stress distribution at the analyzed portion was verified.

First, the stress distribution in the areas A1, B3, and E2 in the press forming part 1 determined under the press forming conditions of the material B was replaced with the stress distribution determined under the press forming conditions of the material A, and springback analysis was performed to calculate displacement due to springback. Displacement calculated by the springback analysis in which the stress distribution in each area was replaced was used to calculate the torsion angle caused in the press forming part 1.

FIG. 33 to FIG. 35 illustrate the results of displacement calculated by springback analysis in which the stress distribution in the areas A1, B3, and E2 was replaced with the stress distribution determined under the press forming conditions of the material A. FIG. 36 illustrate the result of displacement calculated by performing springback analysis by replacing the stress distribution in all the areas A1, B3, and E2 with the stress distribution in the material A. FIG. 37 illustrates the results of torsion angles determined by the displacement (FIG. 33 to FIG. 36) calculated by replacing the stresses in the areas, and FIG. 38 illustrates the results of variation amounts of torsion angles determined by the displacement (FIG. 33 to FIG. 36) calculated by replacing the stresses in the areas.

From FIG. 37 and FIG. 38, in all the areas A1, B3, and E2, by replacing the stress distribution at the press forming bottom dead center with the stress distribution in the material A at press forming condition, the torsion angles approach the torsion angle under the conditions of the material A (FIG. 37). In other words, the variation in torsion angle due to the difference in material strength was reduced as compared with the conditions of the material B (FIG. 38), and further, the variation in torsion angle due to scattering in press forming condition can be reduced by replacing the stress distribution with that under the press forming conditions of the material A for all the areas A1, B3, and E2. This result indicates that the portion analyzed by the springback variation cause analysis method according to the first embodiment is adequate as a portion that is a cause of variation in springback amount due to scattering in press forming conditions.

As described above, it is found that the method according to the first embodiment can accurately analyze a portion that is a cause of variation in springback amount due to scattering in press forming conditions.

Second Embodiment

A springback variation cause analysis method according to a second embodiment of the present invention is a method for analyzing, when variation occurs in springback amount in a press forming part due to scattering or variation in press forming conditions, a portion in the press forming part that is a cause of the variation in springback amount. As illustrated in FIG. 39, the springback variation cause analysis method includes a first press forming part stress distribution acquisition step S21, a second press forming part stress distribution acquisition step S23, a stress difference distribution setting step S25, a stress difference springback amount calculation step S27, a stress difference distribution changing step S29, a stress difference changed springback amount calculation step S31, and a springback variation cause analysis step S33. In the following, the above-mentioned steps are described with reference to FIG. 39 and FIG. 40.

<First Press Forming Part Stress Distribution Acquisition Step S21>

The first press forming part stress distribution acquisition step S21 is a step for press forming a first press forming part under first press forming conditions in advance, creating a first press forming part model from three-dimensional shape measurement data obtained by measuring the surface shape of the first press forming part after die release, performing mechanical analysis in the state in which the first press forming part model is sandwiched by a tool-of-press-forming model until reaching a press forming bottom dead center, and acquiring stress distribution in the first press forming part model at the press forming bottom dead center.

Specific processing at the first press forming part stress distribution acquisition step S21 corresponds to, as illustrated in FIG. 40, a process for press forming a first press forming part 21 under first press forming conditions by using a tool of press forming 11, measuring the three-dimensional shape of the press-formed first press forming part 21, processing measured first press forming part three-dimensional shape data 23 to create a first press forming part model 25, performing elastic finite element analysis as mechanical analysis in the state in which the first press forming part model 25 is sandwiched by a tool-of-press-forming model 41 consisting a die 43 and a punch 45 until reaching a press forming bottom dead center, and acquiring stress distribution in the first press forming part model 25 at the press forming bottom dead center obtained by the elastic finite element analysis.

As specific methods for the measurement of the three-dimensional shape of the first press forming part 21, the creation of the first press forming part model 25, and the elastic finite element analysis, for example, the methods disclosed in Patent Literature 7 can be used.

<Second Press Forming Part Stress Distribution Acquisition Step S23>

The second press forming part stress distribution acquisition step S23 is a step for press forming a second press forming part under second press forming conditions different from the first press forming conditions, creating a second press forming part model from three-dimensional shape measurement data obtained by measuring the surface shape of the second press forming part after die release, performing mechanical analysis in the state in which the second press forming part model is sandwiched by the tool-of-press-forming model until reaching the press forming bottom dead center, and acquiring stress distribution in the second press forming part model at the press forming bottom dead center.

Specific processing at the second press forming part stress distribution acquisition step S23 also corresponds to, as illustrated in FIG. 40, a process for press forming a second press forming part 31 under second press forming conditions by using the tool of press forming 11, measuring the three-dimensional shape of the press-formed second press forming part 31, processing measured second press forming part three-dimensional shape data 33 to create a second press forming part model 35, and performing elastic finite element analysis as mechanical analysis in the state in which the second press forming part model 35 is sandwiched by the tool-of-press-forming model 41 consisting the die 43 and the punch 45 until reaching the press forming bottom dead center. As specific methods for the measurement of the three-dimensional shape of the second press forming part 31, the creation of the second press forming part model 35, and the elastic finite element analysis, for example, the methods disclosed in Patent Literature 7 can also be used.

<Stress Difference Distribution Setting Step S25>

The stress difference distribution setting step S25 is a step for calculating difference between the stress distribution in the first press forming part model 25 at the press forming bottom dead center calculated at the first press forming part stress distribution acquisition step S21 and the stress distribution in the second press forming part model 35 at the press forming bottom dead center calculated at the second press forming part stress distribution acquisition step S23 as stress difference distribution, and replacing and setting the stress distribution in the first press forming part model 25 at the press forming bottom dead center acquired at the first press forming part stress distribution acquisition step S21 or the stress distribution in the second press forming part model 35 at the press forming bottom dead center acquired at the second press forming part stress distribution acquisition step S23 with the calculated stress difference distribution.

In the second embodiment, as illustrated in FIG. 40, the difference between the stress distribution in the first press forming part model 25 at the press forming bottom dead center and the stress distribution in the second press forming part model 35 at the press forming bottom dead center is calculated as stress difference distribution, and the calculated stress difference distribution is set to the first press forming part model 25 at the press forming bottom dead center. The stress difference distribution may be set to the second press forming part model 35 at the press forming bottom dead center.

<Stress Difference Springback Amount Calculation Step S27>

As illustrated in FIG. 40, the stress difference springback amount calculation step S27 is a step for performing springback analysis on the first press forming part model 25 based on the stress difference distribution set at the stress difference distribution setting step S25, and calculating springback amount to be caused in the first press forming part model 25.

At the stress difference springback amount calculation step S27, a computer performs the springback analysis. For the springback analysis, for example, finite element analysis software can be used. In the second embodiment, LS-DYNA Ver.971, which is commercially available finite element analysis software, was executed on the computer to perform the press forming analysis, and a static implicit method was applied to a solver.

<Stress Difference Distribution Changing Step>

The stress difference distribution changing step S29 is a step for changing the values of stress differences at a part of the first press forming part model or the second press forming part model in the stress difference distribution set for the first press forming part model or the second press forming part model at the stress difference distribution setting step S25.

In the second embodiment, similarly to the stress difference distribution changing step S9 in the first embodiment, the first press forming part model 25 for which the stress difference distribution has been set at the stress difference distribution setting step S25 is divided into a plurality of areas (into six of A to F in longitudinal direction and into three of 1 to 3 in width direction) as illustrated in FIG. 11, and stress differences in the areas are removed (set to zero).

<Stress Difference Changed Springback Amount Calculation Step>

The stress difference changed springback amount calculation step S31 is a step for performing springback analysis on the first press forming part model or the second press forming part model for which the values of stress differences have been changed at the stress difference distribution changing step S29, and calculating springback amount. In the second embodiment, springback analysis is performed on the first press forming part model 25 for which the value of the stress difference distribution has been changed at the stress difference distribution changing step S29. At the stress difference changed springback amount calculation step S31, similarly to the stress difference springback amount calculation step S27, a computer performs the springback analysis. For the springback analysis, for example, finite element analysis software can be used.

<Springback Variation Cause Analysis Step>

The springback variation cause analysis step S33 is a step for analyzing, based on the springback amount calculated at the stress difference changed springback amount calculation step S31 and the springback amount calculated at the stress difference springback amount calculation step S27, a portion in the first press forming part model 25 that is a cause of variation in springback amount in the first press forming part model 25 due to scattering or variation in press forming conditions.

As described above, the method according to the second embodiment indicates that a portion that is a cause of variation in springback amount due to scattering or variation in press forming conditions was accurately analyzed.

Patent Literature 7 discloses a method for calculating stress distribution at the press forming bottom dead center by acquiring the measured shape of a press forming part and performing mechanical analysis in which the press forming part is sandwiched by the shape of a tool of press forming based on the acquired measured shape. However, Patent Literature 7 does not indicate or suggest that, as in the method according to the second embodiment, difference in stress distribution at the press forming bottom dead center in two press forming parts press formed under two press forming conditions is determined, and variation in springback amount due to scattering or variation in press forming conditions is evaluated based on the difference in stress distribution.

Furthermore, the press forming conditions that cause scattering or variation in the first embodiment and the second embodiment are any one of mechanical properties of a press forming metallic sheet (blank), the thickness and shape of the press forming metallic sheet, the temperature of the press forming metallic sheet, sliding characteristics between the press forming metallic sheet and a tool of press forming, the relative position of the press forming metallic sheet with respect to the tool of press forming, the position and shape of a positioning device for the press forming metallic sheet, mechanical properties of press forming tool material, the shape of the surface of the tool of press forming, the internal structure of the tool of press forming, blank holder force, blank holder position, the position and shape of a device for applying blank holder force to component parts of the tool of press forming, the initial relative position of the component parts of the tool of press forming, the relative speed of movement of the tool of press forming, the vibration of the tool of press forming, the temperature of the tool of press forming, atmospheric temperature, atmospheric components, a pressurizing device, and electromagnetic environments.

At the stress difference distribution changing step S29 in the first embodiment and the stress difference distribution changing step S29 in the second embodiment, the stress difference in at least a partial area of the stress difference distribution is removed (all components are set to zero). However, the method for changing the stress difference is not limited thereto, and the stress difference only needs to be changed by removing a component of the stress difference in at least one direction, constant multiplication, addition of a constant, constant power, replacement with average value in sheet thickness direction of the press forming metallic sheet, and replacement with a median value in the sheet thickness direction.

First Example

Specific experiments for confirming the actions and effects of the springback variation cause analysis method in accordance with aspects of the present invention were performed. The results are described below. In the present example, a portion that is a cause of variation in springback amount due to scattering or variation in press forming conditions was analyzed for three cases where the shape of the tool of press forming, the lubricating state, and the press forming bottom dead center position vary as scattering or variation in press forming conditions. The press forming conditions and the analysis results in the cases are described below.

In the present example, the method according to the above-mentioned first embodiment was used. Specifically, as illustrated in FIG. 2, press forming analysis in which the tool-of-press-forming model 3 consisting the die 5 and the punch 7 was used to press form the blank model 9 into the press forming part 1 and springback analysis on the press forming part 1 for which stress difference distribution at the press forming bottom dead center determined by the press forming analysis was set were performed. In regard to the analysis of a portion in which variation occurs in springback amount, by dividing the press forming part 1 into a plurality of areas as illustrated in FIG. 11 and removing the stress differences in the areas (set to zero), the relation between the area in which the stress difference was changed and the springback amount when the stress difference in the area was changed was determined. The press forming analysis and the springback analysis were performed by executing LS-DYNA Ver.971 as finite element analysis software on a computer.

[Shape of Tool of Press Forming]

A case where the tool of press forming is worn due to continuous press forming and the shape of the tool of press forming changes as scattering in press forming conditions was assumed, and a portion as a cause of variation in springback amount in the press forming part due to scattering in the shape of the tool of press forming was analyzed.

Scattering in shape of the tool of press forming means the case where the curvature radii of ridge lines of the die 5 and the punch 7 increase due to wear of the tool of press forming during mass production. Two conditions were set: a condition in which the curvature radii of all ridge lines of the die 5 and the punch 7 in the tool-of-press-forming model 3 remain unchanged from the design shape (hereinafter referred to as "tool of press forming A") and a condition in which the curvature radii are increased by 2 mm (hereinafter referred to as "tool of press forming B"). The curvature radius of 2 mm was set as a value larger than actual variation. Press forming analysis was performed on the shape of each tool of press forming, and the difference in stress distribution at the press forming bottom dead center was calculated to analyze a portion as a cause of variation in springback amount. On the assumption that the press forming conditions (such as an amount of lubricant and a press forming bottom dead center position) other than the shape of the tool of press forming were not changed, the friction coefficient between the blank model 9 and the tool-of-press-forming model 3 was set to 0.15, and the press forming bottom dead center position was set such that the gap between the die 5 and the punch 7 was 1.45 mm.

FIG. 41 illustrate stress distribution (a) at the press forming bottom dead center calculated by performing press forming analysis under press forming conditions of a tool of press forming B and displacement (b) in the press forming part 1 calculated by springback analysis based on the stress distribution. The stress distribution at the press forming bottom dead center calculated by press forming analysis under the press forming conditions of the tool of press forming A and the displacement in the press forming part 1 calculated by springback analysis are the same as the results illustrated in FIG. 3.

FIG. 42 illustrate difference (a) between the stress distributions at the press forming bottom dead center calculated under the press forming conditions of the tool of press forming A and the tool of press forming B and displacement (b) in the press forming part 1 calculated by springback analysis using the stress difference distribution. FIG. 43 illustrate difference in displacement caused by scattering in press forming conditions of the tool of press forming B and the tool of press forming A that were calculated by springback analysis based on the stress distributions at the press forming bottom dead center calculated under press forming conditions of the tool of press forming A and the tool of press forming B.

The distribution of displacement based on the stress difference distribution ((b) of FIG. 42) and the difference in displacement based on the stress distributions ((b) of FIG. 43) have substantially the same tendency. This indicates that stress difference distribution as difference in stress distribution at the press forming bottom dead center under two conditions with different shapes of tools of press forming as scattering in press forming conditions is a cause of variation in springback amount.

Next, FIG. 44 and FIG. 45 illustrate the results of torsion angles and warping amounts as springback amount determined by using the displacement calculated by performing springback analysis based on the stress difference distribution. In FIG. 44 and FIG. 45, "base" indicates the springback amount calculated at the stress difference springback amount calculation step S7 without changing the distribution of stress difference, and A1 to F3 indicate the springback amount calculated at the stress difference changed springback amount calculation step S11 by removing the stress differences in the areas A1 to F3 illustrated in FIG. 11.

From FIG. 44, when the stress difference in the area B3 is removed, the torsion angle is greatly reduced to 0.00° as compared with a torsion angle of 0.40° before the stress difference is removed. Thus, the area B3 is analyzed as a portion that is a cause of variation in torsion angle. From FIG. 45, when the stress differences in the area E2 and the area D2 are removed, the warping amounts are changed to −1.58 mm and 0.17 mm, respectively, as compared with a warping amount of −2.99 mm before the stress differences are removed, and the absolute values thereof are greatly reduced. Thus, the areas D2 and E2 are analyzed as portions that are causes of the variation in warping amount.

As described above, when scattering occurs in shape of the tool of press forming as press forming conditions, portions that are causes of variation in torsion angle and warping amount as springback amount due to scattering in the shape of the tool of press forming can be analyzed. By changing to a part shape or a method that less causes stress difference in each area analyzed as a result of these, a press forming part in which shape variation due to scattering in press forming conditions can be obtained.

[Lubricating State]

Next, a case where lubricating conditions (adhesion of lubricant) during press forming change as scattering in press forming conditions was assumed, and a portion as a cause of variation in springback amount due to scattering in lubricating conditions was analyzed.

In the present example, in regard to scattering in lubricating conditions, in consideration of the friction coefficient of the tool-of-press-forming model 3 (die 5 and punch 7) and the blank model 9 in press forming analysis, press forming analysis was performed under press forming conditions in which the friction coefficient was 0.15 (hereinafter referred to as "lubrication A") and press forming conditions in which the friction coefficient was 0.20 (hereinafter referred to as "lubrication B"), and the difference in stress distribution at the press forming bottom dead center was calculated to analyze a portion as a cause of variation in springback amount.

In regard to the analysis of a portion in which variation occurs in springback amount due to scattering in lubricating conditions, the method described in the first embodiment was used, and the press forming bottom dead center position was set such that the gap between the die 5 and the punch 7 in the tool-of-press-forming model 3 was 1.45 mm on the assumption that the press forming conditions (such as a shape of tool of press forming and a press forming bottom dead center position) other than the lubricating conditions were not changed.

By dividing the press forming part 1 into a plurality of areas as illustrated in FIG. 11 and setting the values of stress differences in the areas to zero, a portion that is a cause of variation in springback amount due to scattering in lubricating conditions was analyzed based on the relation between the areas and the springback amount.

FIG. 46 illustrate stress distribution (a) at the press forming bottom dead center when press forming analysis was performed under press forming conditions of the lubrication B and displacement (b) in the press forming part 1 calculated by springback analysis based on the stress distribution. The stress distribution at the press forming bottom dead center when press forming analysis was performed under the press forming conditions of the lubrication A and the displacement in the press forming part 1 calculated by springback analysis are the same as the results illustrated in FIG. 3.

FIG. 47 illustrate difference (a) in stress distribution at the press forming bottom dead center calculated under press forming conditions of lubrication A and lubrication B and displacement (b) in the press forming part 1 calculated by springback analysis using the stress difference distribution. FIG. 48 illustrate difference between the displacement calculated by performing springback analysis under the press forming conditions of the lubrication A and the displacement calculated by performing springback analysis under the press forming conditions of the lubrication B.

The distribution of displacement based on the stress difference distribution ((b) of FIG. 47) and the distribution of difference in displacement based on the stress distribution ((b) of FIG. 48) have similar tendencies. This indicates that even when scattering occurs in lubricating conditions as press forming conditions, the difference in press forming bottom dead center stress distribution when the lubricating conditions are different, that is, the stress difference distribution is a cause of variation in springback amount.

Next, FIG. 49 and FIG. 50 illustrate the results of determining the torsion angle and the warping amount as springback amount by using displacement calculated by performing springback analysis based on the stress difference distribution. In FIG. 49 and FIG. 50, "base" indicates the springback amount calculated at the stress difference springback amount calculation step S7 without changing the distribution in stress difference, and A1 to F3 indicate the springback amount calculated at the stress difference changed springback amount calculation step S11 by removing the stress differences in the areas A1 to F3 illustrated in FIG. 11.

From FIG. 49, when the stress differences in the areas A2 and B3 are removed, the torsion angles are reduced to 0.23° and 0.28°, respectively, as compared with a torsion angle of 0.41° before the stress differences are removed. Thus, the areas A2 and B3 are analyzed as portions that are causes of variation in torsion angle. From FIG. 50, when the stress differences in the areas D3, E2, and F2 are removed, the absolute values of the warping amounts are reduced to −0.80 mm, −0.86 mm, and −0.65 mm as compared with a warping amount of −1.33 mm before the stress differences are removed. Thus, the areas D3, E2, and F2 are analyzed as portions that are causes of variation in warping amount.

As described above, even when scattering occurs in lubricating conditions as press forming conditions, portions that are causes of variation in torsion angle and warping amount as springback amount due to scattering in the lubricating conditions can be analyzed.

[Position of Press Forming Bottom Dead Center]

Furthermore, a case where the press machine press forming state during press forming changes as scattering in press forming conditions was assumed, and a portion as a cause of variation in springback amount due to scattering in press machine press forming state was analyzed.

In the present example, in regard to scattering in press machine press forming state, in consideration of the position of the press forming bottom dead center by press forming analysis, press forming analysis was performed under press forming conditions where the gap between the die 5 and the punch 7 in the tool-of-press-forming model 3 was 1.45 mm (hereinafter referred to as "bottom dead center A") and press forming conditions where the gap between the die 5 and the punch 7 increased by 0.2 mm to be 1.65 mm (hereinafter referred to as "bottom dead center B"), and the difference in stress distribution in press forming bottom dead center was calculated to analyze a portion that was a cause of variation in springback amount. The fact that scattering occurs in how the tool of press forming and the blank contact and the forming load due to scattering in press forming bottom dead center position can be simulated.

In regard to the analysis of a portion in which variation occurs in springback amount due to scattering in position of press forming bottom dead center, the method described in the first embodiment was used, and the friction coefficient between the blank model 9 and the tool-of-press-forming model 3 was set to 0.15 on the assumption that the press forming conditions (such as shape of tool of press forming and amount of lubricant (friction coefficient)) other than the press forming bottom dead center position were not changed.

By dividing the press forming part 1 into a plurality of areas as illustrated in FIG. 11 and setting the values of stress differences in the areas to zero, a portion that is a cause of variation in springback amount due to scattering in lubricating conditions was analyzed based on the relation between the areas and the springback amount.

FIG. 51 illustrate stress distribution (a) at the press forming bottom dead center when press forming analysis was performed under press forming conditions of the bottom dead center B and displacement (b) in the press forming part 1 calculated by springback analysis based on the stress distribution. The stress distribution at the press forming bottom dead center when press forming analysis was performed under the press forming conditions of the bottom dead center A and the displacement in the press forming part 1 calculated by springback analysis are the same as the results illustrated in FIG. 3.

FIG. 52 illustrate difference (a) between the stress distributions at the press forming bottom dead center calculated under the press forming conditions of the bottom dead center A and the bottom dead center B and displacement (b) in the press forming part 1 calculated by springback analysis using the stress difference distribution. FIG. 53 illustrate difference between the displacement calculated by performing springback analysis under the press forming conditions of the bottom dead center A and the displacement calculated by performing springback analysis under the press forming conditions of the bottom dead center B.

The distribution of displacement based on the stress difference distribution ((b) of FIG. 52) and the distribution of difference in displacement based on the stress distribution ((b) of FIG. 53) have substantially the same tendency. This indicates that even when scattering occurs in the position of bottom dead center as press forming conditions, the difference in press forming bottom dead center stress distribution when the bottom dead center positions are different, that is, the stress difference distribution is a cause of variation in springback amount.

Next, FIG. 54 and FIG. 55 illustrate the results of determining torsion angles and warping amounts as springback amount by using the displacement calculated by performing springback analysis based on the stress difference distribution. In FIG. 54 and FIG. 55, "base" indicates the springback amount calculated at the stress difference springback amount calculation step S7 without changing the distribution of stress difference, and A1 to F3 indicate the springback amount calculated at the stress difference changed springback amount calculation step S11 by removing the stress differences in the areas A1 to F3 illustrated in FIG. 11.

From FIG. 54, when the stress differences in the areas A1, A2, B3 and E3 are removed, the torsion angles are reduced to 0.45°, 0.20°, 0.42°, and 0.28°, respectively, as compared with a torsion angle of 0.70° before the distribution of stress difference is changed ("base"). Thus, the areas A1, A2, B3, and E3 are analyzed as portions that cause variation in torsion angle. From FIG. 55, when the stress differences in the areas B3 and E3 are removed, the warping amounts are reduced to 1.12 mm and 1.30 mm as compared with a warping amount of 1.62 mm before the stress differences are changed ("base"), which are relatively larger than the change in warping amount in other areas. Thus, the areas B3 and E3 are analyzed as portions that cause the variation in warping amount.

As described above, it is found that even when scattering occurs in the position of the press forming bottom dead center as press forming conditions, portions that are causes of variation in torsion angle and warping amount as springback amount due to scattering in the position of the press forming bottom dead center can be analyzed.

INDUSTRIAL APPLICABILITY

According to aspects of the present invention, the springback variation cause analysis method for analyzing a portion in which scattering or variation in press forming conditions causes variation in springback amount can be provided.

REFERENCE SIGNS LIST

1 PRESS FORMING PART
3 TOOL-OF-PRESS-FORMING MODEL
5 DIE
7 PUNCH
9 BLANK MODEL
11 TOOL OF PRESS FORMING
21 FIRST PRESS FORMING PART
23 FIRST PRESS FORMING PART THREE-DIMENSIONAL SHAPE DATA
25 FIRST PRESS FORMING PART MODEL
31 SECOND PRESS FORMING PART
33 SECOND PRESS FORMING PART THREE-DIMENSIONAL SHAPE DATA
35 SECOND PRESS FORMING PART MODEL
41 TOOL OF PRESS FORMING MODEL
43 DIE
45 PUNCH

The invention claimed is:

1. A springback variation cause analysis method of analyzing a portion in a press forming part that is a cause of variation in springback amount when the variation occurs in springback amount in the press forming part due to scattering or variation in press forming conditions, the method comprising:
   performing a first press forming analysis under first press forming conditions set in advance, and calculating a first stress distribution in the press forming part at a press forming bottom dead center;
   performing a second press forming analysis under second press forming conditions set differently from the first press forming conditions, and calculating a second stress distribution in the press forming part at the press forming bottom dead center;
   calculating a difference between the second stress distribution and the first stress distribution as a stress difference distribution, and replacing and setting the first stress distribution in the press forming part at the press forming bottom dead center or the second stress distribution in the press forming part at the press forming bottom dead center with the calculated stress difference distribution;
   performing springback analysis on the press forming part for which the stress difference distribution has been set, and calculating a first springback amount to be caused in the press forming part;
   changing a value of stress difference in a partial area of the press forming part in the stress difference distribution set for the press forming part;
   performing springback analysis on the press forming part for which the value of the stress difference has been changed, and calculating a second springback amount; and
   analyzing a portion in the press forming part that is a cause of variation in springback amount in the press forming part due to scattering or variation in press forming conditions, based on the second springback amount and the first springback amount.

2. The springback variation cause analysis method according to claim 1, wherein the press forming conditions include: mechanical properties of a press formed metallic sheet, a thickness and a shape of the press formed metallic sheet, temperature of the press formed metallic sheet, sliding characteristics between the press formed metallic sheet and a tool of press forming, a relative position of the press formed metallic sheet with respect to the tool of press forming, a position and a shape of a positioning device for the press formed metallic sheet, mechanical properties of press forming tool material, a shape of a surface of the tool of press forming, an internal structure of the tool of press forming, blank holder force, a blank holder position, a position and a shape of a device for applying blank holder force to component parts of the tool of press forming, an initial relative position of the component parts of the tool of press forming, relative speed of movement of the tool of press forming, vibration of the tool of press forming, temperature of the tool of press forming, atmospheric temperature, atmospheric components, a pressurizing device, and electromagnetic environments.

3. The springback variation cause analysis method according to claim 1, wherein when changing the value of stress difference in the partial area of the press forming part in the stress difference distribution set for the press forming part, the value of the stress difference is changed by any one of removal of a component of the stress difference distribution in at least one direction, constant times, addition of a constant, constant multiplication, replacement with an average value in a sheet thickness direction of a press formed metallic sheet, or replacement with a median value in the sheet thickness direction.

4. The springback variation cause analysis method according to claim 2, wherein when changing the value of stress difference in the partial area of the press forming part in the stress difference distribution set for the press forming part, the value of the stress difference is changed by any one of removal of a component of the stress difference distribution in at least one direction, constant times, addition of a constant, constant multiplication, replacement with an average value in a sheet thickness direction of a press formed metallic sheet, or replacement with a median value in the sheet thickness direction.

5. A springback variation cause analysis method of analyzing a portion in a press forming part that is a cause of variation in springback amount when the variation occurs in springback amount in the press forming part due to scattering or variation in press forming conditions, the method comprising:

press forming a first press forming part under first press forming conditions in advance, creating a first press forming part model from three-dimensional shape measurement data obtained by measuring a surface shape of the first press forming part after die release, performing a first mechanical analysis in a state in which the first press forming part model is sandwiched by a tool-of-press-forming model until reaching a press forming bottom dead center, and acquiring a first stress distribution in the first press forming part at the press forming bottom dead center;

press forming a second press forming part under second press forming conditions different from the first press forming conditions, creating a second press forming part model from three-dimensional shape measurement data obtained by measuring a surface shape of the second press forming part after die release, performing a second mechanical analysis in which the second press forming part model is sandwiched by the tool-of-press-forming model until reaching the press forming bottom dead center, and acquiring a second stress distribution in the second press forming part at the press forming bottom dead center;

calculating difference between the first stress distribution in the first press forming part at the press forming bottom dead center and the second stress distribution in the second press forming part at the press forming bottom dead center as a stress difference distribution, and replacing and setting the first stress distribution in the first press forming part model at the press forming bottom dead center or the second stress distribution in the second press forming part model at the press forming bottom dead center with the calculated stress difference distribution;

performing springback analysis on the first press forming part model or the second press forming part model based on the replaced and set stress difference distribution, and calculating a first springback amount to be caused in the first press forming part model or the second press forming part model;

changing a value of stress difference in a partial area of the first press forming part model or the second press forming part model in the stress difference distribution set for the first press forming part model or the second press forming part model;

performing springback analysis on the first press forming part model or the second press forming part model for which the value of the stress difference has been changed, and calculating a second springback amount; and analyzing a portion in the press forming part that is a cause of variation in springback in the press forming part due to scattering or variation in press forming conditions, based on the first springback amount and the second springback amount.

6. The springback variation cause analysis method according to claim 5, wherein the press forming conditions include: mechanical properties of a press formed metallic sheet, a thickness and a shape of the press formed metallic sheet, temperature of the press formed metallic sheet, sliding characteristics between the press formed metallic sheet and a tool of press forming, a relative position of the press formed metallic sheet with respect to the tool of press forming, a position and a shape of a positioning device for the press formed metallic sheet, mechanical properties of press forming tool material, a shape of a surface of the tool of press forming, an internal structure of the tool of press forming, blank holder force, a blank holder position, a position and a shape of a device for applying blank holder force to component parts of the tool of press forming, an initial relative position of the component parts of the tool of press forming, relative speed of movement of the tool of press forming, vibration of the tool of press forming, temperature of the tool of press forming, atmospheric temperature, atmospheric components, a pressurizing device, and electromagnetic environments.

7. The springback variation cause analysis method according to claim 5, wherein when changing the value of stress difference in the partial area of the first press forming part model or the second press forming part model in the stress difference distribution set for the first press forming part model or the second press forming part model, the value of the stress difference is changed by any one of removal of a component of the stress difference distribution in at least one direction, constant times, addition of a constant, constant multiplication, replacement with an average value in a sheet thickness direction of a press formed metallic sheet, or replacement with a median value in the sheet thickness direction.

8. The springback variation cause analysis method according to claim 6, wherein when changing the value of stress difference in the partial area of the first press forming part model or the second press forming part model in the stress difference distribution set for the first press forming part model or the second press forming part model, the value of the stress difference is changed by any one of removal of a component of the stress difference distribution in at least one direction, constant times, addition of a constant, constant multiplication, replacement with an average value in a sheet thickness direction of a press formed metallic sheet, or replacement with a median value in the sheet thickness direction.

* * * * *